(12) United States Patent
Sakumoto et al.

(10) Patent No.: US 8,826,025 B2
(45) Date of Patent: Sep. 2, 2014

(54) AUTHENTICATION DEVICE, AUTHENTICATION METHOD, PROGRAM, AND SIGNATURE GENERATION DEVICE

(71) Applicants: Koichi Sakumoto, Tokyo (JP); Taizo Shirai, Kanagawa (JP); Harunaga Hiwatari, Kanagawa (JP)

(72) Inventors: Koichi Sakumoto, Tokyo (JP); Taizo Shirai, Kanagawa (JP); Harunaga Hiwatari, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/855,427

(22) Filed: Apr. 2, 2013

(65) Prior Publication Data

US 2013/0219185 A1     Aug. 22, 2013

Related U.S. Application Data

(63) Continuation of application No. 13/112,819, filed on May 20, 2011, now Pat. No. 8,433,912.

(30) Foreign Application Priority Data

May 31, 2010   (JP) ................ P2010-125021

(51) Int. Cl.
| | |
|---|---|
| *H04L 9/00* | (2006.01) |
| *H04L 9/32* | (2006.01) |
| *H04L 9/30* | (2006.01) |
| *H04L 29/06* | (2006.01) |

(52) U.S. Cl.
CPC .............. *H04L 63/08* (2013.01); *H04L 9/3255* (2013.01); *H04L 9/3093* (2013.01); *H04L 9/3221* (2013.01)
USPC ........................................... 713/176; 380/30

(58) Field of Classification Search
CPC ... H04L 9/3255; H04L 9/3093; H04L 9/3221; H04L 63/08
See application file for complete search history.

(56) References Cited

U.S. PATENT DOCUMENTS 7,773,747 B2 * 8/2010 Akiyama et al. ................ 380/30

FOREIGN PATENT DOCUMENTS

| JP | 2004-030639 | 1/2004 |
|---|---|---|
| JP | 2005-515659 | 5/2005 |

(Continued)

OTHER PUBLICATIONS

Komano et al., ASS-CC: Provably Secure Algebraic Surface Signature Scheme, The 2010 Symposium on Cryptography and Information Security, pp. 1-6, (2010).

(Continued)

*Primary Examiner* — Longbit Chai
(74) *Attorney, Agent, or Firm* — Finnegan, Henderson, Farabow, Garrett & Dunner, LLP

(57) ABSTRACT

Provided is an authentication device including a key setting unit for setting a multi-order polynomial $u_i(t)$ (i=1 to n−1) to a secret key and setting a multi-order polynomial f that satisfies $f(u_1(t), \ldots, u_{n-1}(t),t)=0$ to a public key, a message transmission unit for transmitting a message c to a verifier, a verification pattern reception unit for receiving information on one verification pattern selected by the verifier from k (k≥3) verification patterns for one message c, and a response transmission unit for transmitting, to the verifier, response information, among k types of response information, corresponding to the information on the verification pattern received by the verification pattern reception unit. The response information is information that enables calculation of the secret key $u_i$ in a case all of the k verification patterns for the message c performed by using the k types of response information have been successful.

14 Claims, 18 Drawing Sheets

(56) References Cited

FOREIGN PATENT DOCUMENTS

| | | |
|---|---|---|
| JP | 2007-519044 | 7/2007 |
| JP | 2008-048451 | 2/2008 |
| JP | 2009-543414 | 12/2009 |

OTHER PUBLICATIONS

Office Action issued by the Japanese Patent Office for Japanese Patent Application No. 2010-125021 dated Apr. 1, 2014.

* cited by examiner

FIG. 18

TABLE: EFFICIENCY COMPARISON BETWEEN 3-PASS AND 5-PASS

| | 3-PASS | 5-PASS | | | | |
|---|---|---|---|---|---|---|
| NUMBER OF ELEMENTS q OF RING | — | $q=2^4$ | $q=2^5$ | $q=2^6$ | $q=2^7$ | $q=2^8$ |
| FALSIFICATION SUCCESS PROBABILITY PER INTERACTIVE PROTOCOL | 0.667 | 0.531 | 0.516 | 0.508 | 0.504 | 0.502 |
| NUMBER OF REPETITIONS NECESSARY FOR n-bit SECURITY | 1.710n | 1.096n | 1.046n | 1.023n | 1.011n | 1.006n |
| NUMBER OF REPETITIONS NECESSARY FOR 80-bit SECURITY | 137 | 88 | 84 | 82 | 81 | 81 |
| NUMBER OF REPETITIONS NECESSARY FOR 128-bit SECURITY | 219 | 141 | 134 | 131 | 130 | 129 | ations# AUTHENTICATION DEVICE, AUTHENTICATION METHOD, PROGRAM, AND SIGNATURE GENERATION DEVICE This is a continuation of application Ser. No. 13/112,819, filed May 20, 2011 (allowed), and claims benefit of JP 2010-125021, filed May 31, 2010, both of which are incorporated herein by reference.

BACKGROUND OF THE INVENTION

1. Field of the Invention

The present invention relates to an authentication device, an authentication method, a program, and a signature generation device.

2. Description of the Related Art

With a rapid development of information processing technology and communication technology, digitisation of documents, official and private, is rapidly advancing. Accordingly, many individuals and companies are greatly interested in security management of electronic documents. With the increase in the interest, security against tampering, such as eavesdropping and forgery of electronic documents, has come to be hotly debated in many fields. The security against eavesdropping on an electronic document is ensured by encrypting the electronic document, for example. Also, the security against forgery of an electronic document is ensured by using a digital signature, for example. However, encryption and the digital signature have to be sufficiently tamper-resistant.

The digital signature is used for specifying the author of an electronic document. Accordingly, the digital signature should be able to be generated only by the author of the electronic document. If a malicious third party is able to generate the same digital signature, such third party can impersonate the author of the electronic document. That is, an electronic document is forged by the malicious third party. Various opinions have been expressed regarding the security of the digital signature to prevent such forgery. As digital signature schemes that are currently widely used, schemes that use a RSA signature scheme and a DSA signature scheme are known, for example.

The RSA signature scheme takes "difficulty of prime factorisation of a large composite number (hereinafter, prime factorisation problem)" as a basis for security. Also, the DSA signature scheme takes "difficulty of solving discrete logarithm problem" as a basis for security. These bases are based on that algorithms that efficiently solve the prime factorisation problem and the discrete logarithm problem by using a classical computer do not exist. That is, the difficulties mentioned above suggest the computational difficulty of a classical computer. However, it is said that solutions to the prime factorisation problem and the discrete logarithm problem can be efficiently calculated when a quantum computer is used.

Similarly to the RSA signature scheme and the DSA signature scheme, many of the digital signature schemes and public key authentication schemes that are currently used also take difficulty of the prime factorisation problem or the discrete logarithm problem as a basis for security. Thus, if the quantum computer is put to practical use, security of such digital signature schemes and public key authentication schemes will not be ensured. Accordingly, new digital signature schemes and public key authentication schemes are desired that take as a basis for security a problem different from problems such as the prime factorisation problem and the discrete logarithm problem that can be easily solved by the quantum computer. As a problem which is not easily solved by the quantum computer, there is a section-finding problem on an algebraic surface, for example. A digital signature that takes the section-finding problem on an algebraic surface as a basis for security (hereinafter, ASS-CC scheme) is disclosed in Yuichi Komano, Koichiro Akiyama, Yochikazu Hanatani, and Hideyuki Miyake, ASS-CC: Provably Secure Algebraic Surface Signature Scheme, The 2010 Symposium on Cryptography and Information Security Miyazaki, Japan, Jan. 19-22, 2010.

SUMMARY OF THE INVENTION

However, it was found as a result of examination by the inventors of the present application that there is a deficiency in the security of the ASS-CC scheme. Accordingly, the digital signature scheme based on the ASS-CC scheme and a public key authentication scheme adopting this scheme are not actually used due to the security issue. In light of the foregoing, it is desirable to provide an authentication device, an authentication method, a program, and a signature generation device which are novel and improved, and which are capable of realising a public key authentication scheme which takes the section-finding problem on an algebraic surface as a basis for security and whose security is confirmed. Furthermore, it is also possible to realise, as an applied version, a digital signature scheme.

According to an embodiment of the present invention, there is provided an authentication device which includes a key setting unit for setting a multi-order polynomial $u_i(t)$ (i=1 to n−1) to a secret key and setting a multi-order polynomial f that satisfies $f(u_1(t), \ldots, u_{n-1}(t),t)=0$ to a public key, a message transmission unit for transmitting a message c to a verifier, a verification pattern reception unit for receiving information on one verification pattern selected by the verifier from k ($k \geq 3$) verification patterns for one message c, and a response transmission unit for transmitting, to the verifier, response information, among k types of response information, corresponding to the information on the verification pattern received by the verification pattern reception unit. The response information is information that enables calculation of the secret key $u_i$ in a case all of the k verification patterns for the message c performed by using the k types of response information have been successful.

The authentication device may be configured such that authentication is successful if, when performing a first step of transmitting one or more messages c by the message transmission unit, a second step of receiving, for each message c, the information on the verification pattern from the verifier by the verification pattern reception unit, and a third step of transmitting the response information for each piece of the information on the verification pattern by the response transmission unit, verification is successfully performed by the verifier with all pieces of the response information.

The authentication device may be configured such that processing of performing the first step of transmitting one or more messages c by the message transmission unit, the second step of receiving, for each message c, the information on the verification pattern from the verifier by the verification pattern reception unit, and the third step of transmitting the response information for each piece of the information on the verification pattern by the response transmission unit is repeated, and the authentication is successful if, when performing the first to third steps a predetermined number of times, verification is successfully performed each time by the verifier with all pieces of the response information.

In a case of the message $c=(c_1, \ldots, c_m)$, the message transmission unit may calculate a new message $c'=H(c)$ by using a one-way function H and transmit the message c' to the verifier, and the response transmission unit may transmit, together with the response information, an element of the message c that the verifier is not capable of restoring even when using the response information.

According to another embodiment of the present invention, there is provided an authentication device which includes a message reception unit for receiving a message c from a prover, a verification pattern selection unit for selecting one verification pattern from k (k≥3) verification patterns for one message c, a verification pattern transmission unit for transmitting information on the verification pattern selected by the verification pattern selection unit to the prover, a response reception unit for receiving, from the prover, response information, among k types of response information, corresponding to the information on the verification pattern transmitted by the verification pattern transmission unit, and a verification unit for verifying legitimacy of the prover by using the message c received by the message reception unit and the response information received by the response reception unit. A multi-order polynomial $u_i(t)$ (i=1 to n−1) is set to a secret key and a multi-order polynomial f that satisfies $f(u_1(t), \ldots, u_{n-1}(t),t)=0$ is set to a public key. The response information is information that enables calculation of the secret key $u_i$ in a case all of the k verification patterns for the message c performed by using the k types of response information have been successful.

According to another embodiment of the present invention, there is provided an authentication device which includes a key setting unit for setting a multi-order polynomial $u_i(t)$ (i=1 to n−1) to a secret key and setting a multi-order polynomial f that satisfies $f(u_1(t), \ldots, u_{n-1}(t),t)=0$ to a public key, a message transmission unit for transmitting a message c to a verifier, a reply reception unit for receiving a reply α from the verifier, a polynomial generation unit for generating a polynomial f″ to be used for verification for the message c by using the reply α received by the reply reception unit, a polynomial transmission unit for transmitting the polynomial f″ generated by the polynomial generation unit to the verifier, a verification pattern reception unit for receiving information on one verification pattern selected by the verifier from k (k≥2) verification patterns for one message c, and a response transmission unit for transmitting, to the verifier, response information, among k types of response information, corresponding to the information on the verification pattern received by the verification pattern reception unit. The response information is information that enables calculation of the secret key $u_i$ in a case all of total 2k combinations of reply and verification pattern for the message c performed by using two types of replies α, the polynomial f″, and the k types of response information have been successful.

The authentication device may be configured such that authentication is successful if, when performing a first step of transmitting one or more messages c by the message transmission unit, a second step of receiving the reply α by the reply reception unit for each message c, a third step of generating the polynomial f″ by the polynomial generation unit by using each reply α received in the second step and transmitting the polynomial f″ by the polynomial transmission unit, a fourth step of receiving, for each message c, the information on the verification pattern from the verifier by the verification pattern reception unit, and a fifth step of transmitting the response information by the response transmission unit for each piece of the information on the verification pattern, verification is successfully performed by the verifier with all pieces of the response information.

The authentication device may be configured such that processing of performing the first step of transmitting one or more messages c by the message transmission unit, the second step of receiving the reply α by the reply reception unit for each message c, the third step of generating the polynomial f″ by the polynomial generation unit by using each reply α received in the second step and transmitting the polynomial f″ by the polynomial transmission unit, the fourth step of receiving, for each message c, the information on the verification pattern from the verifier by the verification pattern reception unit, and the fifth step of transmitting the response information by the response transmission unit for each piece of the information on the verification pattern is repeated, and the authentication is successful if, when performing the first to fifth steps a predetermined number of times, verification is successfully performed each time by the verifier with all pieces of the response information.

According to another embodiment of the present invention, there is provided an authentication device which includes a message reception unit for receiving a message c from a prover, a reply transmission unit for transmitting a reply α to the prover, a polynomial reception unit for receiving a polynomial f″ that is generated by the prover by using the reply α transmitted by the reply transmission unit and that is used for verification for the message c, a verification pattern selection unit for selecting one verification pattern from k (k≥2) verification patterns for one message c, a verification pattern transmission unit for transmitting, to the prover, information on the verification pattern selected by the verification pattern selection unit, a response reception unit for receiving, from the prover, response information, among k types of response information, corresponding to the information on the verification pattern transmitted by the verification pattern transmission unit, and a verification unit for verifying legitimacy of the prover by using the message c received by the message reception unit, the polynomial f″ received by the polynomial reception unit, and the response information received by the response reception unit. A multi-order polynomial $u_i(t)$ (i=1 to n−1) is set to a secret key and a multi-order polynomial f that satisfies $f(u_1(t), \ldots, u_{n-1}(t),t)=0$ is set to a public key. The response information is information that enables calculation of the secret key $u_i$ in a case all of total 2k combinations of reply and verification pattern for the message c performed by using two types of replies α, the polynomial f″, and the k types of response information have been successful.

According to another embodiment of the present invention, there is provided an authentication method which includes the steps of setting a multi-order polynomial $u_i(t)$ (i=1 to n−1) to a secret key and setting a multi-order polynomial f that satisfies $f(u_1(t), \ldots, u_{n-1}(t),t)=0$ to a public key, transmitting a message c to a verifier, receiving information on one verification pattern selected by the verifier from k (k≥3) verification patterns for one message c, and transmitting, to the verifier, response information, among k types of response information, corresponding to the information on the verification pattern received in the step of receiving. The response information is information that enables calculation of the secret key $u_i$ in a case all of the k verification patterns for the message c performed by using the k types of response information have been successful.

According to another embodiment of the present invention, there is provided an authentication method which includes the steps of receiving a message c from a prover, selecting one verification pattern from k (k≥3) verification patterns for one message c, transmitting information on the verification pattern selected in the step of selecting to the prover, receiving, from the prover, response information, among k types of response information, corresponding to the information on the verification pattern transmitted in the step of transmitting, and verifying legitimacy of the prover by using the message c received in the step of receiving the message c and the response information received in the step of receiving the response information. A multi-order polynomial $u_i(t)$ (i=1 to n−1) is set to a secret key and a multi-order polynomial f that satisfies $f(u_1(t), \ldots, u_{n-1}(t),t)=0$ is set to a public key. The response information is information that enables calculation of the secret key $u_i$ in a case all of the k verification patterns for the message c performed by using the k types of response information have been successful.

According to another embodiment of the present invention, there is provided an authentication method which includes the steps of setting a multi-order polynomial $u_i(t)$ (i=1 to n−1) to a secret key and setting a multi-order polynomial f that satisfies $f(u_1(t), \ldots, u_{n-1}(t),t)=0$ to a public key, transmitting a message c to a verifier, receiving a reply a from the verifier, generating a polynomial f" to be used for verification for the message c by using the reply α received in the step of receiving the reply α, transmitting the polynomial f" generated in the step of generating to the verifier, receiving information on one verification pattern selected by the verifier from k (k≥2) verification patterns for one message c, and transmitting, to the verifier, response information, among k types of response information, corresponding to the information on the verification pattern received in the step of receiving the information on the verification pattern. The response information is information that enables calculation of the secret key $u_i$ in a case all of total 2k combinations of reply and verification pattern for the message c performed by using two types of replies α, the polynomial f", and the k types of response information have been successful.

According to another embodiment of the present invention, there is provided an authentication method which includes the steps of receiving a message c from a prover, transmitting a reply α to the prover, receiving a polynomial f" that is generated by the prover by using the reply a transmitted in the step of transmitting the reply α and that is used for verification for the message c, selecting one verification pattern from k (k≥2) verification patterns for one message c, transmitting, to the prover, information on the verification pattern selected in the step of selecting, receiving, from the prover, response information, among k types of response information, corresponding to the information on the verification pattern transmitted in the step of transmitting the information on the verification pattern, and verifying legitimacy of the prover by using the message c received in the step of receiving the message c, the polynomial f" received in the step of receiving the polynomial f", and the response information received in the step of receiving the response information. A multi-order polynomial $u_i(t)$ (i=1 to n−1) is set to a secret key and a multi-order polynomial f that satisfies $f(u_1(t), \ldots, u_{n-1}(t),t)=0$ is set to a public key. The response information is information that enables calculation of the secret key $u_1$ in a case all of total 2k combinations of reply and verification pattern for the message c performed by using two types of replies α, the polynomial f", and the k types of response information have been successful.

According to another embodiment of the present invention, there is provided a program for causing a computer to realise a key setting function of setting a multi-order polynomial $u_i(t)$ (i=1 to n−1) to a secret key and setting a multi-order polynomial f that satisfies $f(u_i(t), \ldots, u_{n-1}(t),t)=0$ to a public key, a message transmission function of transmitting a message c to a verifier, a verification pattern reception function of receiving information on one verification pattern selected by the verifier from k (k≥3) verification patterns for one message c, and a response transmission function of transmitting, to the verifier, response information, among k types of response information, corresponding to the information on the verification pattern received by the verification pattern reception function. The response information is information that enables calculation of the secret key $u_i$ in a case all of the k verification patterns for the message c performed by using the k types of response information have been successful.

According to another embodiment of the present invention, there is provided a computer-readable recording medium in which the program is recorded.

According to another embodiment of the present invention, there is provided a signature generation device which includes a key setting unit for setting a multi-order polynomial $u_i(t)$ (i=1 to n−1) to a secret key and setting a multi-order polynomial f that satisfies $f(u_1(t), \ldots, u_{n-1}(t),t)=0$ to a public key, a message generation unit for generating N messages c based on the multi-order polynomial $u_i(t)$, a verification pattern selection unit for selecting a verification pattern from $k^N$ (k≥3) verification patterns based on information obtained by applying a document M and the message c to a one-way function, and a signature generation unit for generating, according to the verification pattern selected by the verification pattern selection unit, a digital signature a that will pass verification that uses the message c and the document M. The digital signature a is information that enables calculation of the secret key $u_i$ in a case all verifications performed by using the digital signature a corresponding to $(k-1)^N+1$ verification patterns have been successful.

According to the embodiments of the present invention described above, it is possible to realise a public key authentication scheme which takes the section-finding problem on an algebraic surface as a basis for security and whose security is confirmed. Furthermore, it is also possible to realise, as an applied version, a digital signature scheme which takes the section-finding problem on an algebraic surface as a basis for security and whose security is confirmed.

BRIEF DESCRIPTION OF THE DRAWINGS

FIG. 18 is a chart comparing the efficiency of the public key authentication schemes according to the first and second embodiments of the present invention.

DETAILED DESCRIPTION OF THE EMBODIMENT(S)

Figure 1:
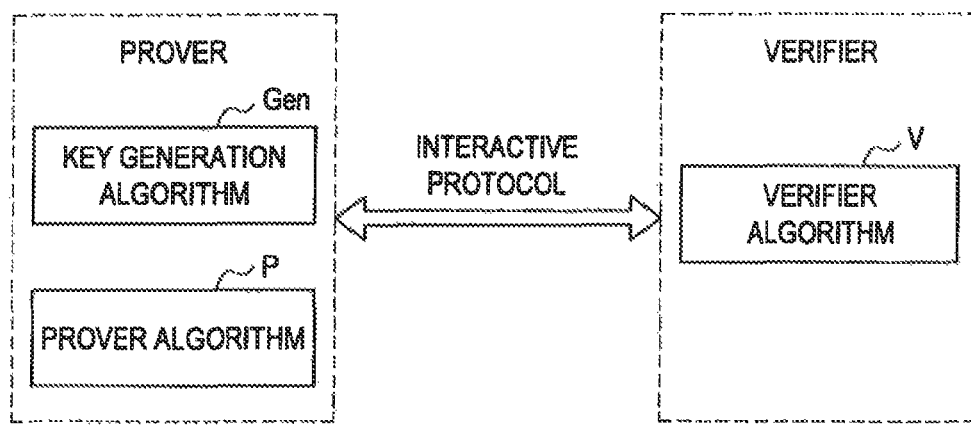
FIG. 1 is an explanatory diagram for describing an algorithm structure of a public key authentication scheme.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of a description related to embodiments of the present invention described later will be briefly mentioned here. First, an algorithm structure of a public key authentication scheme will be described with reference to FIG. 1. Next, an algorithm structure of a digital signature scheme will be described with reference to FIG. 2. Then, an n-pass public key authentication scheme will be described with reference to FIG. 3. Then, an algorithm of an ASS-CC-IP public key authentication scheme will be described with reference to FIG. 4. Furthermore, a falsification algorithm against the algorithm for the ASS-CC-IP public key authentication scheme 16 will be described with reference to FIG. 5.

Figure 6:
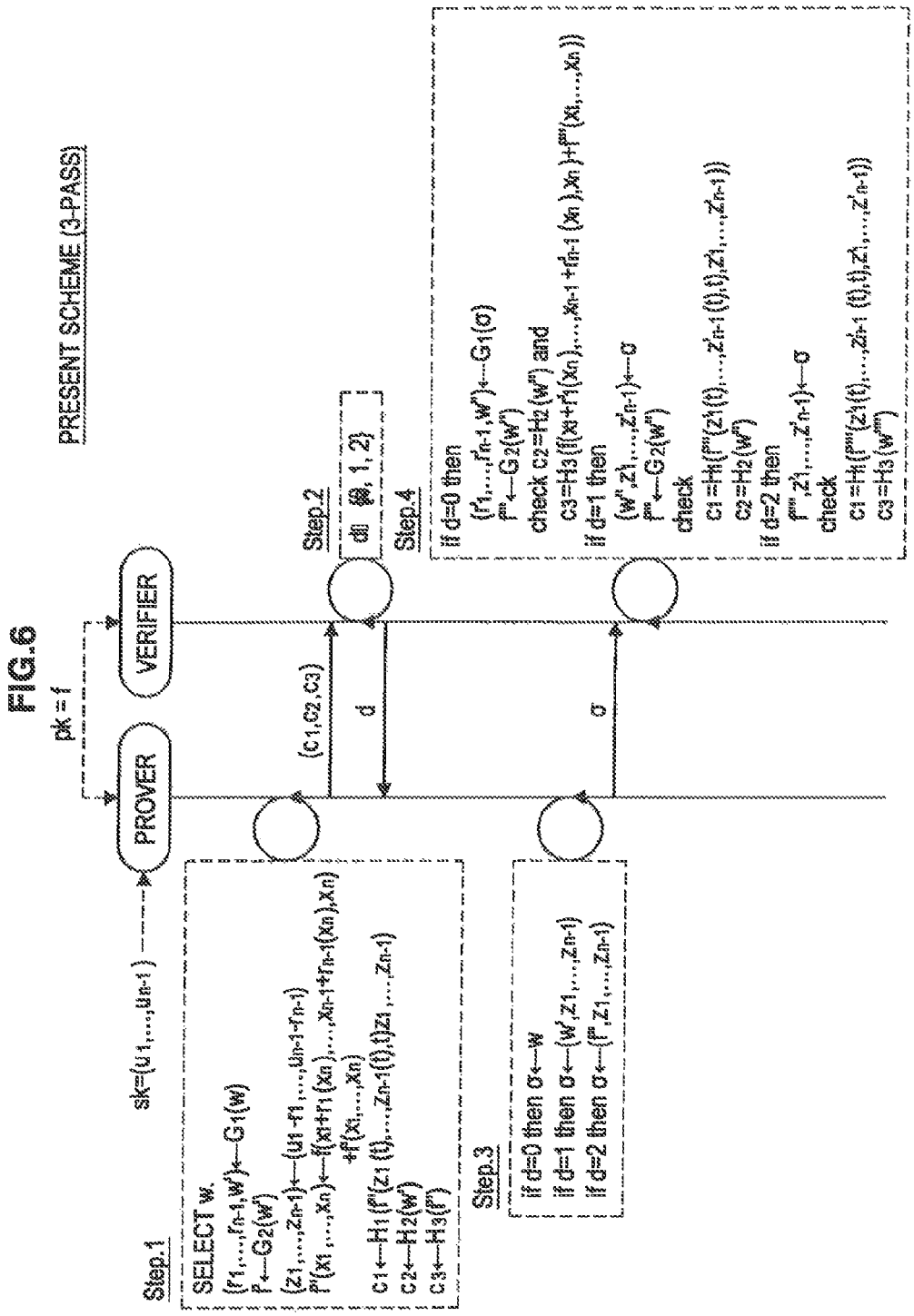
FIG. 6 is an explanatory diagram for describing an algorithm for a public key authentication scheme according to a first embodiment (3-pass) of the present invention.

Next, an algorithm for a public key authentication scheme according to a first embodiment (3-pass) of the present invention will be described with reference to FIG. 6. Then, an extended algorithm for the public key authentication scheme according to the embodiment will be described with reference to FIG. 7. Then, a parallel algorithm for the public key authentication scheme according to the embodiment will be described with reference to FIG. 8. Then, a non-interactive algorithm for the public key authentication scheme according to the embodiment will be described with reference to FIG. 9. Then, a concrete algorithm for the public key authentication scheme according to the embodiment will be described with reference to FIG. 10.

Figure 11:
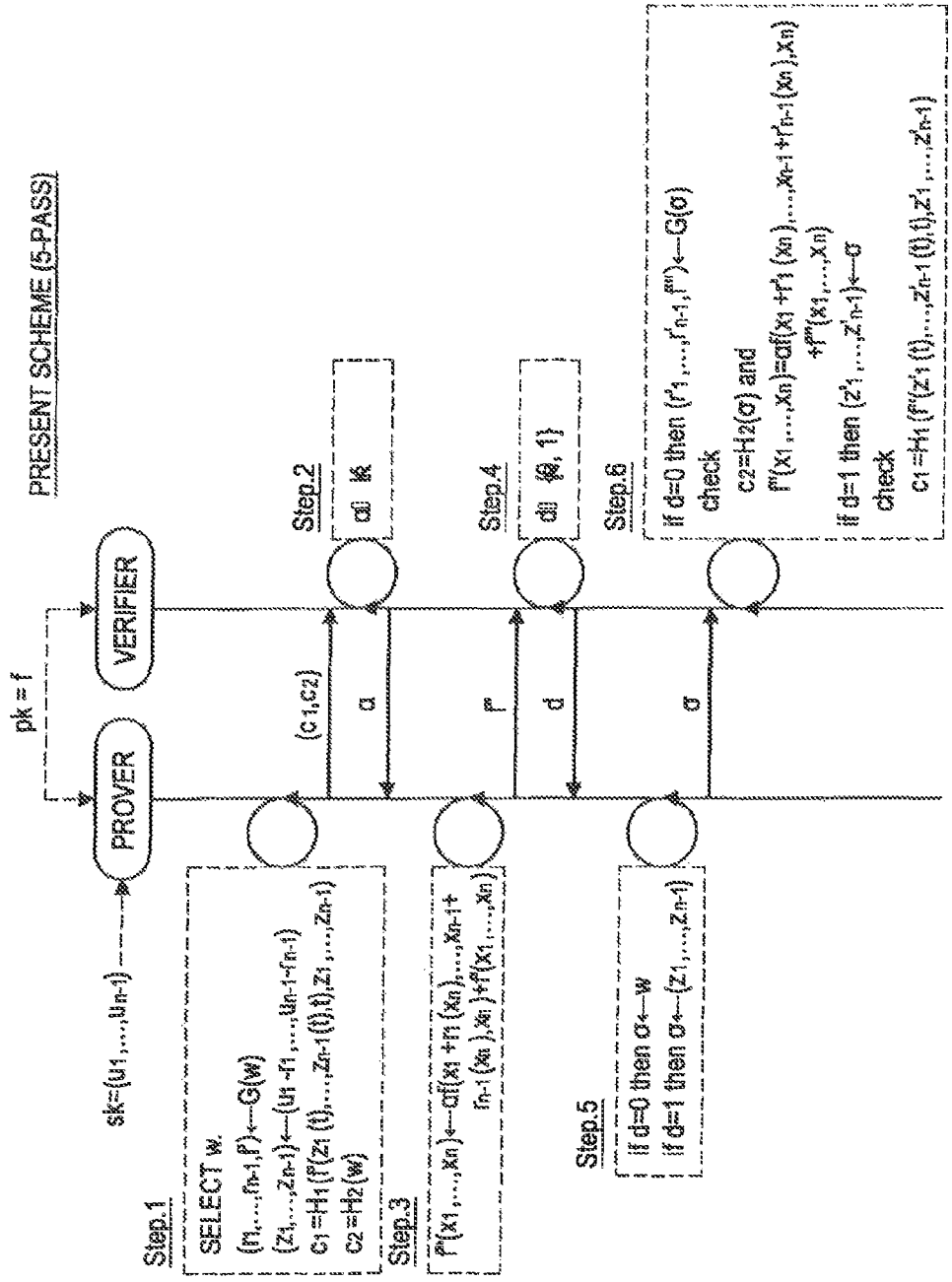
FIG. 11 is an explanatory diagram for describing an algorithm for a public key authentication scheme according to a second embodiment (5-pass) of the present invention.

Next, an algorithm for a public key authentication scheme according to a second embodiment (5-pass) of the present invention will be described with reference to FIG. 11. Then, an extended algorithm for the public key authentication scheme according to the embodiment will be described with reference to FIG. 12. Then, a parallel algorithm for the public key authentication scheme according to the embodiment will be described with reference to FIGS. 13 and 14. Then, a non-interactive algorithm for the public key authentication scheme according to the embodiment will be described with reference to FIG. 15. Then, a concrete algorithm for the public key authentication scheme according to the embodiment will be described with reference to FIG. 16.

Next, an example hardware configuration of an information processing apparatus capable of performing each algorithm of the first and second embodiments of the present invention will be described with reference to FIG. 17. Lastly, the technical ideas of the embodiments will be summarized and effects obtained by the technical ideas will be briefly described.

(Description Items)

1: Introduction
   1-1: Algorithm Structure of Public Key Authentication Scheme
   1-2: Algorithm Structure of Digital Signature Scheme
   1-3: N-Pass Public Key Authentication Scheme
   1-4: ASS-CC-IP Public Key Authentication Scheme
   1-4-1: ASS-CC Digital Signature Scheme
   1-4-2: ASS-CC-IP Public Key Authentication Scheme
2: First Embodiment
   2-1: Algorithm for Public Key Authentication Scheme
   2-2: Extended Algorithm
   2-3: Parallel Algorithm
   2-4: Non-Interactive Algorithm
   2-5: Modification into Digital Signature Scheme
   2-6: Concrete Example
3: Second Embodiment
   3-1: Algorithm for Public Key Authentication Scheme
   3-2: Extended Algorithm
   3-3: Parallel Algorithm
   3-4: Non-Interactive Algorithm
   3-5: Modification into Digital Signature Scheme
   3-6: Concrete Example
4: Example Hardware Configuration
5: Summary 1: Introduction First, before describing the embodiments of the present invention in detail, an algorithm structure of a general public key authentication scheme, an algorithm structure of a general digital signature scheme, an n-pass public key authentication scheme, and an ASS-CC-IP public key authentication scheme will be briefly described.

[1-1: Algorithm Structure of Public Key Authentication Scheme]

First, an algorithm structure of a general public key authentication scheme will be described with reference to FIG. 1. FIG. 1 is an explanatory diagram for describing an algorithm structure of a general public key authentication scheme.

(Overview)

A public key authentication scheme is an authentication scheme where a person (prover) convinces another person (verifier) that she is the prover herself by using a public key pk and a secret key sk. For example, a public key $pk_A$ of a prover A is made known to the verifier. On the other hand, a secret key $sk_A$ of the prover A is secretly managed by the prover. According to the public key authentication scheme, a person who knows the secret key $sk_A$ corresponding to the public key $pk_A$ is regarded as the prover A herself.

In the case the prover A attempts to prove to a verifier B that she is the prover herself, the prover A can perform an interactive protocol with the verifier B and prove that she knows the secret key $sk_A$ corresponding to the public key $pk_A$. Then, in the case it is proved by the verifier B, by the interactive protocol, that the prover A knows the secret key $sk_A$, the legitimacy of the prover A (that she is the prover herself) is proved.

Additionally, to ensure security of the public key authentication scheme, two conditions set forth below are to be satisfied.

The first condition is to lower as much as possible the probability of falsification being established, at the time the interactive protocol is performed, by a falsifier not having the secret key sk. That this first condition is satisfied is called "soundness." In other words, with a sound interactive protocol, falsification is not established by a falsifier not having the secret key sk with a non-negligible probability. The second condition is that, even if the interactive protocol is performed, information on the secret key $sk_A$ of the prover A is not at all leaked to the verifier B. That this second condition is satisfied is called "zero knowledge."

The security of the public key authentication scheme is ensured by using an interactive protocol having the soundness and zero knowledge as described above.

(Model)

In a model of the public key authentication scheme, two entities, namely a prover and a verifier, are present, as shown in FIG. 1. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public key authentication scheme is configured from two entities, namely the prover and the verifier, and three algorithms, namely the key generation algorithm Gen, the prover algorithm P and the verifier algorithm V.

Additionally, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus. The hardware configuration of these information processing apparatuses is as shown in FIG. 17, for example. That is, the key generation algorithm Gen, the prover algorithm P, and the verifier algorithm V are performed by a CPU 902 based on a program recorded on a ROM 904, a RAM 906, a storage unit 920, a removable recording medium 928, or the like.

(Key Generation Algorithm Gen)

The key generation algorithm Gen is used by a prover. The key generation algorithm Gen is an algorithm for generating a pair of public key pk and secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk that is secretly managed is used to prove to the verifier of possession of the secret key sk corresponding to the public key pk. Formally, the key generation algorithm Gen is represented as formula (1) below as an algorithm that takes security parameter $1^\lambda$ ($\lambda$ is an integer of 0 or more) as an input and outputs the secret key sk and the public key pk.

[Expression 1]

$$(sk, pk) \leftarrow \text{Gen}(1^\lambda) \qquad (1)$$

(Prover Algorithm P)

The prover algorithm P is used by a prover. The prover algorithm P is an algorithm for proving possession of the secret key sk corresponding to the public key pk. The prover algorithm P is defined as an algorithm that takes the public key pk and the secret key sk of a prover as inputs and performs the interactive protocol with a verifier.

(Verifier Algorithm V)

The verifier algorithm V is used by a verifier. The verifier algorithm V is an algorithm for verifying, in the interactive protocol, whether or not a prover possesses the secret key sk corresponding to the public key pk. The verifier algorithm V is defined as an algorithm that takes the public key pk of a prover as an input, and that outputs 0 or 1 (1 bit) after performing the interactive protocol with the prover. Moreover, in the case of output 0, the prover is assumed to be illegitimate, and in the case of output 1, the prover is assumed to be legitimate. Formally, the verifier algorithm V is represented as formula (2) below.

[Expression 2]

$$0/1 \leftarrow V(pk, m, \sigma) \qquad (2)$$

(Supplement)

As described above, the public key authentication scheme has to satisfy two conditions, i.e. soundness and zero knowledge, to ensure security. However, in order to make a prover prove that she possesses the secret key sk, it is necessary that the prover perform a procedure dependent of the secret key sk, notify the verifier of the result and make the verifier perform verification based on the notified contents. Execution of the procedure dependent on the secret key sk is necessary to guarantee the soundness. On the other hand, it is necessary that information on the secret key sk is not at all leaked to the verifier even when the result of the procedure is notified to the verifier. Accordingly, it is necessary that the key generation algorithm Gen, the prover algorithm P, and the verifier algorithm V are designed so as to satisfy these terms.

In the foregoing, the algorithm structure of a general public key authentication scheme has been described.

[1-2: Algorithm Structure of Digital Signature Scheme]

Figure 2:
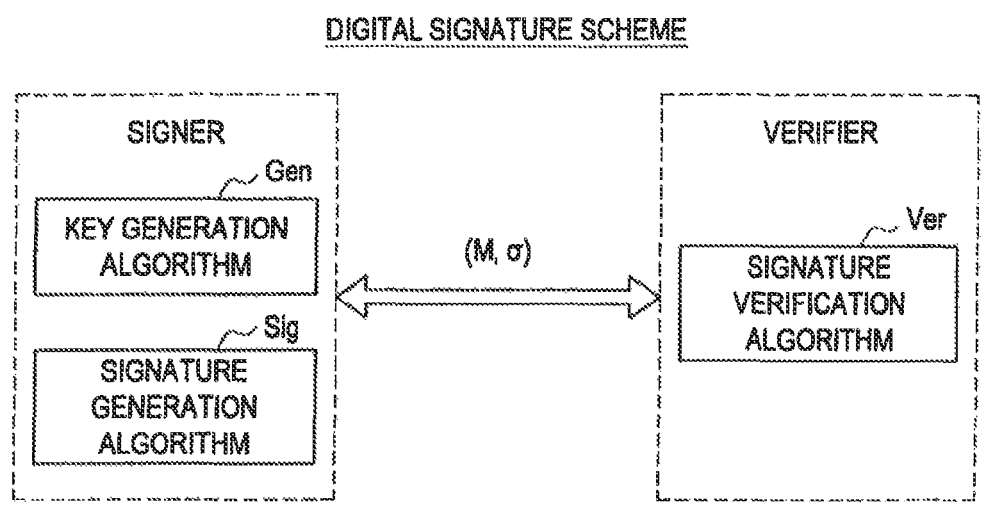
FIG. 2 is an explanatory diagram for describing an algorithm structure of a digital signature scheme.

Next, an algorithm structure of a general digital signature scheme will be described with reference to FIG. 2. FIG. 2 is an explanatory diagram for describing an algorithm structure of a general digital signature scheme.

(Overview)

Unlike a paper document, it is not possible to seal or sign digitised data. Thus, to prove the legitimacy of the author of digitised data, an electronic mechanism that produces an effect equal to sealing or signing a paper document becomes necessary. This mechanism is the digital signature. For example, a mechanism of providing signature data that only the author of data knows to a receiver in association with the data and verifying the signature data on the receiver side is called the digital signature scheme.

(Model)

In a model of the digital signature scheme, two entities, namely a signer and a verifier, are present, as shown in FIG. 2. Also, the model of the digital signature scheme is configured from three algorithms, namely a key generation algorithm Gen, a signature generation algorithm Sig, and a signature verification algorithm Ver.

The signer generates a pair of verification key pk and signature key sk unique to the signer by using the key generation algorithm Gen. Also, the signer generates a digital signature σ that is to be added to a document M, by using the signature generation algorithm Sig. That is, the signer is an entity that adds a digital signature to the document M. On the other hand, the verifier verifies the digital signature a that is added to the document M, by using the signature verification algorithm Ver. That is, the verifier is an entity that verifies the digital signature a to check whether the author of the document M is the signer or not.

Additionally, expressions "signer" and "verifier" are used in the following description, but these expressions strictly mean entities. Therefore, the subject that performs the key generation algorithm Gen and the signature generation algorithm Sig is an information processing apparatus corresponding to the entity "signer". Similarly, the subject that performs the signature verification algorithm Ver is an information processing apparatus. The hardware configuration of these information processing apparatuses is as shown in FIG. 17, for example. That is, the key generation algorithm Gen, the signature generation algorithm Sig, and the signature verification algorithm Ver are performed by a CPU 902 based on a program recorded on a ROM 904, a RAM 906, a storage unit 920, a removable recording medium 928, or the like.

(Key Generation Algorithm Gen)

The key generation algorithm Gen is used by a signer. The key generation algorithm Gen is an algorithm for generating a pair of verification key pk and signature key sk unique to the signer. The verification key pk generated by the key generation algorithm Gen is published. On the other hand, the signature key sk generated by the key generation algorithm Gen is secretly managed by the signer. The signature key sk that is secretly managed by the signer is used to generate the digital signature a to be added to the document M. Formally, the key generation algorithm Gen is represented as formula (3) below as an algorithm that takes security parameter $1^\lambda$ ($\lambda$ is an integer of 0 or more) as an input and outputs a secret key sk and a public key pk.

[Expression 3]

$$(sk, pk) \leftarrow \text{Gen}(1^\lambda) \qquad (3)$$

(Signature Generation Algorithm Sig)

The signature generation algorithm Sig is used by a signer. The signature generation algorithm Sig is an algorithm for generating the digital signature σ to be added to the document M. Formally, the signature generation algorithm Sig is represented as formula (4) below as an algorithm that takes the document M and the signature key sk of a signer as inputs and outputs the digital signature σ.

[Expression 4]

$$\sigma \leftarrow \text{Sig}(sk, M) \qquad (4)$$

(Signature Verification Algorithm Ver)

The signature verification algorithm Ver is used by a verifier. The signature verification algorithm Ver is an algorithm for verifying whether or not the digital signature σ is a valid digital signature of the document M. Formally, the signature verification algorithm Ver is represented as formula (5) below as an algorithm that takes the verification key pk, the document M, and the digital signature a of a signer as inputs and outputs 0 or 1 (1 bit). Moreover, in the case 0 is output (in the case the public key pk denies the document M and the digital signature σ), the digital signature a of the document M is invalid. In the case 1 is output (in the case the public key pk accepts the document M and the digital signature σ), the digital signature a of the document M is valid.

[Expression 5]

$$0/1 \leftarrow \text{Ver}(pk, M, \sigma) \qquad (5)$$

In the foregoing, the algorithm structure of a general digital signature scheme has been described.

[1-3: N-Pass Public Key Authentication Scheme]

Figure 3:
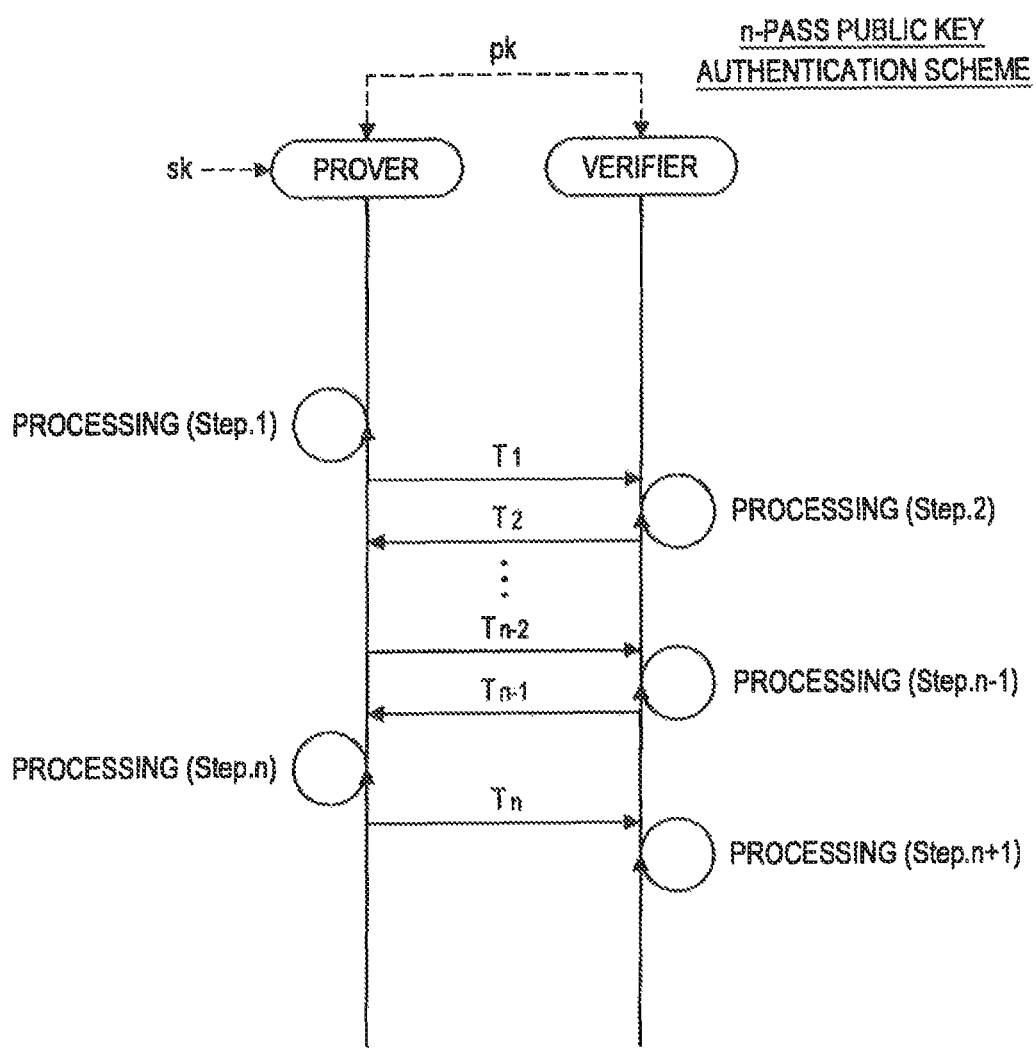
FIG. 3 is an explanatory diagram for describing an n-pass public key authentication scheme.

Next, an n-pass public key authentication scheme will be described with reference to FIG. 3. FIG. 3 is an explanatory diagram for describing an n-pass public key authentication scheme.

As described above, the public key authentication scheme is an authentication scheme for proving to a verifier, in an interactive protocol, that a prover possesses a secret key sk corresponding to a public key pk. Moreover, to guarantee the security of the public key authentication scheme, two conditions, namely soundness and zero knowledge, have to be satisfied. Accordingly, as shown in FIG. 3, in the interactive protocol, information exchange is performed n times between the prover and the verifier while execution of processes is being performed by both prover and verifier.

In the case of the n-pass public key authentication scheme, a process (Step 1) is performed by the prover using the prover algorithm P, and information $T_1$ is transmitted to the verifier. Next, a process (Step 2) is performed by the verifier using the verifier algorithm V, and information $T_2$ is transmitted to the prover. Processes (Steps 3, ..., n) are performed in the similar manner and pieces of information $T_3, \ldots, T_n$ are transmitted, and a process (Step n+1) is performed. Such public key authentication scheme based on an interactive protocol where pieces of information are transmitted/received n times is called the "n-pass" public key authentication scheme.

In the foregoing, the n-pass public key authentication scheme has been described.

[1-4: ASS-CC-IP Public Key Authentication Scheme]

Next, an example of a public key authentication scheme that takes a section-finding problem on an algebraic surface as a basis for security will be described. The section-finding problem is a problem of obtaining, when a multi-order polynomial of n variables $f(x_1, \ldots, x_n)$ defined on a ring K is given, multi-order polynomials of one variable $s_1(t), \ldots, s_{n-1}(t)$ on the ring K for which $f(s_1(t), \ldots, s_{n-1}(t), t) = 0$.

(1-4-1: ASS-CC Digital Signature Scheme)

As a digital signature scheme that takes the section-finding problem on an algebraic surface as a basis for security, an ASS-CC digital signature scheme is known (see Komano, et al.). The ASS-CC digital signature scheme is not a public key authentication scheme, but considering the relevance of the digital signature scheme and the public key authentication scheme, a public key authentication scheme that takes the section-finding problem on an algebraic surface as a basis for security can be structured from the ASS-CC digital signature scheme as will be described later. Accordingly, first, the ASS-CC digital signature scheme will be described.

The ASS-CC digital signature scheme is configured from a key generation algorithm Gen, a signature generation algorithm Sig, and a signature verification algorithm Ver described below.

(Key Generation Algorithm Gen)

The key generation algorithm Gen performs Step 1 and Step 2 below and generates a signature key $(u_x(t), u_y(t), t)$ and a verification key $X(x, y, t)$.

Step 1:

The key generation algorithm Gen generates functions $u_x(t)$, $u_y(t)$ and $c_{i,j}(t)$ (where $(i, j) \in \Lambda \setminus \{0, 0\}$). Here, $\Lambda$ is an index set of positive integers.

Step 2:

The key generation algorithm Gen calculates $c_{0,0} \leftarrow \Sigma_{(i,j) \in \Lambda \setminus \{0,0\}} c_{i,j}(t) u_x(t)^i u_y(t)^j$. Then, the key generation algorithm Gen generates the signature key $(u_x(t), u_y(t), t)$ and a verification key $X(x,y,t) = \Sigma_{(i,j) \in \Lambda} c_{i,j}(t) x(t)^i y(t)^j$. Here, $X(u_x(t), u_y(t), t) = \Sigma_{(i,j) \in \Lambda \setminus \{0,0\}} c_{i,j}(t) u_x(t)^i u_y(t)^j = 0$ is satisfied.

(Signature Generation Algorithm Sig)

The signature generation algorithm Sig first takes the signature key $(u_x(t), u_y(t), t)$ and a document M as inputs and performs Step 1 to Step 4 below for i=1 to n.

Step 1:

The signature generation algorithm Sig selects $S_i \in_R \{0, 1\}^\lambda$, and calculates $X_i'(x,y,t) \leftarrow H(S_i)$. The $H(\ldots)$ here is a hash function. The hash function H is a function for generating a numerical value within a specific range from a bit string $s \in \{0, 1\}^*$. A value obtained by inputting an arbitrary bit string to the hash function H is called a hash value (hereinafter referred to as the same).

Step 2:

The signature generation algorithm Sig selects a section $(r_{i,x}(t), r_{i,y}(t))$, and calculates $X_i''(x,y,t) \leftarrow X_i(x-r_{i,x}(t), y-r_{i,y}(t), t) + X_i'(x,y,t)$.

Step 3:

The signature generation algorithm Sig calculates $(z_{i,x}(t), z_{i,y}(t)) \leftarrow (u_{i,x}(t) + r_{i,x}(t), u_{i,y}(t) + r_{i,y}(t))$.

Step 4:

The signature generation algorithm Sig calculates $v_i(t) \leftarrow H(X_i'(z_{i,x}(t), z_{i,y}(t), t), z_{i,x}(t), z_{i,y}(t))$.

Step 5:

After performing Step 1 to Step 4 above for i=1 to n, the signature generation algorithm Sig calculates $d = (d_1, \ldots, d_n) \leftarrow H(M, X_1''(x,y,t), v_1(t), \ldots, X_n''(x,y,t), v_n(t))$.

Next, the signature generation algorithm Sig performs Step 6 below for i=1 to n.

Step 6:

If $d_i = 0$, the signature generation algorithm Sig calculates $\sigma_i \leftarrow (S_i, r_{i,x}(t), r_{i,y}(t))$. On the other hand, if $d_i = 1$, the signature generation algorithm Sig calculates $\sigma_i \leftarrow (0, z_{i,x}(t), z_{i,y}(t))$.

Step 7:

Then, the signature generation algorithm Sig outputs a digital signature $\sigma = (X_1''(x, y, t), v_1(t), \ldots, X_n''(x, y, t), v_n(t), \sigma_1, \ldots, \sigma_n)$.

(Signature Verification Algorithm Ver)

The signature verification algorithm Ver takes the digital signature $\sigma$ and the document M as inputs, and performs Step 1 to Step 3 below.

Step 1:

The signature verification algorithm Ver calculates $d = (d_1, \ldots, d_n) \leftarrow H(M, X_1''(x,y,t), \ldots, X_n''(x,y,t), v_n(t))$.

Next, the signature verification algorithm Ver performs Step 2 below for i=1 to n.

Step 2:

If $d_i = 0$, the signature verification algorithm Ver divides $\sigma_i$ into $(S_i, r_{i,x}(t), r_{i,y}(t))$. Next, the signature verification algorithm Vet calculates $X_i'(x,y,t) \leftarrow H(S_i)$. Then, the signature verification algorithm Ver verifies whether the equality $X_i''(x,y,t) = X_i(x-r_{i,x}(t), y-r_{i,y}(t), t) + X_i'(x,y,t)$ holds true or not. On the other hand, if $d_i = 1$, the signature verification algorithm Ver divides $\sigma_i$ into $(0, z_{i,x}(t), z_{i,y}(t))$. Then, the signature verification algorithm verifies whether the equality $v_i = H(X_i''(z_{i,x}(t), z_{i,y}(t), t), z_{i,x}(t), z_{i,y}(t))$ holds true or not.

Step 3:

After performing Step 2 above for i=1 to n, the signature verification algorithm Ver checks whether or not the verification of Step 2 was passed for all of i=1 to n. Then, the signature verification algorithm Ver accepts the digital signature $\sigma$ (outputs 1) in the case the verification of Step 2 was passed for all of i=1 to n, and denies the digital signature $\sigma$ (outputs 0) in the case the verification was not passed for even one.

(Possibility of Falsification of Digital Signature)

The ASS-CC digital signature scheme is configured from the key generation algorithm Gen, the signature generation algorithm Sig, and the signature verification algorithm Ver described above. The ASS-CC digital signature scheme is a digital signature scheme that is highly resistant to tampering using a quantum computer in that it takes the section-finding problem on an algebraic surface as a basis for security. However, a forgery algorithm (hereinafter, signature forgery algorithm) for a digital signature of the ASS-CC digital signature scheme was found by the inventors of the present application.

(Forgery Algorithm of Digital Signature of ASS-CC Digital Signature Scheme)

The signature forgery algorithm is an algorithm that takes only a document M as input and that forges a digital signature $\sigma$. First, the signature forgery algorithm performs Step 1 to Step 3 below for i=1 to n.

Step 1:

The signature forgery algorithm selects $S_i \in_R \{0,1\}^\lambda$, and calculates $X_i'(x,y,t) \leftarrow H(S_i)$.

Step 2:

The signature forgery algorithm selects a section $(r_{i,x}(t), r_{i,y}(t))$, and calculates $X_i''(x,y,t) \leftarrow X_i(x-r_{i,x}(t), y-r_{i,y}(t), t) + X_i'(x,y,t)$.

Step 3:

The signature forgery algorithm selects a section $(z_{i,x}(t), z_{i,y}(t))$, and calculates $v_i \leftarrow H(X_i''(z_{i,x}(t), z_{i,y}(t), t), z_{i,x}(t), z_{i,y}(t))$.

Step 4:

After performing Steps 1 to 3 above for i=1 to n, the signature forgery algorithm calculates $d = (d_1, \ldots, d_n) \leftarrow H(M, X_1''(x,y,t), v_1(t), \ldots, X_n''(x,y,t), v_n(t))$.

Next, the signature forgery algorithm performs Step 5 below for i=1 to n.

Step 5:

If $d_i = 0$, the signature forgery algorithm calculates $\sigma_i \leftarrow (S_i, r_{i,x}(t), r_{i,y}(t))$. On the other hand, if $d_i = 1$, the signature forgery algorithm calculates $\sigma_i \leftarrow (0, z_{i,x}(t) z_{i,y}(t))$.

Step 6:

Then, the signature forgery algorithm outputs a digital signature $\sigma = (X_1''(x, y, t), v_1(t), \ldots, X_n''(x, y, t), v_n(t), \sigma_1, \ldots, \sigma_n)$.

The foregoing is the contents of the signature forgery algorithm. One difference between the signature forgery algorithm and the signature generation algorithm Sig of the ASS-CC digital signature scheme lies in the generation method of $(z_{i,x}(t), z_{i,y}(t))$. While the signature generation algorithm Sig generates $(z_{i,x}(t), z_{i,y}(t))$ from the signature key $(u_x(t), u_y(t), t)$, the signature forgery algorithm does not use the signature key $(u_x(t), u_y(t), t)$.

Furthermore, another difference between the signature forgery algorithm and the signature generation algorithm Sig of the ASS-CC digital signature scheme lies in the calculation method of $v_i$. While the signature generation algorithm Sig uses $X_i'(z_{i,x}(t), z_{i,y}(t), t)$, the signature forgery algorithm uses $X_i''(z_{i,x}(t), z_{i,y}(t), t)$. That is, if $v_i$ is set as in the signature forgery algorithm above, it is possible to generate a digital signature a that passes verification without using the signature key $(u_x(t), u_y(t), t)$.

In the foregoing, the signature forgery algorithm for the ASS-CC digital signature scheme has been described. Due to the existence of such signature forgery algorithm, it can be said that the ASS-CC digital signature scheme does not operate safely. Such issue regarding security will continue to exist in the case of modification of the ASS-CC digital signature scheme to a public key authentication scheme.

(1-4-2: ASS-CC-IP Public Key Authentication Scheme)

Figure 4:
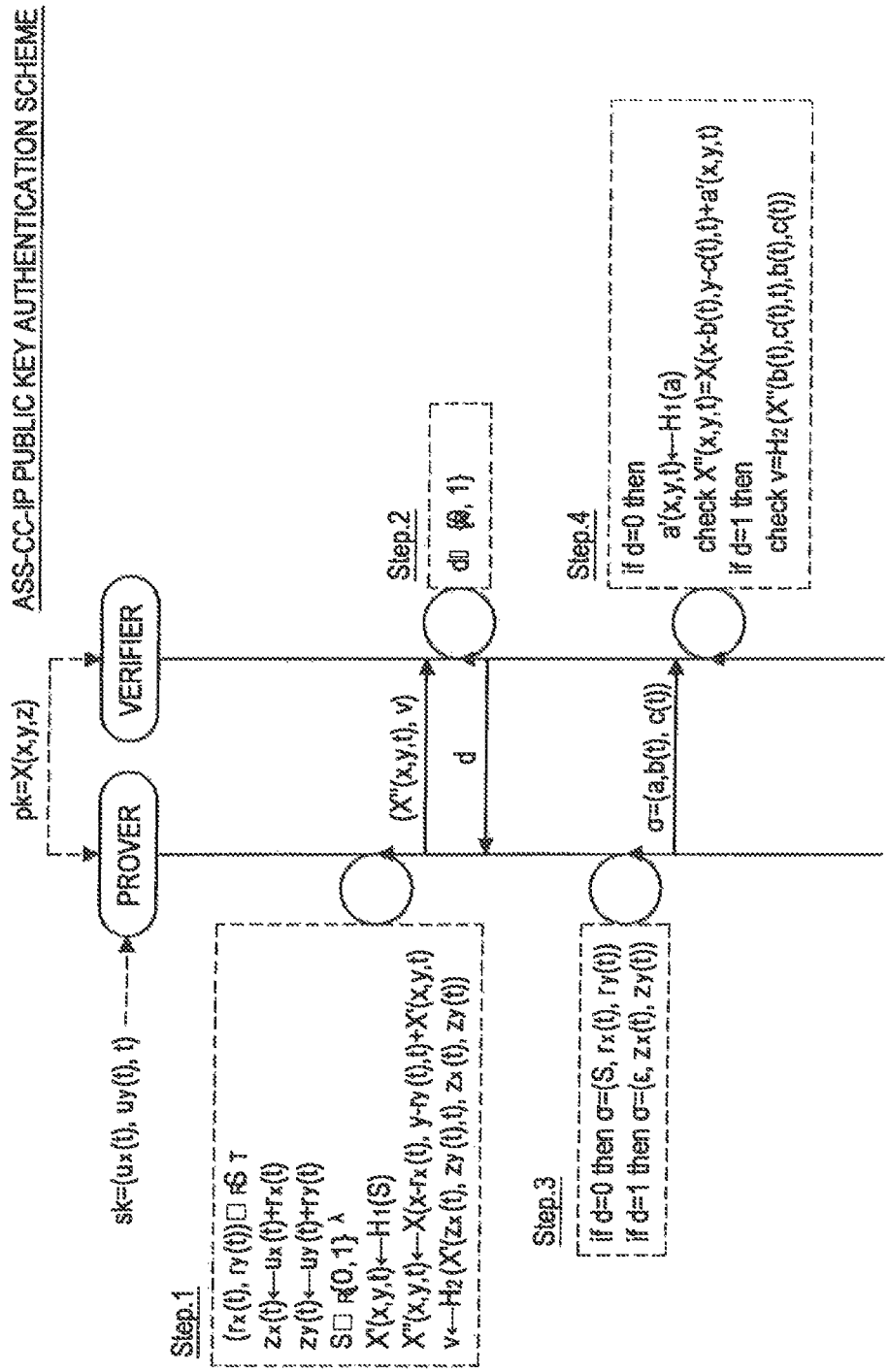
FIG. 4 is an explanatory diagram for describing an algorithm for an ASS-CC-IP public key authentication scheme.

The algorithm of the ASS-CC digital signature scheme can be modified to an interactive protocol of a public key authentication scheme as shown in FIG. 4 (hereinafter, ASS-CC-IP public key authentication scheme). Additionally, the ASS-CC-IP public key authentication scheme shown in FIG. 4 is not disclosed in Komano, et al. The interactive protocol of the ASS-CC-IP public key authentication scheme shown in FIG. 4 will be described here. FIG. 4 is an explanatory diagram for describing the interactive protocol of the ASS-CC-IP public key authentication scheme.

As shown in FIG. 4, a public key pk=X(x, y, z) is shared between a prover and a verifier. Also, the prover holds a secret key $sk=(u_x(y), u_y(y), t)$. Additionally, the generation methods of the secret key sk and the public key pk are the same as the generation methods of the signature key sk and the verification key pk of the ASS-CC digital signature scheme.

Step 1:

First, the prover algorithm P calculates $(r_x(t), r_y(t)) \in_R S_T$. The $S_T$ here is a group of whole sets of polynomials expressing sections on an algebraic surface. Next, the prover algorithm P calculates $z_x(t) \leftarrow u_x(t) + r_x(t)$ and $z_y(t) \leftarrow u_y(t) + r_y(t)$. Then, the prover algorithm P selects $S \in_R \{0,1\}^\lambda$, and calculates $X'(x,y,t) \leftarrow H_1(S)$.

Step 1 (Continued):

Next, the prover algorithm P calculates $X''(x,y,t) \leftarrow X(x-r_x(t), y-r_y(t), t) + X'(x,y,t)$. Then, the prover algorithm P calculates $v \leftarrow H_2(X'(z_x(t), z_y(t), t), z_x(t), z_y(t))$. Additionally, $H_1$ and $H_2$ are hash functions. Then, the prover algorithm P sends $(X''(x,y,t), v)$ to a verifier.

Step 2:

The verifier algorithm V selects $d \in_R \{0,1\}$. Then, the verifier algorithm V sends the d to the prover.

Step 3:

If d=0, the prover algorithm P calculates the digital signature $\sigma = (S, r_x(t), r_y(t))$. On the other hand, if d=1, the prover algorithm P calculates the digital signature $\sigma = (\epsilon, z_x(t), z_y(t))$. Then, the prover algorithm P sends the digital signature a to the verifier. Additionally, σ will be represented as (a, b(t), c(t)). That is, if d=0, then a=S, $b(t)=r_x(t)$, and $c(t)=r_y(t)$; and if d=1, then a=ϵ, $b(t)=z_x(t)$, $c(t)=z_y(t)$.

Step 4:

If d=0, the verifier algorithm V calculates $a'(x,y,t) \leftarrow H_1(a)$. Then, the verifier algorithm V verifies whether the equality $X''(x,y,t) = X(x-b(t), y-c(t), t) + a'(x,y,t)$ holds true or not. On the other hand, if d=1, the verifier algorithm V verifies whether the equality $v=H_2(X''(b(t), c(t), t), b(t), c(t))$ holds true or not.

Step 5:

The verifier algorithm V outputs 1 indicating authentication success in the case verification of Step 4 was successful, and outputs 0 indicating authentication failure in the case the verification has failed.

As described above, the ASS-CC digital signature scheme can be modified to the public key authentication scheme. However, the ASS-CC-IP public key authentication scheme contains the same security issue as the ASS-CC digital signature scheme. That is, with the ASS-CC-IP public key authentication scheme, there is a possibility of falsification by a falsifier not holding the secret key sk. Accordingly, a falsification method of the ASS-CC-IP public key authentication scheme will be described with reference to FIG. 5.

(Falsification Method of ASS-CC-IP Public Key Authentication Scheme)

Figure 5:
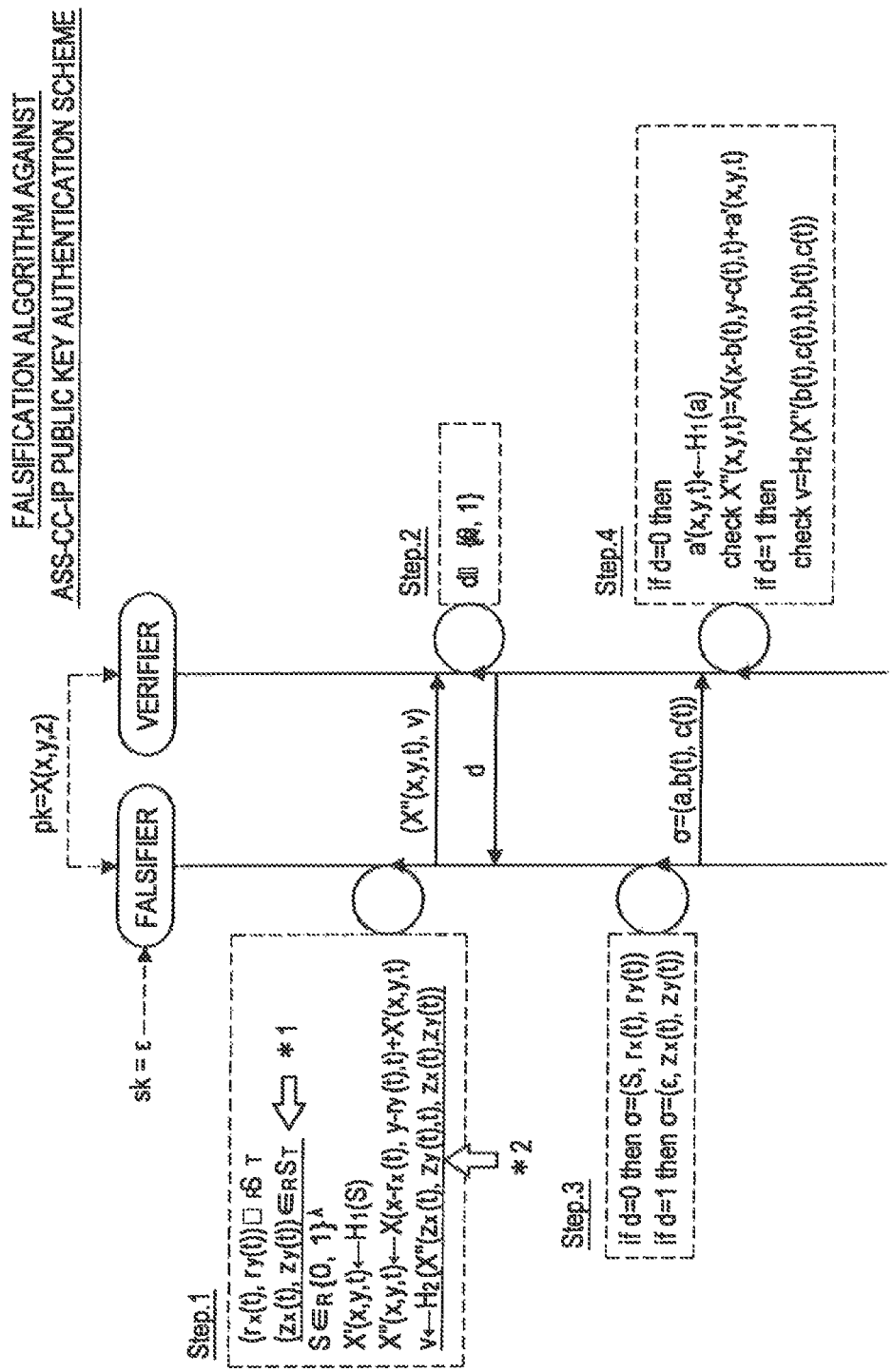
FIG. 5 is an explanatory diagram for describing a falsification algorithm against the algorithm for the ASS-CC-IP public key authentication scheme.

The falsification method of the ASS-CC-IP public key authentication scheme has its features in the underlined portions (*1, *2) of Step 1 of FIG. 5. In the ASS-CC-IP public key authentication scheme, $z_x(t)$ and $z_y(t)$ were generated using the secret key sk. However, in the falsification method shown in FIG. 5, $z_x(t)$ and $z_y(t)$ are arbitrarily selected (*1). Also, in the ASS-CC-IP public key authentication scheme, v was generated using $X'(z_x(t), z_y(t), y)$. However, in the falsification method shown in FIG. 5, v is generated using $X''(z_x(t), z_y(t), y)$ (*2).

That is, if the falsification method shown in FIG. 5 is used, a falsifier who does not know $u_x(t)$ and $u_y(t)$ can easily perform falsification. More specifically, the ASS-CC-IP public key authentication scheme does not satisfy soundness. As ahs bee described, the security of a public key authentication scheme is not guaranteed as long as both the two conditions, soundness and zero knowledge, are satisfied. The ASS-CC-IP public key authentication scheme satisfies zero knowledge but does not satisfy soundness. Accordingly, the security is not guaranteed in the ASS-CC-IP public key authentication scheme.

Thus, a modification method for ensuring the soundness in the ASS-CC-IP public key authentication scheme will be considered. As a method for ensuring the soundness in the ASS-CC-IP public key authentication scheme, there may be considered a method of making a verifier additionally verify $v=H(X'(z_x(t), z_y(t), t), z_x(t), z_y(t))$. However, to realise this method, information on X' and information on $(z_x(t), z_y(t))$ have to be handed over to the verifier.

If the information on $(z_x(t), z_y(t))$ is handed over to the verifier in the case of d=0, the verifier who already has information on $(r_x(t), r_y(t))$ will be able to calculate the secret key sk. On the other hand, if the information on X' is handed over to the verifier in the case of d=1, the verifier who already has Information on X'' will be able to calculate the information on $(r_x(t), r_y(t))$. As a result, the verifier will be able to calculate the secret key sk from the calculated information on $(r_x(t), r_y(t))$ and the information on $(z_x(t), z_y(t))$.

Accordingly, if the method of making a verifier additionally verify $v=H(X'(z_x(t), z_y(t) \, t), z_x(t), z_y(t))$ is adopted, the soundness is ensured but the zero knowledge will be lost. As such, it is difficult to construct a public key authentication scheme that satisfies both of the two conditions, soundness and zero knowledge, by modifying the ASS-CC-IP public key authentication scheme. Accordingly, the inventors of the present application have devised a new public key authentication scheme that takes the section-finding problem on an algebraic surface as a basis for security and that satisfies the two conditions, soundness and zero knowledge. A detailed explanation will be given below.

2: First Embodiment

A first embodiment according to the present invention will be described. The present embodiment relates to a 3-pass public key authentication scheme (hereinafter, present scheme) that takes the section-finding problem on an algebraic surface as a basis for security. Additionally, a 3-pass public key authentication scheme will be taken as the example here, but the interactive protocol of the present embodiment can also be extended and be generalised for an n-pass (n≥4) public key authentication scheme.

[2-1: Algorithm for Public Key Authentication Scheme]

First, an algorithm for a public key authentication scheme according to the present scheme will be described with reference to FIG. 6. FIG. 6 is an explanatory diagram for describing an algorithm for a public key authentication scheme according to the present scheme. Additionally, the present scheme is configured from a key generation algorithm Gen, a prover algorithm P, and a verifier algorithm V. In the following, contents of each algorithm will be described.

(Key Generation Algorithm Gen)

The key generation algorithm Gen generates a multi-order polynomial of n variables $f_0(x_1, \ldots, x_n)$ defined on a ring K and multi-order polynomials of one variable $u_1(t), \ldots, u_{n-1}(t)$. Next, the key generation algorithm Gen calculates $c(t) \leftarrow f_0(u_1(t), \ldots, u_{n-1}(t), t)$. Then, the key generation algorithm Gen calculates $f(x_1, \ldots, x_n) = f_0(x_1, \ldots, x_n) - c(x_n)$, and sets f as the public key pk. Also, the key generation algorithm Gen sets $(u_1, \ldots, u_{n-1})$ as the secret key sk. Note that $f_0(u_1(t), \ldots, u_{n-1}(t), t) = 0$ is satisfied here.

(Prover Algorithm P, Verifier Algorithm V)

Next, processes by the prover algorithm P and the verifier algorithm V in an interactive protocol will be described with reference to FIG. 6. This interactive protocol is for making a verifier prove that "prover knows the $(u_1, \ldots, u_{n-1})$ that satisfies $f(u_1(t), \ldots, u_{n-1}(t), t)$," without leaking information on the $(u_1, \ldots, u_{n-1})$ at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P arbitrarily selects a number w. Then, the prover algorithm P generates polynomials of one variable $r_1(t), \ldots, r_{n-1}(t)$ and a number w' by applying the number w to a pseudo random number generator $G_1$. That is, the prover algorithm P calculates $(r_1, \ldots, r_{n-1}, w') \leftarrow G_1(w)$. Next, the prover algorithm P generates a polynomial of n variables $f'(x_1, \ldots, x_n)$ by applying the number w' to a pseudo random number generator $G_2$. That is, the prover algorithm P calculates $f' \leftarrow G_2(w')$.

Step 1 (Continued):

Next, the prover algorithm P calculates $(z_1(t), \ldots, z_{n-1}(t)) \leftarrow (u_1(t) - r_1(t), \ldots, u_{n-1}(t) - r_{n-1}(t))$. This calculation corresponds to an operation of masking the secret key $(u_1, \ldots, u_{n-1})$ by the polynomial of one variable $(r_1, \ldots, r_{n-1})$. Furthermore, the prover algorithm P calculates $f''(x_1, \ldots, x_n) \leftarrow f(x_1 + r_1(x_n), \ldots, x_{n-1} + r_{n-1}(x_n), x_n) + f'(x_1, \ldots, x_n)$. This calculation corresponds to an operation of masking a polynomial $f(x_1 + r_1(x_n), \ldots, x_{n-1} + r_{n-1}(x_n), x_n)$ for $x_1, \ldots, x_n$ by the polynomial $f'(x_1, \ldots, x_n)$.

Step 1 (Continued):

Next, the prover algorithm P generates a hash value $c_1$ of $f''(z_1(t), \ldots, z_{n-1}(t), t)$ and $z_1, \ldots, z_{n-1}$. That is, the prover algorithm P calculates $c_1 \rightarrow H_1(f''(z_1(t), \ldots, z_{n-1}(t), t), z_1, \ldots, z_{n-1})$. Also, the prover algorithm P generates a hash value $c_2$ of the number w'. That is, the prover algorithm P calculates $c_2 \rightarrow H_2(w')$. Furthermore, the prover algorithm P generates a hash value $c_3$ of the polynomial f''. That is, the prover algorithm P calculates $c_3 \leftarrow H_3(f'')$. Additionally, $H_1(\ldots)$, $H_2(\ldots)$, and $H_3(\ldots)$ described are hash functions. Also, the hash values $(c_1, c_2, c_3)$ are messages.

The messages $(c_1, c_2, c_3)$ generated in Step 1 are sent to a verifier.

Step 2:

The verifier algorithm V selects a verification pattern to be used from three verification patterns. Then, the verifier algorithm V sends to the prover a demand d∈{0,1,2} indicating the selected verification pattern.

Step 3:

The prover algorithm P generates information a to be sent back to the verifier in response to the demand d received from the verifier. If d=0, the prover algorithm P generates information σ=w. Also, if d=1, the prover algorithm P generates information σ=(w',$z_1, \ldots, z_{n-1}$). Furthermore, if d=2, the prover algorithm P generates information σ=(f'',$z_1, \ldots, z_{n-1}$). The information σ generated in this manner is sent to the verifier by the prover algorithm P.

Step 4:

The verifier algorithm V performs the following verification process by using the information a received from the prover.

If d=0, the verifier algorithm V calculates $(r'_1, \ldots, r'_{n-1}, w'') \leftarrow G_1(\sigma)$. Furthermore, the verifier algorithm V calculates $f''' \leftarrow G_2(w'')$. Then, the verifier algorithm V verifies whether the equality $c_2 = H_2(w'')$ holds true or not. Also, the verifier algorithm V verifies whether the equality $c_3 = H_3(f(x_1 + r'_1(x_n), \ldots, x_{n-1} + r'_{n-1}(x_n), x_n) + f'''(x_1, \ldots, x_n))$ holds true or not. The verifier algorithm V outputs a value 1 indicating authentication success in the case all the verifications have succeeded, and outputs a value 0 indicating authentication failure in the case a failure has occurred in the verification.

If d=1, the verifier algorithm V calculates $(w'', z'_1, \ldots, z'_{n-1}) \leftarrow \sigma$. Furthermore, the verifier algorithm V calculates $f''' \leftarrow G_2(w'')$. Then, the verifier algorithm V verifies whether the equality $c_1 = H_1(f'''(z'_1(t), \ldots, z'_{n-1}(t), t), z'_1, \ldots, z'_{n-1})$ holds true or not. Also, the verifier algorithm V verifies whether the equality $c_2 = H_2(w'')$ holds true or not. The verifier algorithm V outputs a value 1 indicating authentication success in the case all the verifications have succeeded, and outputs a value 0 indicating authentication failure in the case a failure has occurred in the verification.

If d=2, the verifier algorithm V calculates $(f'''', z'_1, \ldots, z'_{n-1}) \leftarrow \sigma$. Then, the verifier algorithm V verifies whether the equality $c_1 = H_1(f'''(z'_1(t), \ldots, z'_{n-1}(t), t), z'_1, \ldots, z'_{n-1})$ holds true or not. Also, the verifier algorithm V verifies whether the equality $c_3 = H_3(f'''')$ holds true or not. The verifier algorithm V outputs a value 1 indicating authentication success in the case all the verifications have succeeded, and outputs a value 0 indicating authentication failure in the case a failure has occurred in the verification.

(Supplement)

Moreover, note that, at the time of sending the messages $(c_1, c_2, c_3)$ generated in Step 1 described above to the verifier, information related to the secret key sk, information related to $(r_1, \ldots, r_{n-1})$ and information related to $(z_1, \ldots, z_{n-1})$ are not at all leaked to the verifier. Note also that, at the time of sending the information a generated in Step 3 described above to the verifier, information related to $z_1, \ldots, z_{n-1}$ is not at al leaked to the verifier in the case of d=0, and information related to $r_1, \ldots, r_{n-1}$ is not at all leaked to the verifier in the case of d=1, 2.

(Main Difference Between Present Scheme and ASS-CC-IP Public Key Authentication Scheme)

As has been described, in the ASS-CC-IP public key authentication scheme, the verifier demanded only two types of verification patterns. On the other hand, in the case of the present scheme, three types of verification patterns are possibly demanded by the verifier. A concrete difference is that, in the case of the ASS-CC-IP public key authentication scheme, verification that uses $f'(z_1(t), \ldots, z_{n-1}(t),t)$ that corresponds to d=1 of the present scheme is not performed.

In the case of the present scheme, verification of $c_1=H_1(f'(z_1(t), \ldots, z_{n-1}(t),t),z_1, \ldots, z_{n-1})$ and verification of $c_1=H_1(f''(z_1(t), \ldots, z_{n-1}(t),t), z_1, \ldots, z_{n-1})$ are performed in the verification pattern for d=1 and the verification pattern for d=2, and $f'(z_1(t), \ldots, z_{n-1}(t),t)=f''(z_1(t), \ldots, z_{n-1}(t),t)$ is guaranteed in the case both verifications are passed. This is the main difference between the present scheme and the ASS-CC-IP public key authentication scheme.

Additionally, simply adding the verification pattern corresponding to d=1 of the present scheme to the ASS-CC-IP public key authentication scheme will not solve the issue of security of the ASS-CC-IP public key authentication scheme. For example, even if verification of $v=H_2(X'(z_x(t),z_y(t),t),z_x(t),z_y(t))$ is added in the ASS-CC-IP public key authentication scheme, the issue of security is not solved. As shown in FIG. 4, in the case of the ASS-CC-IP public key authentication scheme, since information on X" is already transmitted in the first pass, information on $r_x(t)$ and $r_y(t)$ will be leaked if information on X' is given to the verifier to perform the additional verification, thereby causing the zero knowledge to be lost.

On the other hand, in the case of the present scheme, pieces of information on f', f", $r_1, \ldots, r_{n-1}$, and $z_1, \ldots, z_{n-1}$ are not sent to the verifier in the first pass, and only their hash value is sent to the verifier. The prover algorithm P is designed to send minimum information that is necessary for verification to the verifier in the third pass, and thus zero knowledge is guaranteed in the interactive protocol of the present scheme. Also, the present scheme provides a mechanism that prevents the random number used by the prover algorithm P in the first pass from being treated, in the third pass, as if it were another random number, by sending the hash value in the first pass. On the other hand, with the ASS-CC-IP public key authentication scheme, a hash value or information related to X' is not sent in the first pass, and thus there is a possibility that falsification is performed so as to make it seem as if another X' is used in the third pass. Such difference also lies between the present scheme and the ASS-CC-IP public key authentication scheme.

(Soundness in Present Scheme)

The soundness of the present scheme is guaranteed by that, if the prover responded, to all the demands d=0, 1, 2 from the verifier, with correct information σ for the messages ($c_1$, $c_2$, $c_3$), then f"", f''', $r'_1, \ldots, r'_{n-1}$, and $z'_1, \ldots, z'_{n-1}$ that satisfy formulae (6) and (7) below can be calculated from the responses. Additionally, this is not guaranteed in the ASS-CC-IP public key authentication scheme.

[Expression 6]

$$f''''(x_1, \Lambda, x_n) = f(x_1 + r'_1(x_n), \Lambda, x_{n-1} + r'_{n-1}(x_n), x_n) + f'''(x_1, \Lambda, x_n) \quad (6)$$

$$f''''(z'_1(t), \Lambda, z'_{n-1}(t), t) = f'''(z'_1(t), \Lambda, z'_{n-1}(t), t) \quad (7)$$

With such logic guaranteed, it is guaranteed that, as long as the section-finding problem on an algebraic surface is not solved, it is not possible to perform falsification with a probability higher than 2/3. That is, to correctly respond to all the demands d=0, 1, 2 of the verifier, the falsifier has to be able to calculate f"", f''', $r'_1, \ldots, r'_{n-1}$, and $z'_1, \ldots, z'_{n-1}$ that satisfy formulae (6) and (7) above. In other words, the falsifier has to be able to calculate ($u_1, \ldots, u_{n-1}$) that satisfies $f(u_1(t), \ldots, u_{n-1}(t),t)=0$. Moreover, the falsifier may possibly correctly respond to two, at most, of the demands d=0, 1, 2 of the verifier. Accordingly, the probability of success of falsification will be 2/3. The interactive protocol described above is performed a sufficient number of times. Therefore, the probability of success of falsification can be reduced to a negligible level.

(Modification)

Furthermore, the prover algorithm P described above uses the hash value of $f''(z_1(t), \ldots, z_{n-1}(t),t)$ and $z_1, \ldots, z_{n-1}$ as the message $c_3$. However, since $f''(z_1(t), \ldots, z_{n-1}(t),t)=f'(z_1(t), \ldots, z_{n-1}(t),t)$, the prover algorithm P may use the hash value of $f'(z_1(t), \ldots, z_{n-1}(t),t)$ and $z_1, \ldots, z_{n-1}$ as the message $c_3$. Furthermore, the prover algorithm P may separately calculate the hash value of $f''(z_1(t), \ldots, z_{n-1}(t),t)$ and the hash value of $z_1, \ldots, z_{n-1}$ and may send each to the verifier as a message.

Furthermore, the prover algorithm P described above generates the polynomials of one variable $r_1(t), \ldots, r_{n-1}(t)$ and the number w' by applying the pseudo random number generator $G_1$ to the number w. Also, the prover algorithm P described above generates the polynomial of n variables $f'(x_1, \ldots, x_n)$ by applying the number w' to the pseudo random number generator $G_2$. However, the prover algorithm P may calculate, from the start, $w=(r_1(t), \ldots, r_{n-1}(t),w')$, and the $G_1$ may be made identity mapping. Furthermore, in this case, the number w does not have to be applied to the $G_1$. Additionally, the same can be said for the $G_2$.

In the scheme described above, $c_1$, $c_2$, and $c_3$ are calculated by using the hash functions $H_1$, $H_2$, and $H_3$, but a commitment scheme COM may also be used instead of the hash function. A commitment function COM is a function that takes as arguments a character string S and a random number ρ. Examples of the commitment function include a scheme presented by Shai Halevi and Silvio Micali at the International Conference CRYPTO 1996, and the like.

In the case of using this commitment function, random numbers $\rho_1$, $\rho_2$, and $\rho_3$ are prepared before calculating $c_1$, $c_2$, and $c_3$, and $c_1$, $c_2$, and $c_3$ are generated by applying commitment functions COM(•, $\rho_1$), COM(•, $\rho_2$), and COM(•, $\rho_3$) instead of hash functions $H_1(•)$, $H_2(•)$, and $H_3(•)$. Also, in this modification, $\rho_1$ that is necessary for generating $C_i$ to be calculated by a verification unit is included in response information. Additionally, this modified scheme is applicable to all the schemes described below.

In the foregoing, a basic algorithm structure according to the present scheme has been described.

[2-2: Extended Algorithm]

Figure 7:
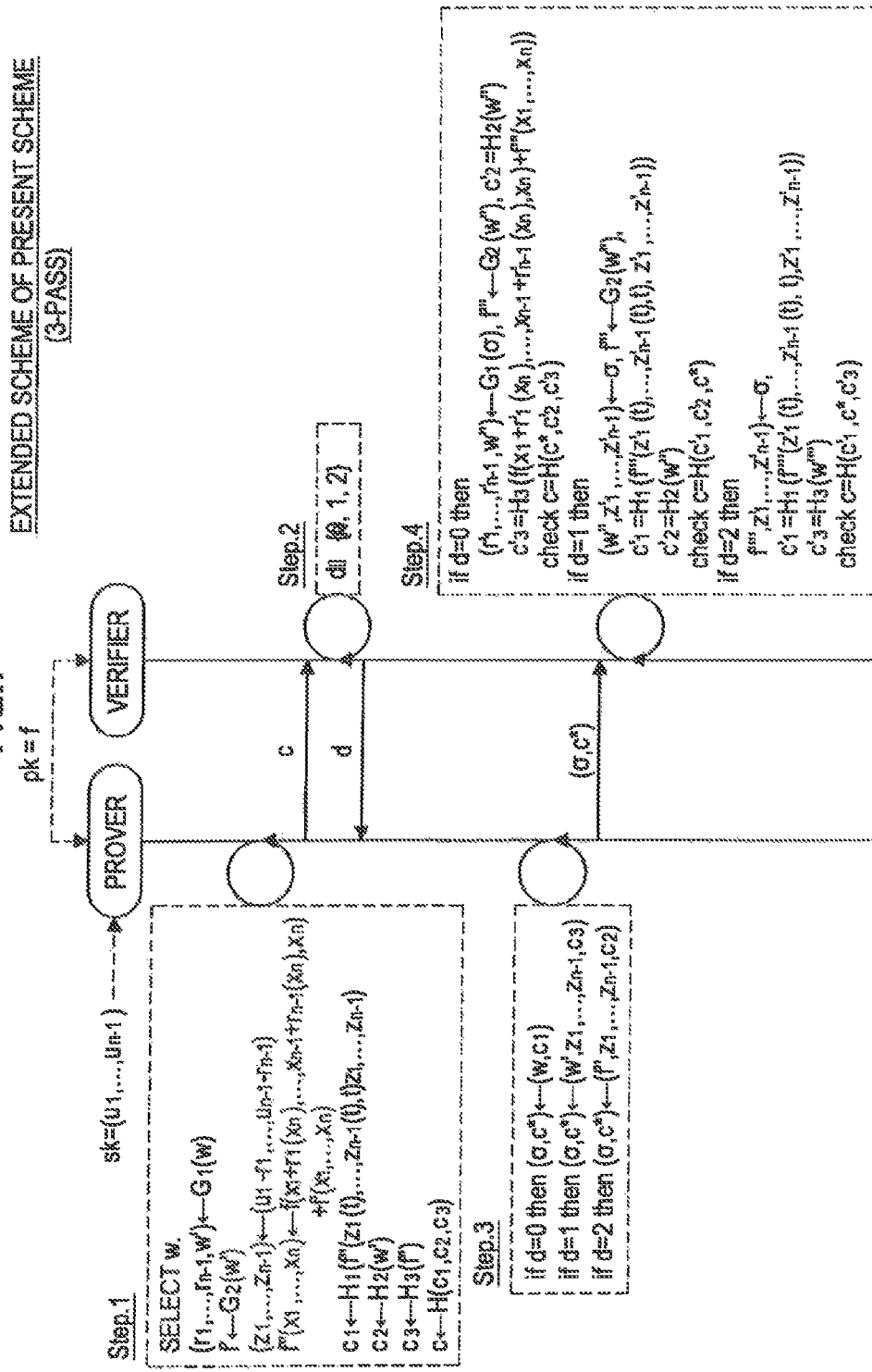
FIG. 7 is an explanatory diagram for describing an extended algorithm for the public key authentication scheme according to the embodiment.

Next, an algorithm of a public key authentication scheme which is an extension of the present scheme (hereinafter, extended scheme) will be described with reference to FIG. 7. FIG. 7 is an explanatory diagram for describing a flow of an interactive protocol based on the extended scheme. This extended scheme is a scheme of transforming messages ($c_1$, $c_2$ and $c_3$) to be sent in the first pass to one hash value c and sending the same to a verifier. Also, according to this extended scheme, the interactive protocol is configured to send the hash value c in the first pass, and thus a message that is not restored from information σ that is sent in the third pass is sent to the verifier together with the information σ. With such extension, the number of hash values to be sent to the verifier in the interactive protocol can be reduced, and the size of data to be communicated can be reduced. In the following, the contents of each algorithm of the extended scheme will be described in detail.

(Key Generation Algorithm Gen)

The key generation algorithm Gen generates a multi-order polynomial of n variables $f_0(x_1, \ldots, x_n)$ defined on a ring K and multi-order polynomials of one variable $u_1(t), \ldots, u_{n-1}(t)$. Next, the key generation algorithm Gen calculates $c(t) \leftarrow f_0(u_1$ (t), ..., $u_{n-1}$(t),t). Then, the key generation algorithm Gen calculates f($x_1$, ..., $x_n$)=$f_0$($x_1$, ..., $x_n$)−c($x_n$), and sets f as the public key pk. Also, the key generation algorithm Gen sets ($u_1$, ..., $u_{n-1}$) as the secret key sk. Note that $f_0$($u_1$(t), ..., $u_{n-1}$(t),t)=0 is satisfied here.

(Prover Algorithm P, Verifier Algorithm V)

Next, processes by the prover algorithm P and the verifier algorithm V in an interactive protocol will be described with reference to FIG. 7. This interactive protocol is for making a verifier prove that "prover knows the ($u_1$, ..., $u_{n-1}$) that satisfies f($u_1$(t), ..., $u_{n-1}$(t),t)," without leaking information on the ($u_1$, ..., $u_{n-1}$) at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P arbitrarily selects a number w. Then, the prover algorithm P generates polynomials of one variable $r_1$(t), ..., $r_{n-1}$(t) and a number w' by applying the number w to a pseudo random number generator $G_1$. That is, the prover algorithm P calculates ($r_1$, ..., $r_{n-1}$,w')←$G_1$(w). Next, the prover algorithm P generates a polynomial of n variables f'($x_1$, ..., $x_n$) by applying the number w' to a pseudo random number generator $G_2$. That is, the prover algorithm P calculates f'←$G_2$(w').

Step 1 (Continued):

Next, the prover algorithm P calculates ($z_1$(t), ..., $z_{n-1}$(t))←($u_1$(t)−$r_1$(t), ..., $u_{n-1}$(t)−$r_{n-1}$(t)). This calculation corresponds to an operation of masking the secret key ($u_1$, ..., $u_{n-1}$) by the polynomial of one variable ($r_1$, ..., $r_{n-1}$). Furthermore, the prover algorithm P calculates f''($x_1$, ..., $x_n$)←f($x_1$+$r_1$($x_n$), ..., $x_{n-1}$+$r_{n-1}$($x_n$),$x_n$)+f'($x_1$, ..., $x_n$). This calculation corresponds to an operation of masking a polynomial f($x_1$+$r_1$($x_n$), ..., $x_{n-1}$+$r_{n-1}$($x_n$), $x_n$) for $x_1$, ..., $x_n$ by polynomial f'($x_1$, ..., $x_n$).

Step 1 (Continued):

Next, the prover algorithm P generates a hash value $c_1$ of f''($z_1$(t), ..., $z_{n-1}$(t),t) and $z_1$, ..., $z_{n-1}$. That is, the prover algorithm P calculates $c_1$←$H_1$(f''($z_1$(t), ..., $z_{n-1}$(t),t,$z_1$, ... $z_{n-1}$). Also, the prover algorithm P generates a hash value $c_2$ of the number w'. That is, the prover algorithm P calculates $c_2$←$H_2$(w'). Furthermore, the prover algorithm P generates a hash value $c_3$ of the polynomial f''. That is, the prover algorithm P calculates $c_3$←$H_3$(f''). Additionally, $H_1$( ... ), $H_2$( ... ), and $H_3$( ... ) described are hash functions. Also, the hash values ($c_1$, $c_2$, $c_3$) are messages.

Step 1 (Continued):

In the case of the extended scheme, the prover algorithm P generates a hash value c by applying the messages ($c_1$, $c_2$, $c_3$) to a hash function H. Then, the prover algorithm P sends the generated hash value c to a verifier.

Step 2:

The verifier algorithm V selects a verification pattern to be used from three verification patterns. Then, the verifier algorithm V sends to the prover a demand d∈{0,1,2} indicating the selected verification pattern.

Step 3:

The prover algorithm P generates information σ to be sent back to the verifier in response to the demand d received from the verifier. If d=0, the prover algorithm P generates information (σ, c*)=(w, $c_1$). Also, if d=1, the prover algorithm P generates information (σ, c*) (w',$z_1$, ..., $z_{n-1}$,$c_3$). Furthermore, if d=2, the prover algorithm P generates information (σ, c*)=(f'',$z_1$, ..., $z_{n-1}$,$c_2$). The information (σ, c*) generated in this manner is sent to the verifier by the prover algorithm P.

Step 4:

The verifier algorithm V performs the following verification process by using the information (σ, c*) received from the prover.

If d=0, the verifier algorithm V calculates (r'$_1$, ..., r'$_{n-1}$, w'')←$G_1$(σ). Next, the verifier algorithm V calculates f'''←$G_2$(w''). Then, the verifier algorithm V calculates c'$_2$=$H_2$(w''). Then, the verifier algorithm V calculates c'$_3$=$H_3$(f($x_1$+r'$_1$($x_n$), ..., $x_{n-1}$+r'$_{n-1}$($x_n$),$x_n$)/f'''($x_1$, ..., $x_n$)). Then, the verifier algorithm V verifies whether the equality c=H(c*, c'$_2$, c'$_3$) holds true or not. The verifier algorithm V outputs a value 1 indicating authentication success in the case the verification has succeeded, and outputs a value 0 indicating authentication failure in the case the verification has failed.

If d=1, the verifier algorithm V calculates (w'',z'$_1$, ..., z'$_{n-1}$)←σ. Next, the verifier algorithm V calculates f'''←$G_2$(w''). Then, the verifier algorithm V calculates c'$_1$=$H_1$(f''(z'$_1$(t), ..., z'$_{n-1}$(t),t),z'$_1$, ..., z'$_{n-1}$)). Then, the verifier algorithm V calculates c'$_2$=$H_2$(w''). Then, the verifier algorithm V verifies whether the equality c=H(c'$_1$, c'$_2$, c*) holds true or not. The verifier algorithm V outputs a value 1 indicating authentication success in the case the verification has succeeded, and outputs a value 0 indicating authentication failure in the case the verification has failed.

If d=2, the verifier algorithm V calculates (f'''',z'$_1$, ..., z'$_{n-1}$)←σ Then, the verifier algorithm V calculates c'$_1$=$H_1$(f'' (z'$_1$(t), ..., z'$_{n-1}$(t),t),z'$_1$, ..., z'$_{n-1}$)). Then, the verifier algorithm V calculates c'$_3$=$H_3$(f''''). Then, the verifier algorithm V verifies whether the equality c=H(c'$_1$, c*, c'$_3$) holds true or not. The verifier algorithm V outputs a value 1 indicating authentication success in the case the verification has succeeded, and outputs a value 0 indicating authentication failure in the case the verification has failed.

In the foregoing, the process of each algorithm in the interactive protocol of the extended scheme has been described. With such extension, the number of hash values to be sent to the verifier in the interactive protocol can be reduced, and the size of data to be communicated can be reduced.

[2-3: Parallel Algorithm]

Figure 8:
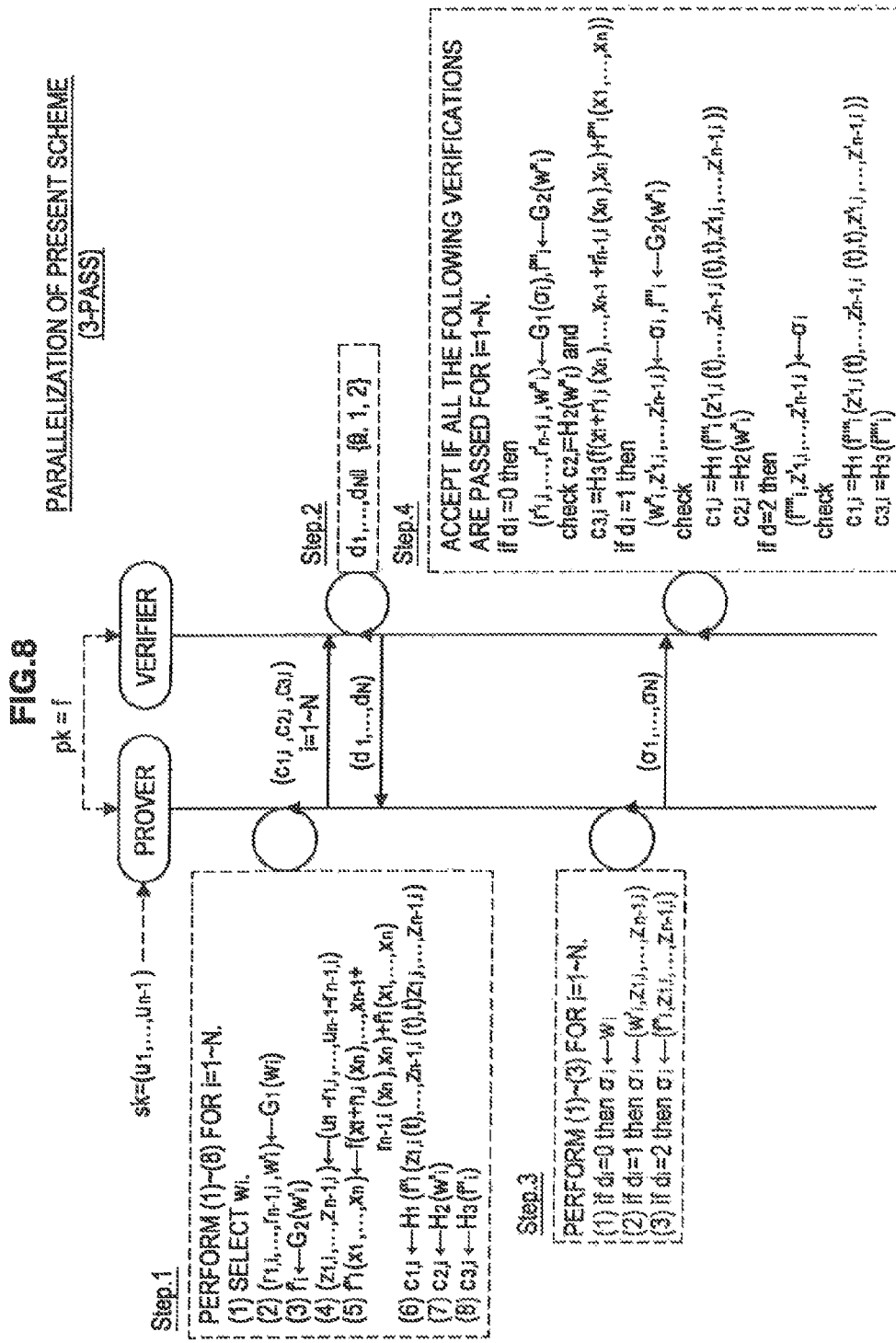
FIG. 8 is an explanatory diagram for describing a parallel algorithm for the public key authentication scheme according to the embodiment.

Now, as has been described, when adopting the interactive protocol according to the present scheme or the extended scheme, the probability of falsification succeeding can be reduced to ⅔ or less. Accordingly, if this interactive protocol is performed twice, the probability of falsification succeeding can be reduced to $(2/3)^2$ or less. In the same manner, if this interactive protocol is performed N times, the probability of falsification succeeding becomes $(2/3)^N$, and if N is a sufficiently large number (for example, N=140), the probability of falsification succeeding is reduced to a negligible level. For example, an algorithm of performing the interactive protocol according to the present scheme N times in parallel is shown in FIG. 8. In the following, the contents of each algorithm performing the interactive protocol N times in parallel will be described with reference to FIG. 8.

(Key Generation Algorithm Gen)

The key generation algorithm Gen generates a multi-order polynomial of n variables $f_0$($x_1$, ..., $x_n$) defined on a ring K and multi-order polynomials of one variable $u_1$(t), ..., $u_{n-1}$(t). Next, the key generation algorithm Gen calculates c(t)←$f_0$($u_1$ (t), ..., $u_{n-1}$(t),t). Then, the key generation algorithm Gen calculates f($x_1$, ..., $x_n$)=$f_0$($x_1$, ..., $x_n$)−c($x_n$), and sets f as the public key pk. Also, the key generation algorithm Gen sets ($u_1$, ..., $u_{n-1}$) as the secret key sk. Note that $f_0$($u_1$(t), ..., $u_{n-1}$(t),t)=0 is satisfied here.

(Prover Algorithm P, Verifier Algorithm V)

Next, processes by the prover algorithm P and the verifier algorithm V in an interactive protocol will be described with reference to FIG. 8. This interactive protocol is for making a verifier prove that "prover knows the $(u_1, \ldots, u_{n-1})$ that satisfies $f(u_1(t), \ldots, u_{n-1}(t),t)$," without leaking information on the $(u_1, \ldots, u_{n-1})$ at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P performs process (1) to process (8) below for i=1 to N. (Process 1) The prover algorithm P arbitrarily selects a number $w_i$. (Process 2) The prover algorithm P generates polynomials of one variable $r_{1,i}(t), \ldots, r_{n-1,i}(t)$ and a number $w'_i$ by applying the number $w_i$ to a pseudo random number generator $G_1$. That is, the prover algorithm P calculates $(r_{1,i}, \ldots, r_{n-1,i}, w'_i) \leftarrow G_1(w_i)$. (Process 3) The prover algorithm P generates a polynomial of n variables $f'_i(x_1, \ldots, x_n)$ by applying the number $w'_i$ to a pseudo random number generator $G_2$. That is, the prover algorithm P calculates $f'_i \leftarrow G_2(w'_i)$.

Step 1 (Continued):

(Process 4) The prover algorithm P calculates $(z_{1,i}(t), \ldots, z_{n-1,i}(t)) \leftarrow (u_{1,i}(t) - r_{1,i}(t), \ldots, u_{n-1,i}(t) - r_{n-1,i}(t))$. This calculation corresponds to an operation of masking the secret key $(u_{1,i}, \ldots, u_{n-1,i})$ by the polynomial of one variable $(r_{1,i}, \ldots, r_{n-1,i})$. (Process 5) The prover algorithm P calculates $f''_i(x_1, \ldots, x_n) \leftarrow f(x_1 + r_{n-1,i}(x_n), \ldots, x_{n-1} + r_{n-1,i}(x_n), x_n) + f'_i(x_1, \ldots, x_n)$. This calculation corresponds to an operation of masking a polynomial $f(x_1 + r_{1,i}(x_n), \ldots, x_{n-1} + r_{n-1,i}(x_n), x_n)$ for $x_1, \ldots, x_n$ by the polynomial $f'_i(x_1, \ldots, x_n)$.

Step 1 (Continued):

(Process 6) The prover algorithm P generates a hash value $c_{1,i}$ of $f'_i(z_{1,i}(t), \ldots, z_{n-1,i}(t),t)$ and $z_{1,i}, \ldots, z_{n-1,i}$. That is, the prover algorithm P calculates $c_{1,i} \leftarrow H_1(f''_i(z_{1,i}(t), \ldots, z_{n-1,i}(t),t), z_{1,i}, \ldots, z_{n-1,i})$. (Process 7) The prover algorithm P generates a hash value $c_{2,i}$ of the number $w'_i$. That is, the prover algorithm P calculates $c_{2,i} \leftarrow H_2(w'_i)$. (Process 8) The prover algorithm P generates a hash value $c_{3,i}$ of the polynomial $f''_i$. That is, the prover algorithm P calculates $c_{3,i} \leftarrow H_3(f''_i)$. Additionally, $H_1(\ldots), H_2(\ldots),$ and $H_3(\ldots)$ described are hash functions. Also, the hash values $(c_{1,i}, c_{2,i}, c_{3,i})$ are messages.

After (Process 1) to (Process 8) described above are performed for i=1 to N, the messages $(c_{1,i}, c_{2,i}, c_{3,i})$ (i=1 to N) generated in Step 1 are sent to a verifier.

Step 2:

The verifier algorithm V selects, for each of i=1 to N, a verification pattern to be used from three verification patterns. Then, the verifier algorithm V sends to the prover a demand $d_i \in \{0, 1, 2\}$ (i=1 to N) indicating the selected verification pattern.

Step 3:

The prover algorithm P generates information $\sigma_i$ to be sent back to the verifier in response to the demand $d_i$ received from the verifier. Here, the prover algorithm P performs (Process 1) to (Process 3) below for i=1 to N. (Process 1) If $d_i=0$, the prover algorithm P generates information $\sigma_i = w_i$. (Process 2) If $d_i=1$, the prover algorithm P generates information $\sigma_i = (w'_i, z_{1,i}, \ldots, z_{n-1,i})$. (Process 3) If $d_i=2$, the prover algorithm P generates information $\sigma_i = (f''_i, z_{1,i}, \ldots, z_{n-1,i})$. After decision and processes of (Process 1) to (Process 3) above have been performed, the information $\sigma_i$ (i=1 to N) is sent to the verifier by the prover algorithm P.

Step 4:

The verifier algorithm V performs the following verification process by using the information $\sigma_i$ (i=1 to N) received from the prover. Additionally, the following process is performed for i=1 to N.

If $d_i=0$, the verifier algorithm V calculates $(r'_{1,i}, \ldots, r'_{n-1,i}, w''_i) \leftarrow G_1(\sigma_i)$. Furthermore, the verifier algorithm V calculates $f'''_i \leftarrow G_2(w''_i)$. Then, the verifier algorithm V verifies whether the equality $c_{2,i} = H_2(w''_i)$ holds true or not. Also, the verifier algorithm V verifies whether the equality $c_{3,i} = H_3(f(x_1 + r'_{1,i}(x_n), \ldots, x_{n-1} + r'_{n-1,i}(x_n), x_n) + f'''_i(x_1, \ldots, x_n))$ holds true or not. The verifier algorithm V outputs a value 1 indicating authentication success in the case all the verifications have succeeded, and outputs a value 0 indicating authentication failure in the case a failure has occurred in the verification.

If $d_i=1$, the verifier algorithm V calculates $(w''_i, z'_{1,i}, \ldots, z'_{n-1,i}) \leftarrow \sigma_i$. Furthermore, the verifier algorithm V calculates $f'''_i \leftarrow G_2(w''_i)$. Then, the verifier algorithm V verifies whether the equality $c_{1,i} = H_1(f'''_i(z'_{1,i}(t), \ldots, z'_{n-1,i}(t),t), z'_{1,i}, \ldots, z'_{n-1,i})$ holds true or not. Also, the verifier algorithm V verifies whether the equality $c_{2,i} = H_2(w''_i)$ holds true or not. The verifier algorithm V outputs a value 1 indicating authentication success in the case all the verifications have succeeded, and outputs a value 0 indicating authentication failure in the case a failure has occurred in the verification.

If $d_i=2$, the verifier algorithm V calculates $(f''''_i, z'_{1,i}, \ldots, z'_{n-1,i}) \leftarrow \sigma_i$. Then, the verifier algorithm V verifies whether the equality $c_{1,i} = H_1(f'''_i(z'_{1,i}(t), \ldots, z'_{n-1,i}(t),t), z'_{1,i}, \ldots, z'_{n-1,i})$ holds true or not. Also, the verifier algorithm V verifies whether the equality $c_{3,i} = H_3(f''''_i)$ holds true or not. The verifier algorithm V outputs a value 1 indicating authentication success in the case all the verifications have succeeded, and outputs a value 0 indicating authentication failure in the case a failure has occurred in the verification.

In the foregoing, the method of performing, in parallel, the interactive protocol of the present scheme has been described. As described above, by repeatedly performing the interactive protocol of the present scheme, the probability of falsification succeeding can be reduced to a negligible level.

[2-4: Non-Interactive Algorithm]

Figure 9:
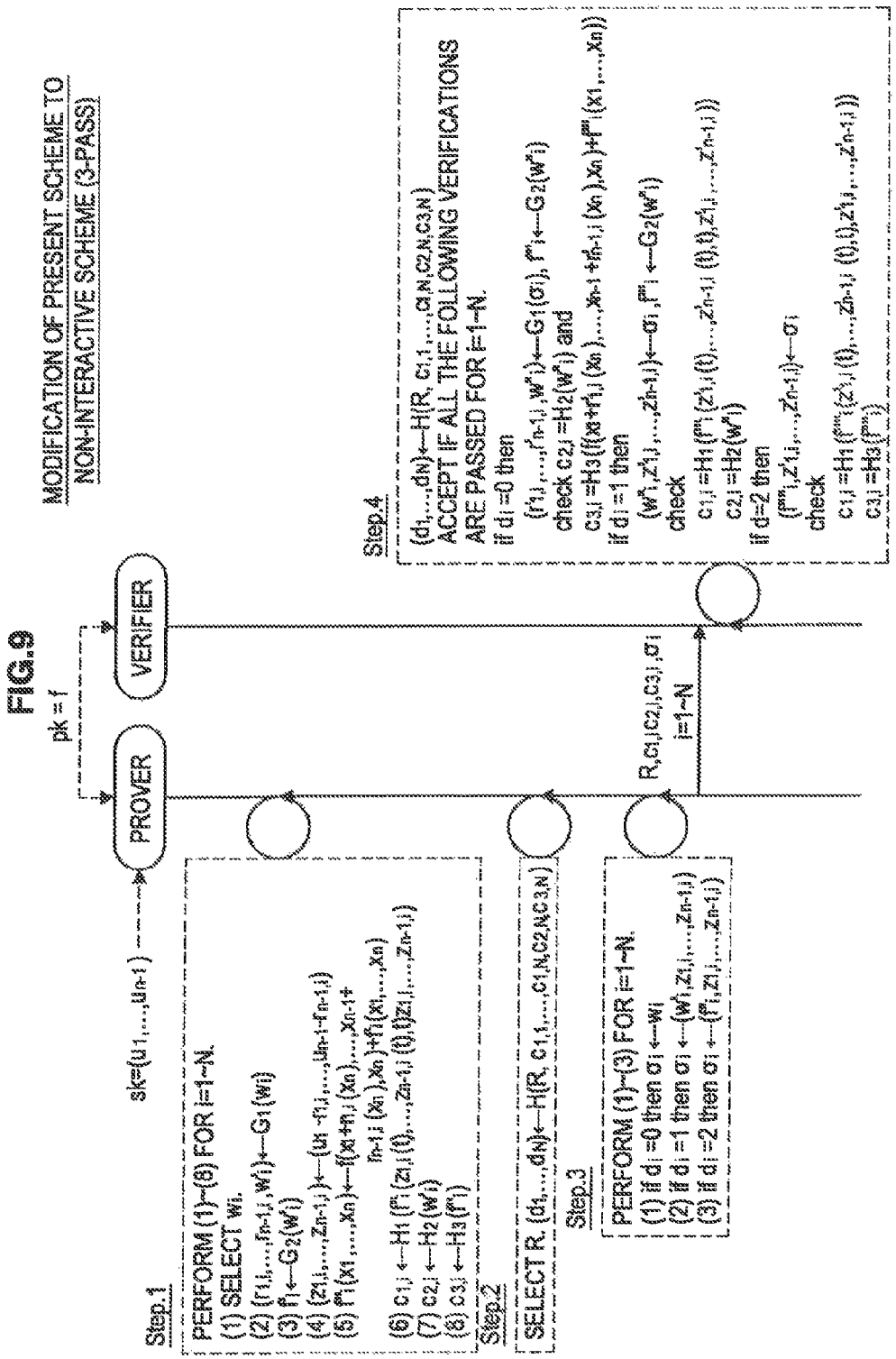
FIG. 9 is an explanatory diagram for describing a non-interactive algorithm for the public key authentication scheme according to the embodiment.

In the foregoing, the 3-pass public key authentication scheme has been described. However, since, according to the present scheme, information sent from the verifier to the prover in the second pass is only the demand d (in reality, a mere random number) indicating the verification pattern, modifying to a 1-pass public key authentication scheme (hereinafter, non-interactive scheme) is possible. Additionally, the contents of each algorithm according to the non-interactive scheme are shown in FIG. 9. In the following, the contents of each algorithm according to the non-interactive scheme will be described with reference to FIG. 9.

(Key Generation Algorithm Gen)

The key generation algorithm Gen generates a multi-order polynomial of n variables $f_0(x_1, \ldots, x_n)$ defined on a ring K and multi-order polynomials of one variable $u_1(t), \ldots, u_{n-1}(t)$. Next, the key generation algorithm Gen calculates $c(t) \leftarrow f_0(u_1(t), \ldots, u_{n-1}(t),t)$. Then, the key generation algorithm Oen calculates $f(x_1, \ldots, x_n) = f_0(x_1, \ldots, x_n) - c(x_n)$, and sets f as the public key pk. Also, the key generation algorithm Gen sets $(u_1, \ldots, u_{n-1})$ as the secret key sk. Note that $f_0(u_i(t), \ldots, u_{n-1}(t),t) = 0$ is satisfied here.

(Prover Algorithm P, Verifier Algorithm V)

Next, processes by the prover algorithm P and the verifier algorithm V in an interactive protocol will be described with reference to FIG. 9. This interactive protocol is for making a verifier prove that "prover knows the $(u_1, \ldots, u_{n-1})$ that satisfies $f(u_1(t), \ldots, u_{n-1}(t), t)$," without leaking information on the $(u_1, \ldots, u_{n-1})$ at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P performs process (1) to process (8) below for i=1 to N. (Process 1) The prover algorithm P arbitrarily selects a number $w_i$. (Process 2) The prover algorithm P generates polynomials of one variable $r_{1,i}(t), \ldots, r_{n-1,i}(t)$ and a number $w'_i$ by applying the number $w_i$ to a pseudo random number generator $G_1$. That is, the prover algorithm P calculates $(r_{1,i}, \ldots, r_{n-1,i}, w'_i) \leftarrow G_1(w_i)$. (Process 3) The prover algorithm P generates a polynomial of n variables $f'_i(x_1, \ldots, x_n)$ by applying the number $w'_i$ to a pseudo random number generator $G_2$. That is, the prover algorithm P calculates $f'_i \leftarrow G_2(w'_i)$.

Step 1 (Continued):

(Process 4) The prover algorithm P calculates $(z_{1,i}(t), \ldots, z_{n-1,i}(t)) \leftarrow (u_{1,i}(t) - r_{1,i}(t), \ldots, u_{n-1,i}(t) - r_{n-1,i}(t))$. This calculation corresponds to an operation of masking the secret key $(u_{1,i}, \ldots, u_{n-1,i})$ by the polynomial of one variable $(r_{1,i}, \ldots, r_{n-1,i})$. (Process 5) The prover algorithm P calculates $f''_i(x_1, \ldots, x_n) \leftarrow f(x_1 + r_{1,i}(x_n), \ldots, x_{n-1} + r_{n-1,i}(n_n), x_n) + f'_i(x_1, \ldots, x_n)$. This calculation corresponds to an operation of masking a polynomial $f(x_1 + r_{1,i}(x_n), \ldots, x_{n-1} + r_{n-1,i}(x_n), x_n)$ for $x_1, \ldots, x_n$ by the polynomial $f'_i(x_1, \ldots, x_n)$.

Step 1 (Continued):

(Process 6) The prover algorithm P generates a hash value $c_{1,i}$ of $f''_i(z_{1,1}(t), \ldots, z_{n-1,i}(t), t)$ and $z_{1,i}, \ldots, z_{n-1,i}$. That is, the prover algorithm P calculates $c_{1,i} \leftarrow H_1(f''_i(z_{1,i}(t), \ldots, z_{n-1,i}(t), t), z_{1,i}, \ldots, z_{n-1,i})$. (Process 7) The prover algorithm P generates a hash value $c_{2,i}$ of the number $w'_i$. That is, the prover algorithm P calculates $c_{2,i} \leftarrow H_2(w'_i)$. (Process 8) The prover algorithm P generates a hash value $c_{3,i}$ of the polynomial $f''_i$. That is, the prover algorithm P calculates $c_{3,i} \leftarrow H_3(f''_i)$. Additionally, $H_1(\ldots), H_2(\ldots)$, and $H_3(\ldots)$ described are hash functions. Also, the hash values $(c_{1,i}, c_{2,i}, c_{3,i})$ are messages.

Step 2:

Next, the prover algorithm P selects a random number R. Then, the prover algorithm P generates, for i=1 to N, $d = (d_1, \ldots, d_N)$ by applying the random number R and the messages $(c_{1,i}, c_{2,i}, c_{3,i})$ generated in Step 1 to the hash function H.

Step 3:

Next, the prover algorithm P generates information $\sigma_i$ to be sent to the verifier according to the generated $d_i$. Here, the prover algorithm P performs (Process 1) to (Process 3) below for i=1 to N. (Process 1) if $d_i=0$, the prover algorithm P generates information $\sigma_i = w_i$. (Process 2) If $d_i=1$, the prover algorithm P generates information of $\sigma_i = (w'_i, z_{1,i}, \ldots, z_{n-1,i})$. (Process 3) If $d_i=2$, the prover algorithm P generates information of $\sigma_i = (f''_i, z_{1,i}, \ldots, z_{n-1,i})$. After decision and processes of (Process 1) to (Process 3) above have been performed, the random number R, the messages $(c_{1,i}, c_{2,i}, c_{3,i})$, and the information $\sigma_i$ (i=1 to N) are sent to the verifier by the prover algorithm P.

Step 4:

The verifier algorithm V first generates $d = (d_1, \ldots, d_N)$ by applying the random number R, the messages $(c_{1,i}, c_{2,i}, c_{3,i})$, and the information $\sigma_i$ (i=1 to N) received from the prover to the hash function H. Then, the verifier algorithm V performs the following verification process by using the information $\sigma_i$ (i=1 to N). Additionally, the following process is performed for i=1 to N.

If $d_i=0$, the verifier algorithm V calculates $(r'_{1,i}, \ldots, r'_{n-1,i}, w''_i) \leftarrow G_1(\sigma_i)$. Furthermore, the verifier algorithm V calculates $f'f_i \leftarrow G_2(w''_i)$. Then, the verifier algorithm V verifies whether the equality $c_{2,i} = H_2(w''_i)$ holds true or not. Also, the verifier algorithm V verifies whether the equality $c_{3,i} = H_3(f(x_1 + r'_{1,i}(x_n), \ldots, x_{n-1} + r'_{n-1,i}(x_n), x_n) + f'''_i(x_1, \ldots, x_n))$ holds true or not. The verifier algorithm V outputs a value 1 indicating authentication success in the case all the verifications have succeeded, and outputs a value 0 indicating authentication failure in the case a failure has occurred in the verification.

If $d_i=1$, the verifier algorithm V calculates $(w''_i, z'_{1,i}, \ldots, z''_{n-1,i}) \leftarrow \sigma_i$. Furthermore, the verifier algorithm V calculates $f''_i \leftarrow G_2(w''_i)$. Then, the verifier algorithm V verifies whether the equality $c_{1,i} = H_1(f''_i(z'_{1,i}(t), \ldots, z'_{n-1,i}(t), t), z'_{1,i}, \ldots, z'_{m-1,i}))$ holds true or not. Also, the verifier algorithm V verifies whether the equality $c_{2,i} = H_2(w''_i)$ holds true or not. The verifier algorithm V outputs a value 1 indicating authentication success in the case all the verifications have succeeded, and outputs a value 0 indicating authentication failure in the case a failure has occurred in the verification.

If $d_i=2$, the verifier algorithm V calculates $(f''''_i, z'_{1,i}, \ldots, z'_{n-1,i}) \leftarrow \sigma_i$. Then, the verifier algorithm V verifies whether the equality $c_{1,i} = H_1(f'''_i(z'_{1,i}(t), \ldots, z'_{n-1,i}(t), t), z'_{1,i}, \ldots, z'_{n-1,i}))$ holds true or not. Also, the verifier algorithm V verifies whether the equality $c_{3,i} = H_3(f''''_i)$ holds true or not. The verifier algorithm V outputs a value 1 indicating authentication success in the case all the verifications have succeeded, and outputs a value 0 indicating authentication failure in the case a failure has occurred in the verification.

In the foregoing, the contents of each algorithm according to the non-interactive scheme have been described. As described above, according to the non-interactive scheme, instead of the verifier sending a random number d to the prover to select a verification pattern, the prover algorithm P generates the d by using the messages $(c_{1,i}, c_{2,i}, c_{3,i})$. If an ideal hash function H is assumed, a hash value d will to act randomly, and thus a hash value d that is convenient for the prover will not occur. Accordingly, even when the modification as described above is performed, sufficient security is ensured. Additionally, such modification can likewise be applied to the extended scheme and the like.

[2-5: Modification into Digital Signature Scheme]

Here, a method of modifying the present scheme to the digital signature scheme will be described. Additionally, for the sake of simplicity, a method of modifying the non-interactive scheme above to the digital signature scheme will be described here. It can be understood that, when the prover and the verifier of the non-interactive scheme described above correspond to the signer and the verifier of the digital signature scheme, there is a resemblance to the model of the digital signature scheme in that the prover alone can convince the verifier. With this concept in mind, the algorithm structure of the digital signature scheme based on the non-interactive scheme will be described in detail.

(Key Generation Algorithm Gen)

The key generation algorithm Gen generates a multi-order polynomial of n variables $f_0(x_1, \ldots, x_n)$ defined on a ring K and multi-order polynomials of one variable $u_1(t), \ldots, u_{n-1}(t)$. Next, the key generation algorithm Gen calculates $c(t) \leftarrow f_0(u_1(t), \ldots, u_{n-1}(t), t)$. Then, the key generation algorithm Gen calculates $f(x_1, \ldots, x_n) = f_0(x_1, \ldots, x_n) - c(x_n)$, and sets f as the verification key pk. Also, the key generation algorithm Gen sets $(u_1, \ldots, u_{n-1})$ as the signature key sk. Note that $f_0(u_1(t), \ldots, u_{n-1}(t), t) = 0$ is satisfied here.

(Signature Generation Algorithm Sig)

The signature generation algorithm Sig performs (Process 1) to (Process 15) below for i=1 to N. Additionally, it is assumed that a signature key sk=$(u_1, \ldots, u_{n-1})$ and a document M are inputted in the signature generation algorithm Sig.

(Process 1) The signature generation algorithm Sig arbitrarily selects a number $w_i$. (Process 2) The signature generation algorithm Sig generates polynomials of one variable $r_{1,i}(t), \ldots, r_{n-1,i}(t)$ and a number $w'_i$ by applying the number $w_i$ to a pseudo random number generator $G_1$. That is, the signature generation algorithm Sig calculates $(r_{1,i}, \ldots, r_{n-1,i}, w'_i) \leftarrow G_1(w_i)$. (Process 3) The signature generation algorithm Sig generates a polynomial of n variables $f'_i(x_1, \ldots, x_n)$ by applying the number $w'_i$ to a pseudo random number generator $G_2$. That is, the signature generation algorithm Sig calculates $f'_i \leftarrow G_2(w'_i)$.

(Process 4) The signature generation algorithm Sig calculates $(z_{1,i}(t), \ldots, z_{n-1,i}(t)) \leftarrow (u_{1,i}(t) - r_{1,i}(t), \ldots, u_{n-1,i}(t) - r_{n-1,i}(t))$. This calculation corresponds to an operation of masking the signature key $(u_{1,i}, \ldots, u_{n-1,i})$ by the polynomial of one variable $(r_{1,i}, \ldots, r_{n-1,i})$. (Process 5) The signature generation algorithm Sig calculates $f''_i(x_1, \ldots, x_n) \leftarrow f(x_1+r_{1,i}(x_n), \ldots, x_{n-1}+r_{n-1,i}(x_n),x_n)+f'_i(x_1, \ldots, x_n)$. This calculation corresponds to an operation of masking a polynomial $f(x_1+r_{1,i}(x_n), \ldots, x_{n-1}+r_{n-1,i}(x_n),x_n)$ for $x_1, \ldots, x_n$ by the polynomial $f'_i(x_1, \ldots, x_n)$.

(Process 6) The signature generation algorithm Sig generates a hash value $c_{1,i}$ of $f''_i(z_{1,i}(t), \ldots, z_{n-1,i}(t),t)$ and $z_{1,i}, \ldots, z_{n-1,i}$. That is, the signature generation algorithm Sig calculates $c_{1,i} \leftarrow H_1(f''_i(z_{1,i}(t), \ldots, z_{n-1,i}(t)t), z_{1,i}, \ldots, z_{n-1,i})$. (Process 7) The signature generation algorithm Sig generates a hash value $c_{2,i}$ of the number $w'_i$. That is, the signature generation algorithm Sig calculates $c_{2,i} \leftarrow H_2(w'_i)$. (Process 8) The signature generation algorithm Sig generates a hash value $c_{3,i}$ of the polynomial $f''_i$. That is, the signature generation algorithm Sig calculates $c_{3,i} \leftarrow H_3(f''_i)$. Additionally, $H_1(\ldots), H_2(\ldots)$, and $H_3(\ldots)$ described are hash functions.

(Process 9) The signature generation algorithm Sig selects a random number R. (Process 10) The signature generation algorithm Sig generates, for i=1 to N, $d=(d_1, \ldots, d_N)$ by applying the document M, the random number R and the hash values $(c_{1,i}, c_{2,i}, c_{3,i})$ to the hash function H. That is, the signature generation algorithm Sig calculates $d=(d_1, \ldots, d_N) \leftarrow H(R,M,c_{1,1}, \ldots, c_{3,N})$. (Process 11) The signature generation algorithm Sig generates information $\sigma_1$ according to the generated $d_i$.

Then, the signature generation algorithm Sig performs (Process 12) to (Process 14) below for i=1 to N. (Process 12) If $d_i=0$, the signature generation algorithm Sig generates information $\sigma_i=w_i$. (Process 13) If $d_i=1$, the signature generation algorithm Sig generates information $\sigma_i=(w'_i,z_{1,i}, \ldots, z_{n-1,i})$. (Process 14) If $d_i=2$, the signature generation algorithm Sig generates information $\sigma_i=(f''_i,z_{1,i}, \ldots, z_{n-1,i})$.

(Process 15) After decision and processes of (Process 12) to (Process 14) above have been performed for i=1 to N, the signature generation algorithm Sig outputs a digital signature $\sigma=(R, c_{1,i}, c_{2,i}, c_{3,i}, \sigma_1, \ldots, \sigma_N)$ including the random number R, the messages $(c_{1,i}, c_{2,i}, c_{3,i})$ and the information $\sigma_i$ (i=1 to N).

(Signature Verification Algorithm Ver)

If all the following verifications are passed for i=1 to N, the signature verification algorithm Ver accepts the digital signature $\sigma$, and if even one verification is not passed, the signature verification algorithm Ver denies the digital signature $\sigma$. Additionally, it is assumed that the digital signature $\sigma$ and the document M are inputted in the signature verification algorithm Ver. First, the signature verification algorithm Ver calculates $d=(d_1, \ldots, d_N) \leftarrow H(R,M,c_{1,1}, \ldots, c_{3,N})$. Next, the signature verification algorithm Ver performs (Verification 1) to (Verification 3) below for i=1 to N.

(Verification 1) If $d_i=0$, the signature verification algorithm Ver calculates $(r'_{1,i}, \ldots, r'_{n-1,i},w''_i) \leftarrow G_1(\sigma_i)$. Next, the signature verification algorithm Ver calculates $f'''_i \leftarrow G_2(w''_i)$. Then, the signature verification algorithm Ver verifies whether the equality $c_{2,i}=H_2(w''_i)$ holds true or not. Also, the signature verification algorithm Ver verifies whether the equality $c_{3,i}=H_3(f(x_1+r'_{1,i}(x_n), \ldots, x_{n-1}+r'_{n-1,i}(x_n),x_n)+f'''_i(x_1, \ldots, x_n))$ holds true or not. The signature verification algorithm Ver outputs a value 1 indicating acceptance of the digital signature $\sigma$ in the case all the verifications have succeeded, and outputs a value 0 indicating denial of the digital signature $\sigma$ in the case a failure has occurred in the verification.

(Verification 2) If $d_i=1$, the signature verification algorithm Ver calculates $(w''_i,z'_{1,i}, \ldots, z'_{n-1,i}) \leftarrow \sigma_i$. Next, the signature verification algorithm Ver calculates $f'''_i \leftarrow G_2(w''_i)$. Then, the signature verification algorithm Ver verifies whether the equality $c_{1,i}=H_1(f'''_i(z'_{1,i}(t), \ldots, z'_{n-1,i}(t),t),z'_{1,i}, \ldots, z'_{n-1,i})$ holds true or not. Also, the signature verification algorithm Ver verifies whether the equality $c_{2,i}=H_2(w''_i)$ holds true or not. The signature verification algorithm Ver outputs a value 1 indicating acceptance of the digital signature $\sigma$ in the case all the verifications have succeeded, and outputs a value 0 indicating denial of the digital signature $\sigma$ in the case a failure has occurred in the verification.

(Verification 3) If $d_i=2$, the signature verification algorithm Ver calculates $(f''''_i,z'_{1,i}, \ldots, z'_{n-1,i}) \leftarrow \sigma_i$. Then, the signature verification algorithm Ver verifies whether the equality $c_{1,i}=H_1(f''''_i(z'_{1,i}(t), \ldots, z'_{n-1,i}(t),t),z'_{1,i}, \ldots, z'_{n-1,i})$ holds true or not. Also, the signature verification algorithm Ver verifies whether the equality $c_{3,i}=H_3(f''''_i)$ holds true or not. The signature verification algorithm Ver outputs a value 1 indicating acceptance of the digital signature $\sigma$ in the case all the verifications have succeeded, and outputs a value 0 indicating denial of the digital signature $\sigma$ in the case a failure has occurred in the verification.

In the foregoing, each algorithm structure of the digital signature scheme based on the present scheme has been described. The digital signature scheme takes the section-finding problem on an algebraic surface as a basis for security but does not contain the security issue like that of the ASS-CC-digital signature scheme. Additionally, a digital signature scheme based on the extended scheme described above can likewise be structured.

[2-6: Concrete Example]

Figure 10:
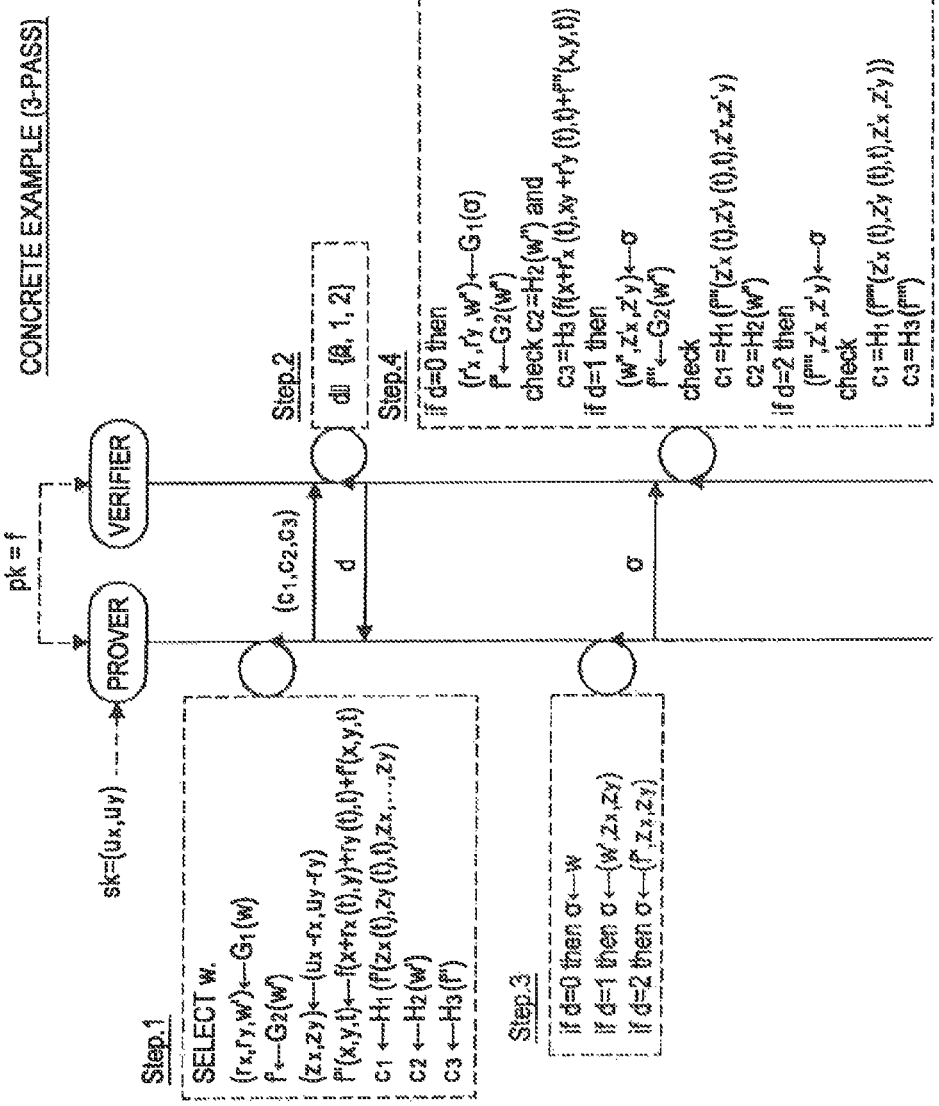
FIG. 10 is an explanatory diagram for describing a concrete algorithm for the public key authentication scheme according to the embodiment.

Next, a concrete algorithm structure that is presumable when performing the present scheme will be described with reference to FIG. 10. FIG. 10 is an explanatory diagram for describing a concrete example of the present scheme.

(Key Generation Algorithm Gen)

The key generation algorithm Gen generates a D-th order polynomial of three variables $f_0(x, y, t)$ defined on a ring K and multi-order polynomials of one variable $u_x(t)$ and $u_y(t)$. The D-th order polynomial $f_0(x,y,t)$ is represented by formula (8) below. Also, the multi-order polynomial of one variable $u_x(t)$ is represented by formula (9) below. Furthermore, the multi-order polynomial of one variable $u_y(t)$ is represented by formula (10) below.

[Expression 7]

$$f_0(x, y, t) = \sum_{i+j+k \leq D} a'_{i,j,k} x^i y^j t^k \qquad (8)$$

$$u_x(t) = \sum_{i \leq D_s} u_{x,i} t^i \qquad (9)$$

-continued $$u_y(t) = \sum_{i \leq D_s} u_{y,i} t^i \quad (10)$$

Next, the key generation algorithm Gen calculates $c(t) \leftarrow f_0(u_x(t), u_y(t), t)$. Then, the key generation algorithm Gen calculates $f(x,y,t) = f_0(x,y,t) - c(t)$, and sets f as the public key pk. Also, the key generation algorithm Gen sets $(u_x, u_y)$ as the secret key sk. Additionally, the f to be generated by the key generation algorithm Gen will be maximum D-th order for terms other than $x^0 y^0 t^k$ but will be maximum $(D+D_s)$-th order for the term $x^0 y^0 t^k$.

(Prover Algorithm P, Verifier Algorithm V)

Next, processes by the prover algorithm P and the verifier algorithm V in an interactive protocol will be described with reference to FIG. 10. This interactive protocol is for making a verifier prove that "prover knows the $f(u_x(t), u_y(t), t)$ that satisfies $(u_x, u_y)$," without leaking information on the $(u_x, u_y)$ at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P arbitrarily selects a number w. Then, the prover algorithm P generates polynomials of one variable $r_x(t)$, $r_y(t)$ and a number w' by applying the number w to a pseudo random number generator $G_1$. That is, the prover algorithm P calculates $(r_x, r_y, w') \leftarrow G_1(w)$. Next, the prover algorithm P generates a polynomial of three variables f'(x,y,t) by applying the number w' to a pseudo random number generator $G_2$. That is, the prover algorithm P calculates $f' \leftarrow G_2(w')$. Additionally, the order of the polynomial f' is made the same as the order of the polynomial f. That is, it is maximum D-th order for terms other than $x^0 y^0 t^k$, but is maximum $(D+D_s)$-th order for the term $x^0 y^0 t^k$.

Step 1 (Continued):

Next, the prover algorithm P calculates $(z_x(t), z_y(t)) \leftarrow (u_x(t) - r_x(t), u_y(t) - r_y(t))$. This calculation corresponds to an operation of masking the secret key $(u_x, u_y)$ by the polynomial of one variable $(r_x, r_y)$. Furthermore, the prover algorithm P calculates $f''(x,y,t) \leftarrow f(x+r_x(t), y+r_y(t), t) + f'(x,y,t)$. This calculation corresponds to an operation of masking a polynomial $f(x+r_x(t), y+r_y(t), t)$ for x, y, and z by the polynomial f'(x,y,t). It should be noted that the terms related to $r_x(t)$ and $r_y(t)$ appearing in $f(x+r_x(t), y+r_y(t), t)$ are all masked by f'(x,y,t).

Step 1 (Continued):

Next, the prover algorithm P generates a hash value $c_1$ of $f''(z_x(t), z_y(t), t)$ and $z_x$, $z_y$. That is, the prover algorithm P calculates $c_1 \leftarrow H_1(f''(z_x(t), z_y(t), t), z_x, z_y)$. Furthermore, the prover algorithm P generates a hash value $c_2$ of the number w'. That is, the prover algorithm P calculates $c_2 \leftarrow H_2(w')$. Furthermore, the prover algorithm P generates a hash value $c_3$ of the polynomial f''. That is, the prover algorithm P calculates $c_3 \leftarrow H_3(f'')$. Additionally, $H_1(\ldots)$, $H_2(\ldots)$, and $H_3(\ldots)$ described are hash functions. Also, the hash values $(c_1, c_2, c_3)$ are messages.

The messages $(c_1, c_2, c_3)$ generated in Step 1 are sent to a verifier.

Step 2:

The verifier algorithm V selects a verification pattern to be used from three verification patterns. Then, the verifier algorithm V sends to the prover a demand $d \in \{0, 1, 2\}$ indicating the selected verification pattern.

Step 3:

The prover algorithm P generates information σ to be sent back to the verifier in response to the demand d received from the verifier. If d=0, the prover algorithm P generates information σ=w. Also, if d=1, the prover algorithm P generates information $\sigma = (w', z_x, z_y)$. Furthermore, if d=2, the prover algorithm P generates information $\sigma = (f'', z_x, z_y)$. The information σ generated in this manner is sent to the verifier by the prover algorithm P.

Step 4:

The verifier algorithm V performs the following verification process by using the information σ received from the prover.

If d=0, the verifier algorithm V calculates $(r'_x, r'_y, w'') \leftarrow G_1(\sigma)$. Furthermore, the verifier algorithm V calculates $f''' \leftarrow G_2(w'')$. Then, the verifier algorithm V verifies whether the equality $c_2 = H_2(w'')$ holds true or not. Also, the verifier algorithm V verifies whether the equality $c_3 = H_3(f(x+r'_x(t), y+r'_y(t), t) + f'''(x,y,t))$ holds true or not. The verifier algorithm V outputs a value 1 indicating authentication success in the case all the verifications have succeeded, and outputs a value 0 indicating authentication failure in the case a failure has occurred in the verification.

If d=1, the verifier algorithm V calculates $(w'', z'_x, z'_y) \leftarrow \sigma$. Furthermore, the verifier algorithm V calculates $f''' \leftarrow G_2(w'')$. Then, the verifier algorithm V verifies whether the equality $c_1 = H_1(f'''(z'_x(t), z'_y(t), t), z'_x, z'_y)$ holds true or not. Also, the verifier algorithm V verifies whether the equality $c_2 = H_2(w'')$ holds true or not. The verifier algorithm V outputs a value 1 indicating authentication success in the case all the verifications have succeeded, and outputs a value 0 indicating authentication failure in the case a failure has occurred in the verification.

If d=2, the verifier algorithm V calculates $(f'''', z'_x, z'_y) \leftarrow \sigma$. Then, the verifier algorithm V verifies whether the equality $c_1 = H_1(f''''(z'_x(t), z'_y(t), t), z'_x, z'_y)$ holds true or not. Also, the verifier algorithm V verifies whether the equality $c_3 = H_3(f'''')$ holds true or not. The verifier algorithm V outputs a value 1 indicating authentication success in the case all the verifications have succeeded, and outputs a value 0 indicating authentication failure in the case a failure has occurred in the verification.

In the foregoing, a concrete algorithm structure that is presumable when performing the present scheme has been described.

3: Second Embodiment

Next, the second embodiment of the present invention will be described. In the foregoing, a 3-pass public key authentication scheme has been described. In the present embodiment, a 5-pass public key authentication scheme (hereinafter, present scheme) will be described. The present scheme is a scheme for ensuring the soundness of a public key authentication scheme by making the number of verification patterns of a verifier 2q.

Additionally, in the 3-pass public key authentication scheme according to the first embodiment described above, the probability of falsification per interactive protocol was 2/3. However, in the present scheme, the probability of falsification per interactive protocol will be 1/2+1/q as will be described later. Moreover, q is an order of a ring to be used. Accordingly, as shown in FIG. 18, if the order of the ring is sufficiently large, the present scheme is more capable of reducing the probability of falsification per interactive protocol, and the probability of falsification can be sufficiently reduced by small number of execution times of the interactive protocol.

The interactive protocol according to the 5-pass public key authentication scheme may seem less efficient than the interactive protocol according to the 3-pass public key authentication scheme. However, according to the 5-pass public key authentication scheme, if the order of the ring is made sufficiently large, the probability of falsification per interactive protocol will be nearly ½, and thus the number of execution times of the interactive protocol necessary for achieving the same security level can be less.

For example, in the 3-pass public key authentication scheme, to make the probability of falsification ½" or less, the interactive protocol has to be performed $n/(\log 3-1)=1.701n$ times or more. On the other hand, in the 5-pass public key authentication scheme, the interactive protocol has to be performed $n/(1-\log(1+1/q))$ times or more. As shown in FIG. 18, for example, when $q=2^4$, the amount of communication necessary to realise the same security level will be less for the 5-pass public key authentication scheme than the 3-pass public key authentication scheme.

[3-1: Algorithm for Public Key Authentication Scheme]

In the following, an algorithm structure according to the 5-pass public key authentication scheme (present scheme) will be described with reference to FIG. 11. FIG. 11 is an explanatory diagram for describing the contents of the algorithm according to the present scheme.

(Key Generation Algorithm Gen)

The key generation algorithm Gen generates a multi-order polynomial of n variables $f_0(x_1, \ldots, x_n)$ defined on a ring K and multi-order polynomials of one variable $u_1(t), \ldots, u_{n-1}(t)$. Next, the key generation algorithm Gen calculates $c(t) \leftarrow f_0(u_1(t), \ldots, u_{n-1}(t),t)$. Then, the key generation algorithm Gen calculates $f(x_1, \ldots, x_n)=f_0(x_1, \ldots, x_n)-c(x_n)$, and sets f as the public key pk. Also, the key generation algorithm Gen sets $(u_1, \ldots, u_{n-1})$ as the secret key sk.

(Prover Algorithm P, Verifier Algorithm V)

Next, processes by the prover algorithm P and the verifier algorithm V in an interactive protocol will be described with reference to FIG. 11. This interactive protocol is for making a verifier prove that "prover knows the $(u_1, \ldots, u_{n-1})$ that satisfies $f(u_1(t), \ldots, u_{n-1}(t), t)$," without leaking information on the $(u_1, \ldots, u_{n-1})$ at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P arbitrarily selects a number w. Then, the prover algorithm P generates polynomials of one variable $r_1(t), \ldots, r_{n-1}(t)$ and a polynomial of n variables $f'(x_1, \ldots, x_n)$ by applying the number w to a pseudo random number generator G. That is, the prover algorithm P calculates $(r_1, \ldots, r_{n-1}, f') \leftarrow G(w)$. Next, the prover algorithm P calculates $(z_1(t), \ldots, z_{n-1}(t)) \leftarrow (u_1(t)-r_1(t), \ldots, u_{n-1}(t)-r_{n-1}(t))$. This calculation corresponds to an operation of masking the secret key $(u_1, \ldots, u_{n-1})$ by the polynomial of one variable $(r_1, \ldots, r_{n-1})$.

Step 1 (Continued):

Next, the prover algorithm P generates a hash value $c_1$ of $f''(z_1(t), \ldots, z_{n-1}(t),t)$ and $z_1, \ldots, z_{n-1}$. That is, the prover algorithm P calculates $c_1 \leftarrow H_1(f''(z_1(t), \ldots, z_{n-1}(t),t), z_1, \ldots, z_{n-1})$. Also, the prover algorithm P generates a hash value $c_2$ of the number w. That is, the prover algorithm P calculates $c_2 \leftarrow H_2(w)$. Additionally, $H_1(\ldots)$, and $H_2(\ldots)$ described are hash functions. Also, the hash values $(c_1, c_2)$ are messages.

The messages $(c_1, c_2)$ generated in Step 1 are sent to a verifier.

Step 2:

The verifier algorithm V selects one random number a from q types of elements of a ring K. Then, the verifier algorithm V sends the selected random number a to the prover.

Step 3:

The prover algorithm P calculates $f''(x_1, \ldots, x_n) \leftarrow \alpha f(x_1+r_1(x_n), \ldots, x_{n-1}+r_{n-1}(x_n), x_n)+f'(x_1, \ldots, x_n)$. This calculation corresponds to an operation of masking a polynomial $f(x_1+r_1(x_n), \ldots, x_{n-1}+r_{n-1}(x_n), x_n)$ for $x_1, \ldots, x_n$ by the polynomial $f'(x_1, \ldots, x_n)$.

The polynomial f" generated in Step 3 is sent to the verifier.

Step 4:

The verifier algorithm V selects a verification pattern to be used from two verification patterns. Then, the verifier algorithm V sends to the prover a demand $d \in \{0, 1\}$ indicating the selected verification pattern.

Step 5:

The prover algorithm P generates information σ to be sent back to the verifier in response to the demand d received from the verifier. If d=0, the prover algorithm P generates information σ=w. Also, if d=1, the prover algorithm P generates information $\sigma=(z_1, \ldots, z_{n-1})$. The information a generated in this manner is sent to the verifier by the prover algorithm P.

Step 6:

The verifier algorithm V performs the following verification process by using the information a received from the prover.

If d=0, the verifier algorithm V calculates $(r'_1, \ldots, r'_{n-1}, f''') \leftarrow G(\sigma)$. Then, the verifier algorithm V verifies whether the equality $c_2=H_2(\sigma)$ holds true or not. Also, the verifier algorithm V verifies whether the equality $f''(x_1, \ldots, x_n)=\alpha f(x_1+r'_1(x_n), \ldots, x_{n-1}+r'_{n-1}(x_n), x_n)+f'''(x_1, \ldots, x_n)$ holds true or not. The verifier algorithm V outputs a value 1 indicating authentication success in the case all the verifications have succeeded, and outputs a value 0 indicating authentication failure in the case a failure has occurred in the verification.

If d=1, the verifier algorithm V calculates $(z'_1, \ldots, z'_{n-1}) \leftarrow \sigma$. Then, the verifier algorithm V verifies whether the equality $c_1=H_1(f'''(z'_1(t), \ldots, z'_{n-1}(t),t), z'_1, \ldots, z'_{n-1}))$ holds true or not. The verifier algorithm V outputs a value 1 indicating authentication success in the case the verification has succeeded, and outputs a value 0 indicating authentication failure in the case a failure has occurred in the verification.

(Supplement)

Moreover, note that, at the time of sending the messages $(c_1, c_2)$ and the f" generated in Step 1 and Step 3 described above to the verifier, information related to the secret key sk, information related to $(r_1, \ldots, r_{n-1})$ and information related to $(z_1, \ldots, z_{n-1})$ are not at all leaked to the verifier. Note also that, at the time of sending the information a generated in Step 5 described above to the verifier, information related to $z_1, \ldots, z_{n-1}$ is not at all leaked to the verifier in the case of d=0, and information related to $r_1, \ldots, r_{n-1}$, is not at all leaked to the verifier in the case of d=1.

(Soundness in Present Scheme)

The soundness of the present scheme is guaranteed by that, if the prover algorithm P responded correctly to the demands d=0, 1 with respect to a set of $(c_1, c_2)$ and two types of $(\alpha_1, \alpha_2)$ selected by the verifier algorithm V, then $f'''_1, f''''_2, f''', r'_1, \ldots r'_{n-1}$, and $z'_1, \ldots, z'_{n-1}$ that satisfy formulae (11) to (13) below can be calculated from the responses.

[Expression 8]

$$f_1''''(x_1, \Lambda, x_n) = \alpha_1 f(x_1 + r'_1(x_n), \Lambda, x_{n-1} + r'_{n-1}(x_n), x_n) + f'''(x_1, \Lambda, x_n) \tag{11}$$

$$f_2''''(x_1,\Lambda,x_n) = \alpha_2 f(x_1 + r'_1(x_n), \Lambda, x_{n-1} + r'_{n-1}(x_n), x_n) + f'''(x_1, \Lambda, x_n) \quad (12)$$

$$f_1''''(z_1(t), \Lambda, z_{n-1}(t), t) = f_2''''(z_1(t), \Lambda, z_{n-1}(t), t) \quad (13)$$

With such logic guaranteed, it is guaranteed that, as long as the section-finding problem on an algebraic surface is not solved, it is not possible to perform falsification with a probability higher than $1/2+1/q$. That is, to correctly respond to all the demands $d=0, 1$ of the verifier, the falsifier has to be able to calculate $f''''_1, f''''_2, f''', r'_1, \ldots, r'_{n-1}$, and $z'_1, \ldots, z'_{n-1}$ that satisfy formulae (11) and (13) above. In other words, the falsifier has to be able to calculate $(u_1, \ldots, u_{n-1})$ that satisfies $f(u_1(t), \ldots, u_{n-1}(t), t) = 0$. Accordingly, as long as the section-finding problem on an algebraic surface is not solved, the falsifier is not able to successfully perform falsification with a probability higher than $1/2+1/q$. Additionally, by performing the interactive protocol described above a sufficient number of times, the probability of success of falsification can be reduced to a negligible level.

(Modification)

The prover algorithm P used, as the message $c_1$, the hash value of $f''(z_1(t), \ldots, z_{n-1}(t), t)$ and $z_1, \ldots, z_{n-1}$. But the prover algorithm P may separately calculate the hash value of $f''(z_1(t), \ldots, z_{n-1}(t), t)$ and the hash value of $z_1, \ldots, z_{n-1}$, and may separately send each to the verifier as a message. Furthermore, the prover algorithm P described above generates the polynomials of one variable $r_1(t), \ldots, r_{n-1}(t)$ and a polynomial of n variables $f'(x_1, \ldots, x_n)$ by applying the pseudo random number generator G to the number w. However, the prover algorithm P may calculate, from the start, $w=(r_1(t), \ldots, r_{n-1}(t), f')$, and the $G_1$ may be made identity mapping. Furthermore, in this case, the number w does not have to be applied to the G In the foregoing, a basic algorithm structure according to the present scheme has been described.

[3-2: Extended Algorithm]

Figure 12:
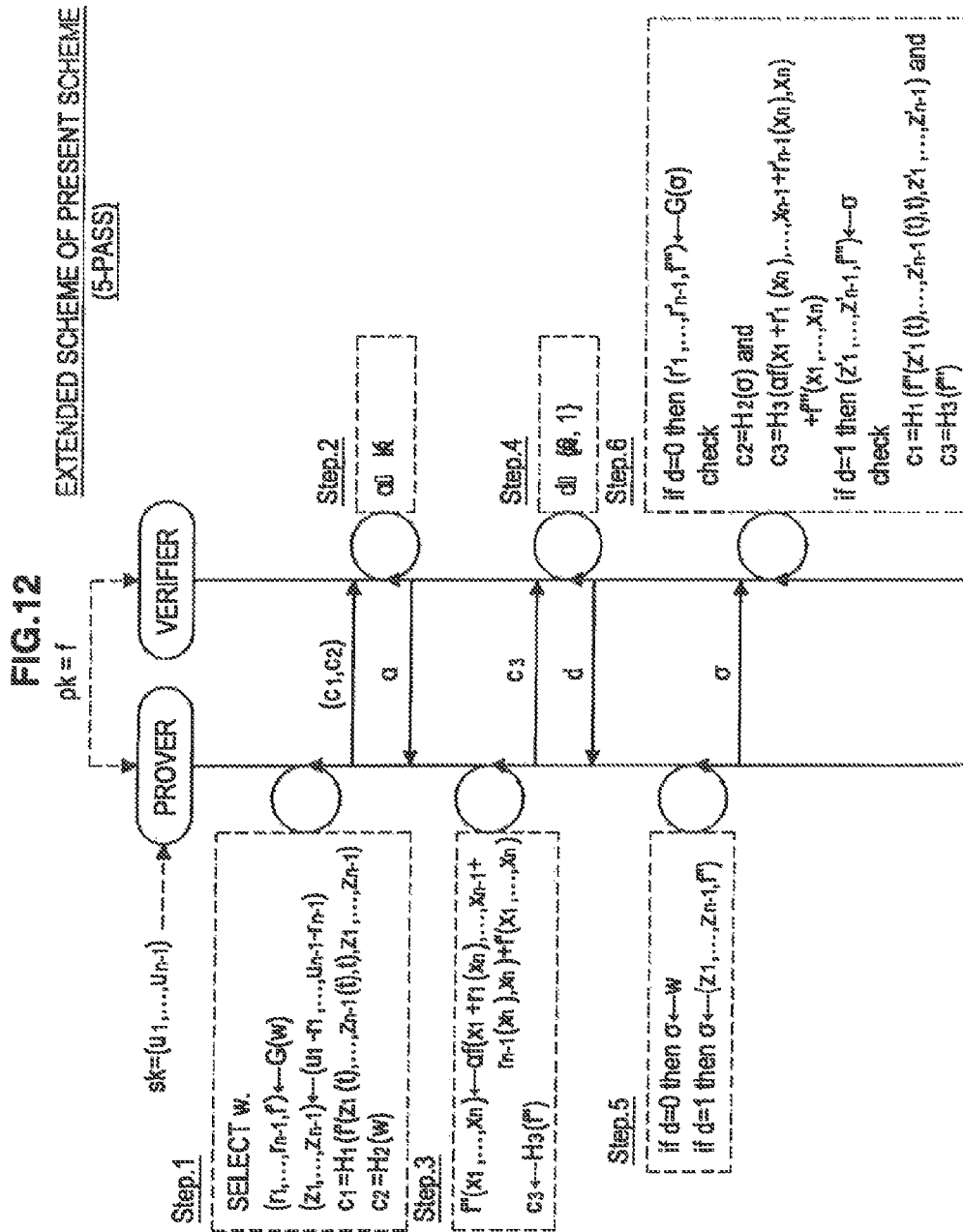
FIG. 12 is an explanatory diagram for describing an extended algorithm for the public key authentication scheme according to the embodiment.

Next, an algorithm of a public key authentication scheme which is an extension of the present scheme (hereinafter, extended scheme) will be described with reference to FIG. 12. FIG. 12 is an explanatory diagram for describing a flow of an interactive protocol based on the extended scheme. This extended scheme is a scheme of transforming a polynomial $f''$ to be transmitted in the third pass to one hash value $c_3$ and sending the same to a verifier. With such extension, the probability of sending to the verifier, in the interactive protocol, the polynomial $f''$ whose representation size is large can be reduced to half, and the average size of data to be communicated can be reduced. In the following, the contents of each algorithm of the extended scheme will be described in detail.

(Key Generation Algorithm Gen)

The key generation algorithm Gen generates a multi-order polynomial of n variables $f_0(x_1, \ldots, x_n)$ defined on a ring K and multi-order polynomials of one variable $u_1(t), \ldots, u_{n-1}(t)$. Next, the key generation algorithm Gen calculates $c(t) \leftarrow f_0(u_1(t), \ldots, u_{n-1}(t), t)$. Then, the key generation algorithm Gen calculates $f(x_1, \ldots, x_n) = f_0(x_1, \ldots, x_n) - c(x_n)$, and sets f as the public key pk. Also, the key generation algorithm Gen sets $(u_1, \ldots, u_{n-1})$ as the secret key sk.

(Prover Algorithm P, Verifier Algorithm V)

Next, processes by the prover algorithm P and the verifier algorithm V in an interactive protocol will be described with reference to FIG. 12. This interactive protocol is for making a verifier prove that "prover knows the $(u_1, \ldots, u_{n-1})$ that satisfies $f(u_1(t), \ldots, u_{n-1}(t), t)$," without leaking information on the $(u_1, \ldots, u_{n-1})$ at all to the verifier. Additionally, the public key pk generated by the key generation algorithm Gen is assumed to be shared between the prover and the verifier.

Also, the secret key sk generated by the key generation algorithm Gen is assumed to be secretly managed by the prover.

Step 1:

First, the prover algorithm P arbitrarily selects a number w. Then, the prover algorithm P generates polynomials of one variable $r_1(t), \ldots, r_{n-1}(t)$ and a polynomial of n variables $f'(x_1, \ldots, x_n)$ by applying the number w to a pseudo random number generator G. That is, the prover algorithm P calculates $(r_1, \ldots, r_{n-1}, f') \leftarrow G(w)$. Next, the prover algorithm P calculates $(z_1(t), \ldots, z_{n-1}(t)) \leftarrow (u_1(t) - r_1(t), \ldots, u_{n-1}(t) - r_{n-1}(t))$. This calculation corresponds to an operation of masking the secret key $(u_1, \ldots, u_{n-1})$ by the polynomial of one variable $(r_1, \ldots, r_{n-1})$.

Step 1 (Continued):

Next, the prover algorithm P generates a hash value $c_1$ of $f''(z_1(t), \ldots, z_{n-1}(t), t)$ and $z_1, \ldots, z_{n-1}$. That is, the prover algorithm P calculates $c_1 \leftarrow H_1(f''(z_1(t), \ldots, z_{n-1}(t), t), z_1, \ldots, z_{n-1})$. Also, the prover algorithm P generates a hash value $c_2$ of the number w. That is, the prover algorithm P calculates $c_2 \leftarrow H_2(w)$. Additionally, $H_1(\ldots)$, and $H_2(\ldots)$ described are hash functions. Also, the hash values $(c_1, c_2)$ are messages.

The messages $(c_1, c_2)$ generated in Step 1 are sent to a verifier.

Step 2:

The verifier algorithm V selects one random number $\alpha$ from q types of elements of a ring K. Then, the verifier algorithm V sends the selected random number $\alpha$ to the prover.

Step 3:

The prover algorithm P calculates $f''(x_1, \ldots, x_n) \leftarrow \alpha f(x_1 + r_1(x_n), \ldots, x_{n-1} + r_{n-1}(x_n), x_n) + f'(x_1, \ldots, x_n)$. This calculation corresponds to an operation of masking a polynomial $f(x_1 + r_1(x_n), \ldots, x_{n-1} + r_{n-1}(x_n), x_n)$ for $x_1, \ldots, x_n$ by the polynomial $f'(x_1, \ldots, x_n)$. Furthermore, the prover algorithm P generates a hash value $c_3$ of the polynomial $f''$. That is, the prover algorithm P calculates $c_3 \leftarrow H_3(f'')$. Additionally, $H_3(\ldots)$ described is a hash function. Also, the hash value $c_3$ is a message.

The message $c_3$ generated in Step 3 is sent to the verifier.

Step 4: The verifier algorithm V selects a verification pattern to be used from two verification patterns. Then, the verifier algorithm V sends to the prover a demand $d \in \{0,1\}$ indicating the selected verification pattern.

Step 5:

The prover algorithm P generates information $\sigma$ to be sent back to the verifier in response to the demand d received from the verifier. If $d=0$, the prover algorithm P generates information $\sigma=w$. Also, if $d=1$, the prover algorithm P generates information $\sigma=(z_1, \ldots, z_{n-1}, f'')$. The information a generated in this manner is sent to the verifier by the prover algorithm P.

Step 6:

The verifier algorithm V performs the following verification process by using the information $\sigma$ received from the prover.

If $d=0$, the verifier algorithm V calculates $(r'_1, \ldots, r'_{n-1}, f''') \leftarrow G(\sigma)$. Then, the verifier algorithm V verifies whether the equality $c_2 = H_2(\sigma)$ holds true or not. Also, the verifier algorithm V verifies whether the equality $c_3 = H_3(\alpha f(x_1 + r'_1(x_n), \ldots, x_{n-1} + r'_{n-1}(x_n), x_n) + f'''(x_1, \ldots, x_n))$ holds true or not. The verifier algorithm V outputs a value 1 indicating authentication success in the case all the verifications have succeeded, and outputs a value 0 indicating authentication failure in the case a failure has occurred in the verification.

If $d=1$, the verifier algorithm V calculates $(z'_1, \ldots, z'_{n-1}, f''') \leftarrow \sigma$. Then, the verifier algorithm V verifies whether the equality $c_1 = H_1(f'''(z'_1(t), \ldots, z'_{n-1}(t), t), z'_1, \ldots, z'_{n-1})$ holds true or not. Also, the verifier algorithm V verifies whether the equality $c_2=H_2(f''')$ holds true or not. The verifier algorithm V outputs a value 1 indicating authentication success in the case all the verifications have succeeded, and outputs a value 0 indicating authentication failure in the case a failure has occurred in the verification.

In the foregoing, the process of each algorithm in the interactive protocol of the extended scheme has been described. With such extension, the probability of sending to the verifier, in the interactive protocol, the polynomial f'' whose representation size is large can be reduced to half, and the average size of data to be communicated can be reduced.

[3-3: Parallel Algorithm]

Figure 13:
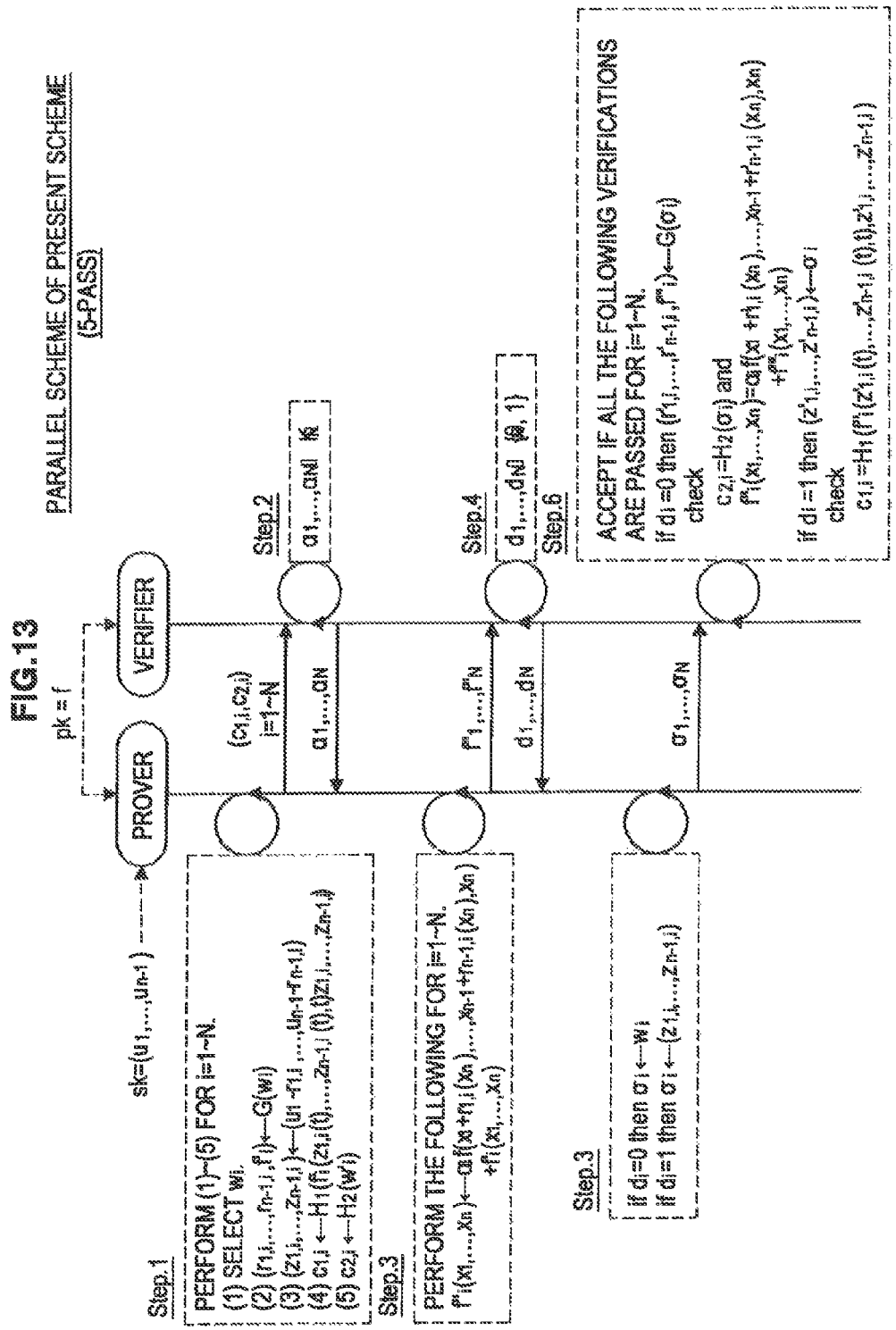
FIG. 13 is an explanatory diagram for describing a parallel algorithm for the public key authentication scheme according to the embodiment.

Now, as has been described, when adopting the interactive protocol according to the present scheme or the extended scheme, the probability of falsification succeeding can be reduced to ($½+1/q$) or less. Accordingly, if this interactive protocol is performed twice, the probability of falsification succeeding can be reduced to ($½+1/q)^2$ or less. In the same manner, if this interactive protocol is performed N times, the probability of falsification succeeding becomes ($½+1/q)^N$, and if N is a sufficiently large number (for example, N=80), the probability of falsification succeeding is reduced to a negligible level. For example, an algorithm of performing the interactive protocol according to the present scheme N times in parallel is shown in FIG. 13. In the following, the contents of each algorithm performing the interactive protocol N times in parallel will be described with reference to FIG. 13.

(Key Generation Algorithm Gen)

The key generation algorithm Gen generates a multi-order polynomial of n variables $f_0(x_1, \ldots, x_n)$ defined on a ring K and multi-order polynomials of one variable $u_1(t), \ldots, u_{n-1}(t)$. Next, the key generation algorithm Gen calculates $c(t) \leftarrow f_0(u_1(t), \ldots, u_{n-1}(t), t)$. Then, the key generation algorithm Gen calculates $f(x_1, \ldots, x_n) = f_0(x_1, \ldots, x_n) - c(x_n)$, and sets f as the public key pk. Also, the key generation algorithm Gen sets $(u_1, \ldots, u_{n-1})$ as the secret key sk. Note that $f_0(u_1(t), \ldots, u_{n-1}(t), t) = 0$ is satisfied here.

(Prover Algorithm P, Verifier Algorithm V)

Next, processes by the prover algorithm P and the verifier algorithm V in an interactive protocol will be described with reference to FIG. 13. This interactive protocol is for making a verifier prove that "prover knows the $(u_1, \ldots, u_{n-1})$ that satisfies $f(u_1(t), \ldots, u_{n-1}(t), t)$," without leaking information on the $(u_1, \ldots, u_{n-1})$ at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P performs process (1) to process (5) below for i=1 to N. (Process 1) The prover algorithm P arbitrarily selects a number $w_i$. (Process 2) The prover algorithm P generates polynomials of one variable $r_{1,i}(t), \ldots, r_{n-1,i}(t)$ and a polynomial $f'_i(x_1, \ldots, x_n)$ by applying the number $w_i$ to a pseudo random number generator G. That is, the prover algorithm P calculates $(r_{1,i}, \ldots, r_{n-1,i}, f'_i) \leftarrow G(w_i)$. (Process 3) The prover algorithm P calculates $(z_{1,i}(t), \ldots, z_{n-1,i}(t)) \leftarrow (u_{1,i}(t) - r_{1,i}(t), \ldots, u_{n-1,i}(t) - r_{n-1,i}(t))$. This calculation corresponds to an operation of masking the secret key $(u_{1,i}, \ldots, u_{n-1,i})$ by the polynomial of one variable $(r_{1,i}, \ldots, r_{n-1,i})$.

Step 1 (Continued):

(Process 4) The prover algorithm P generates a hash value $c_{1,i}$ of $f'_i(z_{1,i}(t), \ldots, z_{n-1,i}(t), t)$ and $z_{1,i}, \ldots, z_{n-1,i}$. That is, the prover algorithm P calculates $c_{1,i} \leftarrow H_1(f'_i(z_{1,i}(t), \ldots, z_{n-1,i}(t), t), z_{1,i}, \ldots, z_{n-1,i})$. (Process 5) The prover algorithm P generates a hash value $c_{2,i}$ of the number $w'_i$. That is, the prover algorithm P calculates $c_{2,i} \leftarrow H_2(w'_i)$.

After (Process 1) to (Process 5) described above are performed for i=1 to N, the messages $(c_{1,i}, c_{2,i})$ (i=1 to N) generated in Step 1 are sent to a verifier.

Step 2:

The verifier algorithm V selects N random numbers $\alpha_1, \ldots, \alpha_N$ from q types of elements of a ring K. Then, the verifier algorithm V sends the selected random numbers $\alpha_1, \ldots, \alpha_N$ to the prover.

Step 3:

The prover algorithm P calculates $f''_i(x_1, \ldots, x_n) \leftarrow \alpha_i f(x_1 + r_{1,i}(x_n), \ldots, x_{n-1} + r_{n-1,i}(x_n), x_n) + f'_i(x_1, \ldots, x_n)$ for i=1 to N. This calculation corresponds to an operation of masking a polynomial $f(x_1 + r_{1,i}(x_n), \ldots, x_{n-1} + r_{n-1,i}(x_n), x_n)$ for $x_1, \ldots, x_n$ by the polynomial $f'_i(x_1, \ldots, x_n)$. Then, the prover algorithm P sends the polynomials $f''_1, \ldots, f''_N$ to the verifier.

Step 4:

The verifier algorithm V selects, for each of i=1 to N, a verification pattern to be used from two verification patterns. Then, the verifier algorithm V sends to the prover a demand $d_i \in \{0, 1\}$ (i=1 to N) indicating the selected verification pattern.

Step 5:

The prover algorithm P generates information $\sigma_i$ to be sent back to the verifier in response to the demand $d_i$ received from the verifier. Here, the prover algorithm P performs (Process 1) or (Process 2) below for i=1 to N. (Process 1) If $d_i=0$, the prover algorithm P generates information $\sigma_i = w_i$. (Process 2) If $d_i=1$, the prover algorithm P generates information $\sigma_i = (w'_i, z_{1,i}, \ldots, z_{n-1,i})$. After decision and process of (Process 1) or (Process 2) above have been performed, the information $\sigma_i$ (i=1 to N) is sent to the verifier by the prover algorithm P.

Step 6:

The verifier algorithm V performs the following verification process by using the information $\sigma_i$ (i=1 to N) received from the prover. Additionally, the following process is performed for i=1 to N.

If $d_i=0$, the verifier algorithm V calculates $(r'_{1,i}, \ldots, r'_{n-1,i}, f''_i) \leftarrow G_1(\sigma_i)$. Then, the verifier algorithm V verifies whether the equality $c_{2,i} = H_2(\sigma_i)$ holds true or not. Also, the verifier algorithm V verifies whether the equality $f''_i(x_1, \ldots, x_n) = f(x_1 + r'_{1,i}(x_n), \ldots, x_{n-1,i} + r'_{n-1,i}(x_n), x_n) + f'''_i(x_1, \ldots, x_n)$ holds true or not. The verifier algorithm V outputs a value 1 indicating authentication success in the case all the verifications have succeeded, and outputs a value 0 indicating authentication failure in the case a failure has occurred in the verification.

If $d_i=1$, the verifier algorithm V calculates $(z'_{1,i}, \ldots, z'_{n-1,i}) \leftarrow \sigma_i$. Then, the verifier algorithm V verifies whether the equality $c_{1,i} = H_1(f'''_i(z'_{1,i}(t), \ldots, z'_{n-1,i}(t), t), z'_{1,i}, \ldots, z'_{n-1,i}))$ holds true or not. The verifier algorithm V outputs a value 1 indicating authentication success in the case the verification has succeeded, and outputs a value 0 indicating authentication failure in the case a failure has occurred in the verification.

Figure 14:
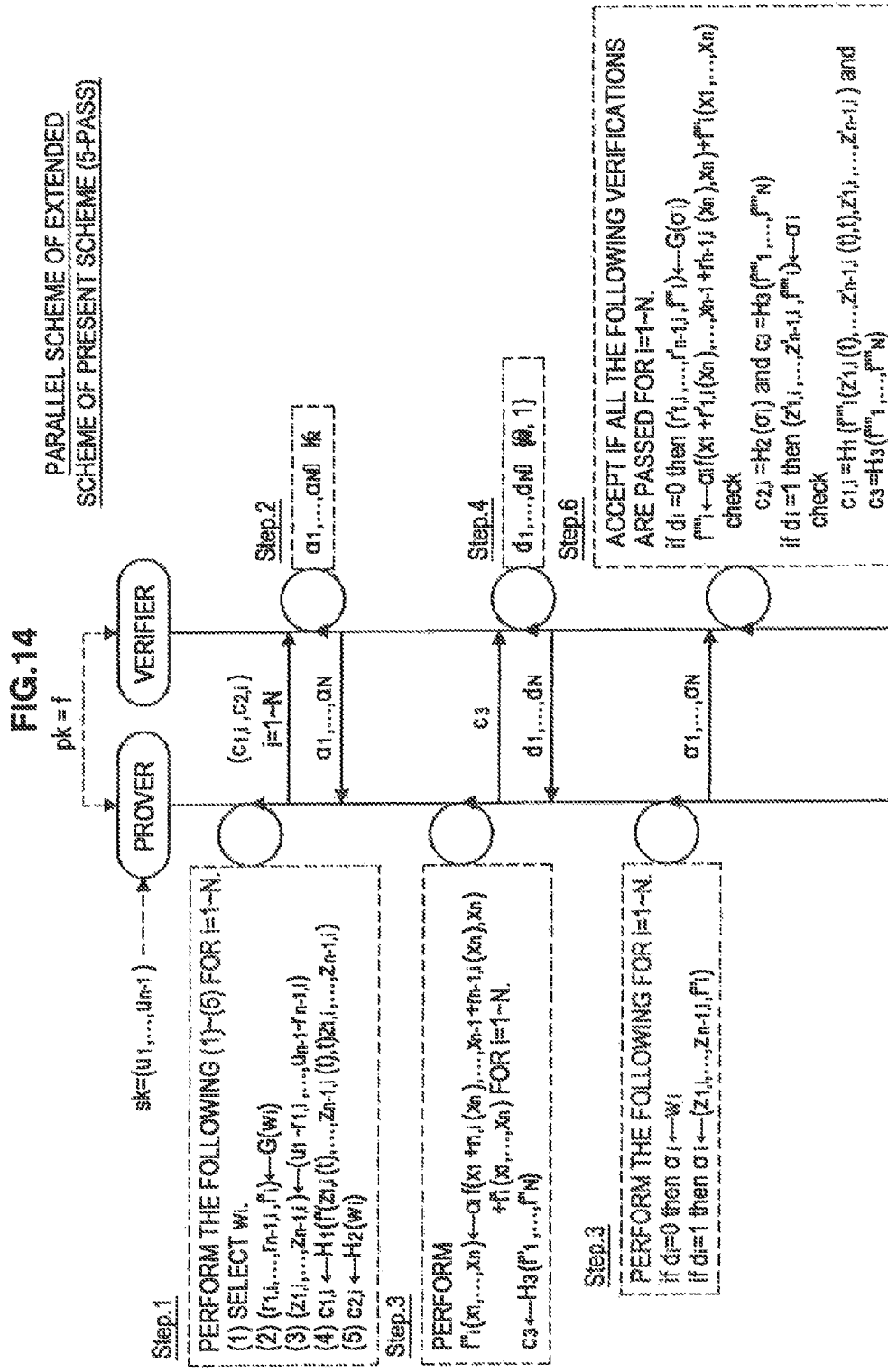
FIG. 14 is an explanatory diagram for describing parallelisation of the extended algorithm for the public key authentication scheme according to the embodiment.

In the foregoing, the method of performing, in parallel, the interactive protocol of the present scheme has been described. As described above, by repeatedly performing the interactive protocol of the present scheme, the probability of falsification succeeding can be reduced to a negligible level. Additionally, parallelisation is likewise possible for the extended scheme. An algorithm structure of a parallel interactive protocol for the extended scheme is shown in FIG. 14.

(Parallel Algorithm According to Extended Scheme)

Next, contents of a parallel algorithm according to the extended scheme will be described with reference to FIG. 14.

Additionally, the structure of the key generation algorithm Gen is substantially the same as that of the parallel algorithm according to the present scheme, and detailed explanation thereof will be omitted.

Step 1:

First, the prover algorithm P performs process (1) to process (5) below for i=1 to N. (Process 1) The prover algorithm P arbitrarily selects a number $w_i$. (Process 2) The prover algorithm P generates polynomials of one variable $r_{1,i}(t), \ldots, r_{n-1,i}(t)$ and a polynomial $f''_i(x_1, \ldots, x_n)$ by applying the number $w_i$ to a pseudo random number generator (That is, the prover algorithm P calculates $(r_{1,i}, \ldots, r_{n-1,i}, f''_i) \leftarrow G(w_i)$. (Process 3) The prover algorithm P calculates $(z_{1,i}(t), \ldots, z_{n-1,i}(t)) \leftarrow (u_{1,i}(t)-r_{1,i}(t), \ldots, u_{n-1,i}(t)-r_{n-1,i}(t))$. This calculation corresponds to an operation of masking the secret key $(u_{1,i}, \ldots, u_{n-1,i})$ by the polynomial of one variable $(r_{1,i}, \ldots, r_{n-1,i})$.

Step 1 (Continued):

(Process 4) The prover algorithm P generates a hash value $c_{1,i}$ of $f''_i(z_{1,i}(t), \ldots, z_{n-1,i}(t),t)$ and $z_{1,i}, \ldots, z_{n-1,i}$. That is, the prover algorithm P calculates $c_{1,i} \leftarrow H_1(f''_i(t), \ldots, z_{n-1,i}(t),t), z_{1,i}, \ldots, z_{n-1,i})$. (Process 5) The prover algorithm P generates a hash value $c_{2,i}$ of the number $w'_i$. That is, the prover algorithm P calculates $c_{2,i} \leftarrow H_2(w'_i)$.

After (Process 1) to (Process 5) described above are performed for i=1 to N, the messages $(c_{1,i}, c_{2,i})$ (i=1 to N) generated in Step 1 are sent to a verifier.

Step 2:

The verifier algorithm V selects N random numbers $\alpha_1, \ldots, \alpha_N$ from q types of elements of a ring K. Then, the verifier algorithm V sends the selected random numbers $\alpha_1, \ldots, \alpha_N$ to the prover.

Step 3:

The prover algorithm P calculates $f''_i(x_1, \ldots, x_n) \leftarrow \alpha_i f(x_1 + r_{1,i}(x_n), \ldots, x_{n-1}+r_{n-1,i}(x_n), x_n) + f'_i(x_1, \ldots, x_n)$ for i=1 to N. This calculation corresponds to an operation of masking a polynomial $f(x_1+r_{1,i}(x_n), \ldots, x_{n-1}+r_{n-1,i}(x_n),x_n)$ for $x_1, \ldots, x_n$ by the polynomial $f'_i(x_1, \ldots, x_n)$. Then, the prover algorithm P generates a hash function $c_3$ of the polynomials $f''_1, \ldots, f''_N$. That is, the prover algorithm P calculates $c_3 \leftarrow H_3(f''_1, \ldots f''_N)$. Additionally, $H_3(\ldots)$ described is a hash function. Also, the hash value $c_3$ is a message.

The message $c_3$ generated in Step 3 is sent to the verifier.

Step 4:

The verifier algorithm V selects, for each of i=1 to N, a verification pattern to be used from two verification patterns. Then, the verifier algorithm V sends to the prover a demand $d_i \in \{0, 1\}$ (i=1 to N) indicating the selected verification pattern.

Step 5:

The prover algorithm P generates information $\sigma_i$ to be sent back to the verifier in response to the demand $d_i$ received from the verifier. Here, the prover algorithm P performs (Process 1) or (Process 2) below for i=1 to N. (Process 1) If $d_i=0$, the prover algorithm P generates information $\sigma_i = w_i$. (Process 2) If $d_i=1$, the prover algorithm P generates information $\sigma_i = (w'_i, z_{1,i}, \ldots, z_{n-1,i}, f''_i)$. After decision and process of (Process 1) or (Process 2) above have been performed, the information $\sigma_i$ (i=1 to N) is sent to the verifier by the prover algorithm P.

Step 6:

The verifier algorithm V performs the following verification process by using the information $\sigma_i$ (i=1 to N) received from the prover. Additionally, the following process is performed for i=1 to N.

If $d_i=0$, the verifier algorithm V calculates $(r'_{1,i}, \ldots, r'_{n-1,i}, f'''_i) \leftarrow G_1(\sigma_i)$. Furthermore, the verifier algorithm V calculates $f''''_i \leftarrow \alpha_i f(x_1+r'_{1,i}(x_n), \ldots, x_{n-1}+r'_{n-1,i}(x_n),x_n)+f'''_i$ $(x_1, \ldots, x_n)$. Then, the verifier algorithm V verifies whether the equality $c_{2,i}=H_2(\sigma_i)$ holds true or not. Also, the verifier algorithm V verifies whether the equality $c_3=H_3(f''''_1, \ldots, f''''_N)$ holds true or not. The verifier algorithm V outputs a value 1 indicating authentication success in the case all the verifications have succeeded, and outputs a value 0 indicating authentication failure in the case a failure has occurred in the verification.

If $d_i=1$, the verifier algorithm V calculates $(z'_{1,i}, \ldots, z'_{n-1,i}, f'''_i) \leftarrow \sigma_i$. Then, the verifier algorithm V verifies whether the equality $c_{1,i}=H_1(f'''_i(z'_{1,i}(t), \ldots, z'_{n-1,i}(t),t), z'_{1,i}, \ldots, z'_{n-1,i}))$ holds true or not. Furthermore, the verifier algorithm V verifies whether the equality $c_3=H_3(f''''_1, \ldots, f''''_N)$ holds true or not. The verifier algorithm V outputs a value 1 indicating authentication success in the case all the verifications have succeeded, and outputs a value 0 indicating authentication failure in the case a failure has occurred in the verification.

In the foregoing, the contents of the parallel algorithm according to the extended scheme have been described.

[3-4: Non-Interactive Algorithm]

Figure 15:
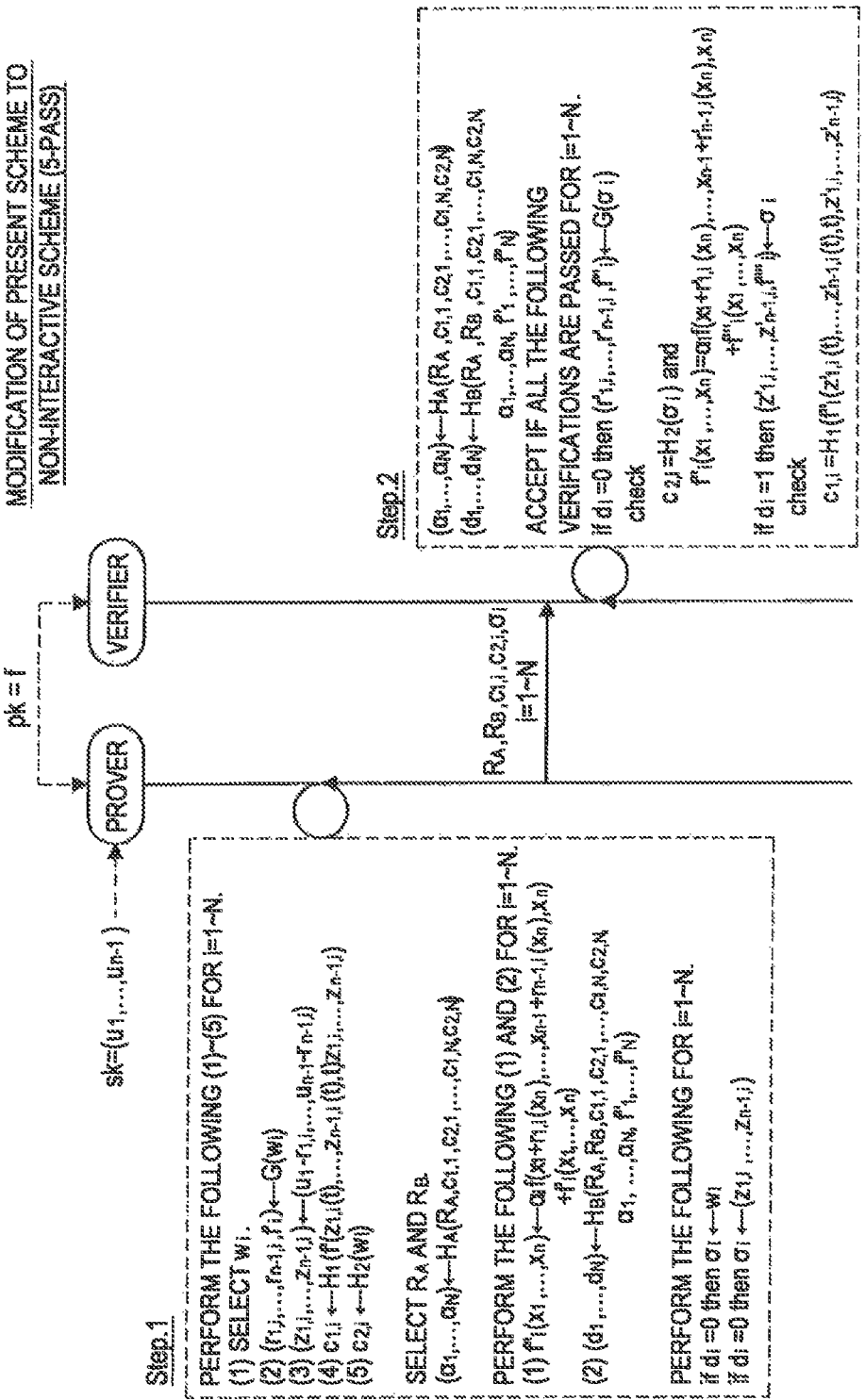
FIG. 15 is an explanatory diagram for describing a non-interactive algorithm for the public key authentication scheme according to the embodiment.

In the foregoing, the 5-pass public key authentication scheme has been described. However, in the present scheme, the information sent from the verifier to the prover is actually merely a random number, and thus modification to a 1-pass public key authentication scheme (hereinafter, non-interactive scheme) is possible. Additionally, the contents of each algorithm according to the non-interactive scheme are shown in FIG. 15. In the following, the contents of each algorithm according to the non-interactive scheme will be described with reference to FIG. 15.

(Key Generation Algorithm Gen)

The key generation algorithm Gen generates a multi-order polynomial of n variables $f_0(x_1, \ldots, x_n)$ defined on a ring K and multi-order polynomials of one variable $u_1(t), \ldots, u_{n-1}(t)$. Next, the key generation algorithm Gen calculates $c(t) \leftarrow f_0(u_1(t), \ldots, u_{n-1}(t),t)$. Then, the key generation algorithm Gen calculates $f(x_1, \ldots, x_n)=f_0(x_1, \ldots, x_n)-c(x_n)$, and sets f as the public key pk. Also, the key generation algorithm Gen sets $(u_1, \ldots, u_{n-1})$ as the secret key sk. Note that $f_0(u_1(t), \ldots, u_{n-1}(t),t)=0$ is satisfied here.

(Prover Algorithm P, Verifier Algorithm V)

Next, processes by the prover algorithm P and the verifier algorithm V in an interactive protocol will be described with reference to FIG. 15. This interactive protocol is for making a verifier prove that "prover knows the $(u_1, \ldots, u_{n-1})$ that satisfies $f(u_1(t), \ldots, u_{n-1}(t), t)$," without leaking information on the $(u_1, \ldots, u_{n-1})$ at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P performs process (1) to process (5) below for i=1 to N. (Process 1) The prover algorithm P arbitrarily selects a number $w_i$. (Process 2) The prover algorithm P generates polynomials of one variable $r_{1,i}(t), \ldots, r_{n-1,i}(t)$ and a polynomial $f'_i(x_1, \ldots, x_n)$ by applying the number $w_i$ to a pseudo random number generator G. That is, the prover algorithm P calculates $(r_{1,i}, \ldots, r_{n-1,i}, f'_i) \leftarrow G(w_i)$. (Process 3) The prover algorithm P calculates $(z_{1,i}(t), \ldots, z_{n-1,i}(t)) \leftarrow (u_{1,i}(t)-r_{1,i}(t), \ldots, u_{n-1,i}(t)-r_{n-1,i}(t))$. This calculation corresponds to an operation of masking the secret key $(u_{1,i}, \ldots, u_{n-1,i})$ by the polynomial of one variable $(r_{1,i}, \ldots, r_{n-1,i})$.

Step 1 (Continued):

(Process 4) The prover algorithm P generates a hash value $c_{1,i}$ of $f'_i(z_{1,i}(t), \ldots, z_{n-1,i}(t),t)$ and $z_{1,i}, \ldots, z_{n-1,i}$. That is, the prover algorithm P calculates $c_{1,i} \leftarrow H_1(f''_i(z_{1,i}(t), \ldots, z_{n-1,i}(t),t), z_{1,i}, \ldots, z_{n-1,i})$. (Process 5) The prover algorithm P generates a hash value $c_{2,i}$ of the number $w'_i$. That is, the prover algorithm P calculates $c_{2,i} \leftarrow H_2(w'_i)$.

Step 1 (Continued):

Next, the prover algorithm P selects random numbers $R_A$ and $R_B$. Then, the prover algorithm P generates hash values $\alpha_1, \ldots, \alpha_N$ by applying the random number $R_A$ and the hash values $c_{1,i}$ and $c_{2,i}$ calculated by (Process 4) and (Process 5) above to a hash function $H_A$. That is, the prover algorithm P calculates $(\alpha_1, \ldots, \alpha_N) \leftarrow H_A(R_A, c_{1,1}, \ldots, c_{2,N})$.

Step 1 (Continued):

Next, the prover algorithm P performs (Process 1) and (Process 2) below for i=1 to N. (Process 1) The prover algorithm P calculates $f''_i(x_1, \ldots, x_n) \leftarrow \alpha_i f(x_1 + r_{1,i}(x_n), \ldots, x_{n-1} + r_{n-1,i}(x_n), x_n) + f'_i(x_1, \ldots, x_n)$. This calculation corresponds to an operation of masking a polynomial $f(x_1 + r_{1,i}(x_n), \ldots, x_{n-1} + r_{n-1,i}(x_n), x_n)$ for $x_1, \ldots, x_n$ by the polynomial $f'_i(x_1, \ldots, x_n)$. (Process 2) The prover algorithm P generates, for i=1 to N, $d = (d_1, \ldots, d_N)$ by applying the random numbers $R_A$ and $R_B$, the hash values ($c_{1,i}$ and $c_{2,i}$), $\alpha_i$, and $f''_i$ to a hash function $H_B$. That is, the prover algorithm P calculates $(d_1, \ldots, d_N) \leftarrow H_B(R_A, R_B, c_{1,i}, \ldots, c_{2,N}, \alpha_1, \ldots, \alpha_N, f''_1, \ldots, f''_N)$.

Step 1 (Continued):

Next, the prover algorithm P generates information $\sigma_i$ to be sent to the verifier according to the generated $d_i$. Here, the prover algorithm P performs (Process 1) or (Process 2) below for i=1 to N. (Process 1) If $d_i=0$, the prover algorithm P generates information $\sigma_i = w_i$. (Process 2) If $d_i=1$, the prover algorithm P generates information $\sigma_i = (z_{1,i}, \ldots, z_{n-1,i})$. After decision and process of (Process 1) or (Process 2) above have been performed, $R_A$, $R_B$, $\alpha_i$, $c_{1,i}$, $c_{2,i}$, $\sigma_i$ (i=1 to N) are sent to the verifier by the prover algorithm P.

Step 2:

The verifier algorithm V first generates $\alpha_i$ by applying the $R_A$, $c_{1,i}$ and $c_{2,i}$ received from the prover to the hash function $H_A$. That is, the verifier algorithm V calculates $(\alpha_1, \ldots, \alpha_N) \leftarrow H_A(R_A, c_{1,1}, \ldots, c_{2,N})$. Next, the verifier algorithm V calculates $d = (d_1, \ldots, d_N) \leftarrow H_B(R_A, R_B, c_{1,1}, \ldots, c_{2,N}, \alpha_1, \ldots, \alpha_N, f''_1, \ldots, f''_N)$. Then, the verifier algorithm V performs the following verification process by using the information $\sigma_i$ (i=1 to N). Additionally, the following process is performed for i=1 to N.

If $d_i=0$, the verifier algorithm V calculates $(r'_{1,i}, \ldots, r'_{n-1,i}, f'''_i) \leftarrow G_1(\sigma_i)$. Then, the verifier algorithm V verifies whether the equality $c_{2,i} = H_2(\sigma_i)$ holds true or not. Also, the verifier algorithm V verifies whether the equality $f''_i(x_1, \ldots, x_n) = \alpha_i f(x_1 + r'_{1,i}(x_n), \ldots, x_{n-1} + r'_{n-1,i}(x_n), x_n) + f'''_i(x_1, \ldots, x_n)$ holds true or not. The verifier algorithm V outputs a value 1 indicating authentication success in the case all the verifications have succeeded, and outputs a value 0 indicating authentication failure in the case a failure has occurred in the verification.

If $d_i=1$, the verifier algorithm V calculates $(z'_{1,i}, \ldots, z'_{n-1,i}, f'''_i) \leftarrow \sigma_i$. Then, the verifier algorithm V verifies whether the equality $c_{1,i} = H_1(f'''_i(z'_{1,i}(t), \ldots, z'_{1,i}, \ldots, z'_{n-1,i}))$ holds true or not. The verifier algorithm V outputs a value 1 indicating authentication success in the case the verification has succeeded, and outputs a value 0 indicating authentication failure in the case a failure has occurred in the verification.

In the foregoing, the contents of each algorithm according to the non-interactive scheme have been described. Additionally, if ideal hash functions $H_A$ and $H_B$ are assumed, hash values $\alpha_i$ and $d_i$ will act randomly, and thus hash values $\alpha_i$ and $d_i$ that are convenient for the prover will not occur. Accordingly, even when the modification as described above is performed, sufficient security is ensured. Additionally, such modification can likewise be applied to the extended scheme and the like.

[3-5: Modification into Digital Signature Scheme]

Here, a method of modifying the present scheme to the digital signature scheme will be described. Additionally, for the sake of simplicity, a method of modifying the non-interactive scheme described above to the digital signature scheme will be described here. It can be understood that, when the prover and the verifier of the non-interactive scheme described above correspond to the signer and the verifier of the digital signature scheme, there is a resemblance to the model of the digital signature scheme in that the prover alone can convince the verifier. With this concept in mind, the algorithm structure of the digital signature scheme based on the non-interactive scheme will be described in detail.

(Key Generation Algorithm Gen)

The key generation algorithm Gen generates a multi-order polynomial of n variables $f_0(x_1, \ldots, x_n)$ defined on a ring K and multi-order polynomials of one variable $u_1(t), \ldots, u_{n-1}(t)$. Next, the key generation algorithm Gen calculates $c(t) \leftarrow f_0(u_1(t), \ldots, u_{n-1}(t),t)$. Then, the key generation algorithm Gen calculates $f(x_1, \ldots, x_n) = f_0(x_1, \ldots, x_n) - c(x_n)$, and sets f as the verification key pk. Also, the key generation algorithm Gen sets $(u_1, \ldots, u_{n-1})$ as the signature key sk. Note that $f_0(u_1(t), \ldots, u_{n-1}(t),t) = 0$ is satisfied here.

(Signature Generation Algorithm Sig)

The signature generation algorithm Sig performs (Process 1) to (Process 11) below for i=1 to N. Additionally, it is assumed that the signature key $sk = (u_1, \ldots, u_{n-1})$ and a document M are inputted in the signature generation algorithm Sig.

(Process 1) The signature generation algorithm Sig arbitrarily selects a number $w_i$. (Process 2) The signature generation algorithm Sig generates polynomials of one variable $r_{1,i}(t), \ldots, r_{n-1,i}(t)$ and a polynomial of n variables $f'_i(x_1, \ldots, x_n)$ by applying the number w, to a pseudo random number generator G. That is, the signature generation algorithm Sig calculates $(r_{1,i}, \ldots, r_{n-1,i}, f'_i) \leftarrow G(w_i)$. (Process 2) The signature generation algorithm Sig calculates $(z_{1,i}(t), \ldots, z_{n-1,i}(t)) \leftarrow (u_{1,i}(t) - r_{1,i}(t), \ldots, u_{n-1,i}(t) - r_{n-1,i}(t))$. This calculation corresponds to an operation of masking the signature key $(u_{1,i}, \ldots, u_{n-1,i})$ by the polynomial of one variable $(r_{1,i}, \ldots, r_{n-1,i})$.

(Process 3) The signature generation algorithm Sig generates a hash value $c_{1,i}$ of $f''_i(z_{1,i}(t), \ldots, z_{n-1,i}(t),t)$ and $z_{1,i}, \ldots, z_{n-1,i}$. That is, the signature generation algorithm Sig calculates $c_{1,i} \leftarrow H_1(f''_i(z_{1,i}(t), \ldots, z_{n-1,i}(t),t), z_{1,i}, \ldots, z_{n-1,i})$. (Process 4) The signature generation algorithm Sig generates a hash value $c_{2,i}$ of a number $w'_i$. That is, the signature generation algorithm Sig calculates $c_{2,i} \leftarrow H_2(w'_i)$. Additionally, $H_1(\ldots)$, and $H_2(\ldots)$ described are hash functions.

(Process 4) The signature generation algorithm Sig arbitrarily selects a random number $R_A$. (Process 5) The signature generation algorithm Sig calculates $\alpha = (\alpha_1, \ldots, \alpha_N) \leftarrow H_A(R_A, M, c_{1,1}, \ldots, c_{2,N})$. (Process 6) The signature generation algorithm Sig calculates, for i=1 to N, $f''_i(x_1, \ldots, x_n) = \alpha_i f(x_1 + r'_{1,i}(x_n), \ldots, x_{n-1} + r'_{n-1,i}(x_n), x_n) + f'_i(x_1, \ldots, x_n)$. (Process 7) The signature generation algorithm Sig arbitrarily selects a random number $R_B$. (Process 8) The signature generation algorithm Sig calculates $d = (d_1, \ldots, d_N) \leftarrow H_B(R_B, M, c_{1,1}, \ldots, c_{2,N}, \alpha, f''_1, \ldots, f''_N)$.

Next, the signature generation algorithm Sig performs, for i=1 to N, next (Process 9) or (Process 10) below according to $d_i$. (Process 9) If $d_i=0$, the signature generation algorithm Sig calculates $\sigma_i \leftarrow w_i$. (Process 10) If $d_i=1$, the signature generation algorithm Sig calculates $\sigma_i \leftarrow (z_{1,i}, \ldots, z_{n-1,i})$.

(Process 11) After decision and process of (Process 9) or (Process 10) above have been performed for i=1 to N, the signature generation algorithm Sig outputs a digital signature $\sigma=(R_A, R_B, c_{1,1}, \ldots, c_{2,N}, \alpha_1, \ldots, \alpha_N, f''_1, \ldots, f''_N)$.

(Signature Verification Algorithm Ver)

If all the following verifications are passed for i=1 to N, the signature verification algorithm Ver accepts the digital signature σ, and if even one verification is not passed, the signature verification algorithm Ver denies the digital signature σ. Additionally, it is assumed that the digital signature σ and the document M are inputted in the signature verification algorithm Ver. First, the signature verification algorithm Ver calculates $\alpha=(\alpha_1, \ldots, \alpha_N) \leftarrow H_A(R_A, M, c_{1,1}, \ldots, c_{3,N})$. Next, the signature verification algorithm Ver calculates $d=(d_1, \ldots, d_N) \leftarrow H(R, M, c_{1,1}, \ldots, c_{3,N}, \alpha, f''_1, \ldots, f''_N)$. Then, the signature verification algorithm Ver performs (Verification 1) and (Verification 2) below for i=1 to N.

(Verification 1) If $d_i=0$, the signature verification algorithm Ver calculates $(r'_{1,i}, \ldots, r'_{n-1,i}, f''_i) \leftarrow G(\sigma_i)$. Then, the signature verification algorithm Ver verifies whether the equality $c_{2,i}=H_2(\sigma_i)$ holds true or not. Also, the signature verification algorithm Ver verifies whether the equality $f''_i(x_1, \ldots, x_n)=\alpha_i f(x_1+r'_{1,i}(x_n), \ldots, x_{n-1,i}+r'_{n-1,i}(x_n), x_n)+f'_i(x_1, \ldots, x_n)$ holds true or not. The signature verification algorithm Ver outputs a value 1 indicating acceptance of the digital signature σ in the case all the verifications have succeeded, and outputs a value 0 indicating denial of the digital signature a in the case a failure has occurred in the verification.

(Verification 2) If $d_i=1$, the signature verification algorithm Ver calculates $(z'_{1,i}, \ldots, z'_{n-1,i}, f'''_i) \leftarrow \sigma_i$. Then, the signature verification algorithm Ver verifies whether the equality $c_{1,i}=H_1(f'''_i(z'_{1,i}(t), \ldots, z'_{n-1,i}(t), t), z'_{1,i}, \ldots, z'_{n-1,i}))$ holds true or not. The signature verification algorithm Ver outputs a value 1 indicating acceptance of the digital signature a in the case the verification has succeeded, and outputs a value 0 indicating denial of the digital signature a in the case a failure has occurred in the verification.

In the foregoing, each algorithm structure of the digital signature scheme based on the present scheme has been described. The digital signature scheme described above takes the section-finding problem on an algebraic surface as a basis for security but does not contain the security issue like that of the ASS-CC-digital signature scheme. Additionally, a digital signature scheme based on the extended scheme described above can likewise be structured.

[3-6: Concrete Example]

Figure 16:
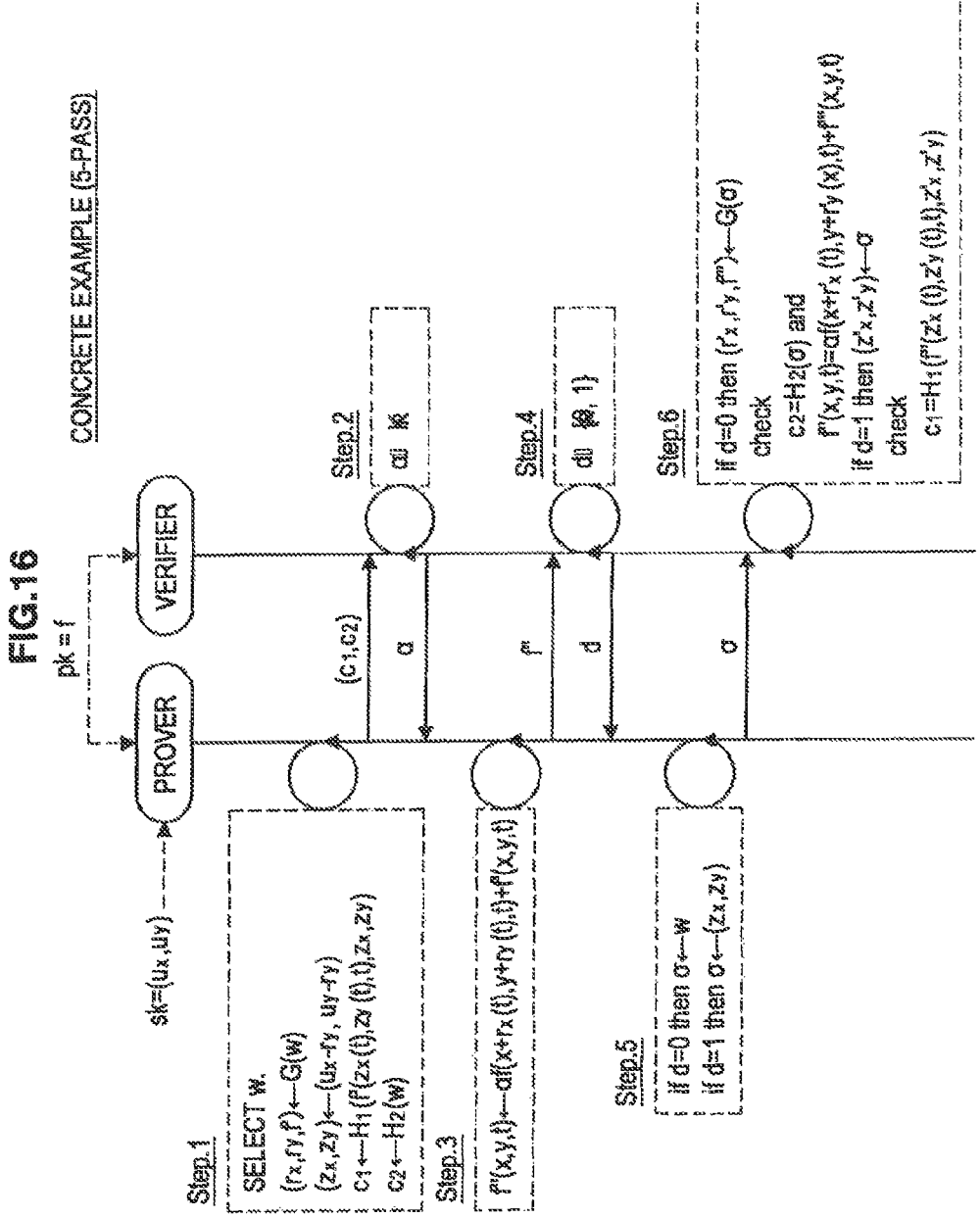
FIG. 16 is an explanatory diagram for describing a concrete algorithm for the public key authentication scheme according to the embodiment.

Next, a concrete algorithm structure that is presumable when performing the present scheme will be described with reference to FIG. 16. FIG. 16 is an explanatory diagram for describing a concrete example of the present scheme.

(Key Generation Algorithm Gen)

The key generation algorithm Gen generates a D-th order polynomial of three variables $f_0(x,y,t)$ defined on a ring K and multi-order polynomials of one variable $u_x(t)$ and $u_y(t)$. Additionally, the D-th order polynomial $f_0(x,y,t)$ is represented as formula (14) below. Also, the multi-order polynomial of one variable $u_x(t)$ is represented as formula (15) below. Furthermore, the multi-order polynomial of one variable $u_y(t)$ is represented as formula (16) below.

[Expression 9]

$$f_0(x,y,t) = \sum_{i+j+k \leq D} a'_{i,j,k} x^i y^j t^k \quad (14)$$

$$u_x(t) = \sum_{i \leq D_s} u_{x,i} t^i \quad (15)$$

-continued $$u_y(t) = \sum_{i \leq D_s} u_{y,i} t^i \quad (16)$$

Next, the key generation algorithm Gen calculates $c(t) \leftarrow f_0(u_x(t), u_y(t), t)$. Then, the key generation algorithm Gen calculates $f(x,y,t)=f_0(x,y,t)-c(t)$, and sets f as the public key pk. Also, the key generation algorithm Gen sets $(u_x, u_y)$ as the secret key sk. Additionally, the f to be generated by the key generation algorithm Gen will be maximum D-th order for terms other than $x^0 y^0 t^k$ but will be maximum $(D+D_s)$-th order for the term $x^0 y^0 t^k$.

(Prover Algorithm P, Verifier Algorithm V)

Next, processes by the prover algorithm P and the verifier algorithm V in an interactive protocol will be described with reference to FIG. 16. This interactive protocol is for making a verifier prove that "prover knows the $(u_x, u_y)$ that satisfies $f(u_x(t), u_y(t), t)$," without leaking information on the $(u_x, u_y)$ at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P arbitrarily selects a number w. Then, the prover algorithm P generates polynomials of one variable $r_x(t)$ and $r_y(t)$ and a polynomial of three variables $f'(x,y,t)$ by applying the number w to a pseudo random number generator G. That is, the prover algorithm P calculates $(r_x, r_y, f') \leftarrow G(w)$. Next, the prover algorithm P calculates $(z_x(t), z_y(t)) \leftarrow (u_x(t)-r_x(t), u_y(t)-r_y(t))$. This calculation corresponds to an operation of masking the secret key $(u_x, u_y)$ by the polynomial of one variable $(r_x, r_y)$.

Step 1 (Continued):

Next, the prover algorithm P generates a hash value $c_1$ of $f''(z_x(t), z_y(t), t)$ and $z_x$, $z_y$. That is, the prover algorithm P calculates $c_1 \leftarrow H_1(f''(z_x(t), z_y(t), t), z_x, x_y)$. Furthermore, the prover algorithm P generates a hash value $c_2$ of the number w. That is, the prover algorithm P calculates $c_2 \leftarrow H_2(w)$. Additionally, $H_1(\ldots)$, and $H_2(\ldots)$ described are hash functions. Also, the hash values $(c_1, c_2)$ are messages.

The messages $(c_1, c_2)$ generated in Step 1 are sent to a verifier.

Step 2:

The verifier algorithm V selects one random number a from elements of a ring K. Then, the verifier algorithm V sends the selected random number a to the prover.

Step 3:

The prover algorithm P calculates $f''(x,y,t) \leftarrow \alpha f(x+r_x(t), y+r_y(t), t)+f'(x,y,t)$. This calculation corresponds to an operation of masking a polynomial $f(x+r_x(t), \ldots, y+r_y(t), t)$ for x, y, t by the polynomial $f'(x,y,t)$.

The message f'' generated in Step 3 is sent to the verifier.

Step 4:

The verifier algorithm V selects a verification pattern to be used from two verification patterns. Then, the verifier algorithm V sends to the prover a demand $d \in \{0,1\}$ indicating the selected verification pattern.

Step 5:

The prover algorithm P generates information σ to be sent back to the verifier in response to the demand d received from the verifier. If d=0, the prover algorithm P generates information σ=w. Also, if d=1, the prover algorithm P generates information $\sigma=(z_x, z_y)$. The information a generated in this manner is sent to the verifier by the prover algorithm P.

Step 6:

The verifier algorithm V performs the following verification process by using the information a received from the prover.

If d=0, the verifier algorithm V calculates $(r'_x, r'_y, f''') \leftarrow G(\sigma)$. Then, the verifier algorithm V verifies whether the equality $c_2 = H_2(\sigma)$ holds true or not. Also, the verifier algorithm V verifies whether the equality $f''(x,y,t) = \alpha f(x+r'_x(t), y+r'_y(t), t) + f'''(x,y,t)$ holds true or not. The verifier algorithm V outputs a value 1 indicating authentication success in the case all the verifications have succeeded, and outputs a value 0 indicating authentication failure in the case a failure has occurred in the verification.

If d=1, the verifier algorithm V calculates $(z'_x, z'_y) \leftarrow \sigma$. Then, the verifier algorithm V verifies whether the equality $c_1 = H_1(f'''(z'_x(t), z'_y(t), t), z'_x, z'_y))$ holds true or not. The verifier algorithm V outputs a value 1 indicating authentication success in the case the verification has succeeded, and outputs a value 0 indicating authentication failure in the case a failure has occurred in the verification.

In the foregoing, a concrete algorithm structure that is presumable when performing the present scheme has been described

4: Example Hardware Configuration

Figure 17:
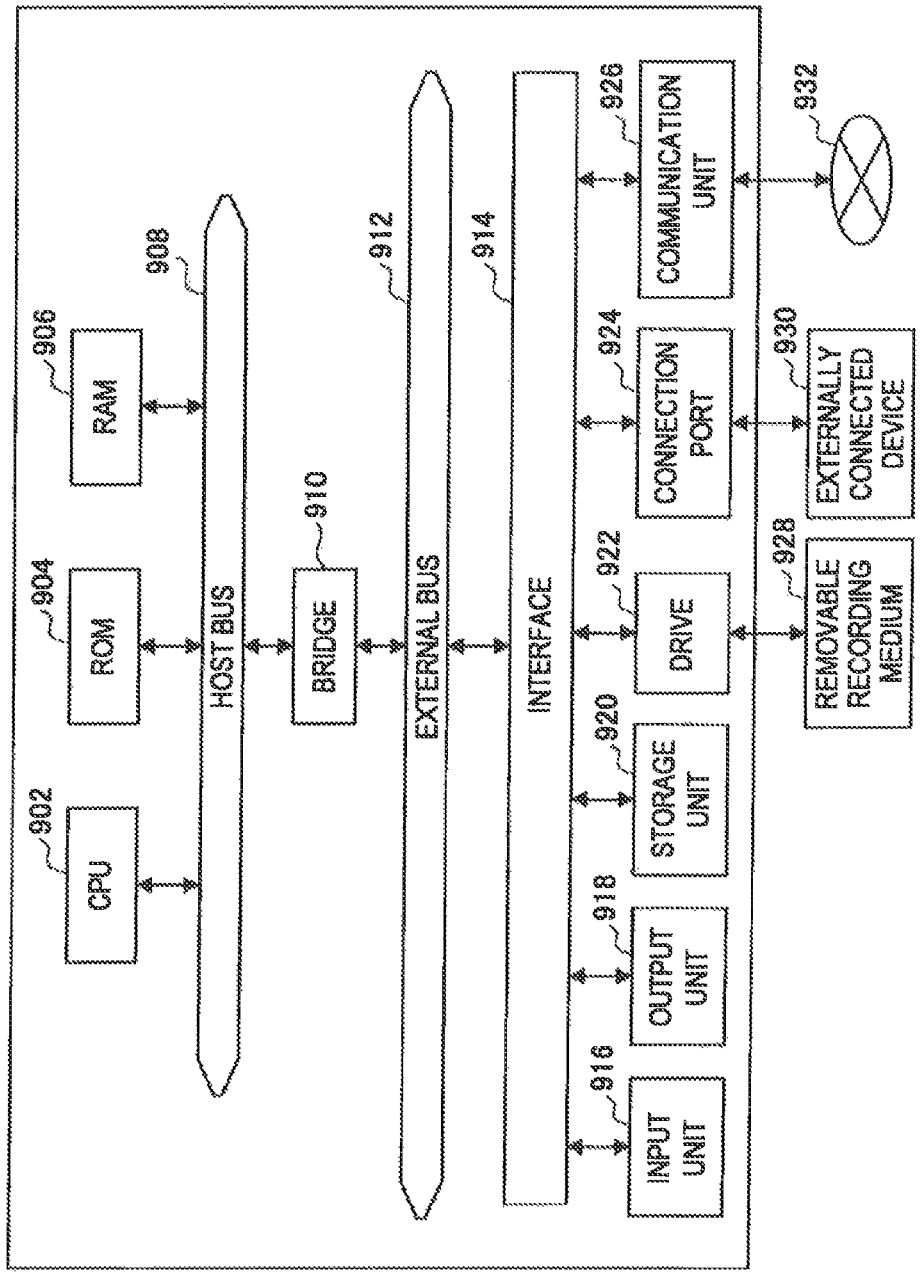
FIG. 17 is an explanatory diagram for describing an example hardware configuration of an information processing apparatus capable of performing the algorithm according to each embodiment of the present invention.

Each algorithm described above can be performed by using, for example, the hardware configuration of the information processing apparatus shown in FIG. 17. That is, processing of each algorithm can be realized by controlling the hardware shown in FIG. 17 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 17, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

5: Summary

Lastly, the technical contents according to the embodiment of the present invention will be briefly described. The technical contents stated here can be applied to various information processing apparatuses, such as a personal computer, a mobile phone, a portable game machine, a portable information terminal, an information appliance, a car navigation system, and the like.

The functional configuration of the information processing apparatus above can be expressed as follows. This information processing apparatus includes a key setting unit, a message transmission unit, a verification pattern reception unit, and a response transmission unit as follows. The key setting unit is for setting a multi-order polynomial $u_i(t)$ (i=1 to n−1) to a secret key and setting a multi-order polynomial f that satisfies $f(u_1(t), \ldots, u_{n-1}(t), t) = 0$ to a public key. The problem of finding the multi-order polynomial $u_i(t)$ that satisfies $f(u_1$ (t), . . . , $u_{n-1}$(t),t) is nothing other than the section-finding problem on an algebraic surface. That is, the information processing apparatus described above is for providing a mechanism of authentication that takes the section-finding problem on an algebraic surface as a basis for security.

Also, the message transmission unit is for transmitting a message c to a verifier. Furthermore, the verification pattern reception unit is for receiving information on one verification pattern selected by the verifier from k (k≥3) verification patterns for one message c. Furthermore, the response transmission unit is for transmitting, to the verifier, response information, among k types of response information, corresponding to the information on the verification pattern received by the verification pattern reception unit. Moreover, the response information is information that enables calculation of the secret key $u_i$ in a case all of the k verification patterns for the message c performed by using the k types of response information have been successful.

The message c includes three messages $c_1$, $c_2$, and $c_3$, for example. Also, verification for any two of $c_1$, $c_2$, and $c_3$ is performed by each verification pattern. Furthermore, the response information is information necessary for performing verification for any two messages according to a verification pattern. Moreover, one condition is that no information on the secret key is leaked even if the message c is handed over to the verifier. Another condition is that no information on the secret key is leaked even if both the message c and the response information are provided. The structure of message c and the structure of response information that satisfy these conditions have already been specifically described with reference to FIG. 6 and the like.

(Notes)

The key generation algorithm Gen is an example of a key setting unit. The prover algorithm P is an example of a message transmission unit, a verification pattern reception unit, a response transmission unit, a reply reception unit, a polynomial generation unit, and a polynomial transmission unit. The information σ is an example of response information. The verifier algorithm V is an example of a message reception unit, a verification pattern selection unit, a verification pattern transmission unit, a response reception unit, a verification unit, a reply transmission unit, and a polynomial reception unit. The signature generation algorithm Sig is an example of a message generation unit, a verification pattern selection unit, and a signature generation unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-125021 filed in the Japan Patent Office on May 31, 2010, the entire content of which is hereby incorporated by reference.

What is claimed is:

1. An authentication device comprising:

circuitry of the device configured to:

set a multi-order multivariate polynomial $u_i$(t) (i=1 to n−1) to a secret key;

set a multi-order multi-variable polynomial f that satisfies f($u_i$(t), . . . , $u_{n-1(t)}$,t)=0 to a public key for a n-pass public key (n≥3) authentication scheme;

transmit a message c to the verifier;

receive, from a verification pattern reception unit, information on one verification pattern selected by the verifier from k (k≥3) verification patterns for one message c;

transmit, to the verifier, response information, among k types of response information, corresponding to the information on the verification pattern received by the verification pattern reception unit;

wherein the response information is calculated by using z∈$K^n$ which is calculated based on a secret key s and a vector r∈$K^n$, t'∈$K^n$ which is calculated based on the vector r and t∈$K^n$, and $e_i$'∈K which is calculated based on $f_i$(r) substituted by the vector r for the multi-order multi-variable polynomials $f_i$ and $e_i$∈K, and wherein K is a ring.

2. The authentication device according to claim 1, wherein the response information is information that enables calculation of the secret key $u_i$ when all or a part of the k verification patterns for the message c performed by using the k types of response information have been successful.

3. The authentication device according to claim 2, wherein the multi-order multi-variable polynomials $f_i$ are multivariate quadratic polynomials.

4. The authentication device according to claim 1, wherein the multi-order multi-variable polynomials $f_i$ are multivariate quadratic polynomials.

5. A signature generation device comprising:

circuitry of the device configured to:

set a multi-order multivariate polynomial $u_i$(t) (i=1 to n−1) to a secret key;

set a multi-order multi-variable polynomial f that satisfies f($u_i$(t), . . . , $u_{n-1(t)}$,t)=0 to a public key or a system parameter;

generate N messages c based on the multi-order multi-variable polynomial $u_i$(t);

select a verification pattern from a plurality of verification patterns based on information obtained by applying a document M and the messages c to a function and transmit response information among k types of response information from the verification patterns;

generate, according to the selected verification pattern, a digital signature a that will pass verification that uses the messages c and the document M; and wherein the response information is calculated by using a z∈$K^n$ which is calculated based on a secret key s and a vector r∈$K^n$, t'∈$K^n$ which is calculated based on the vector r and t∈$K^n$, and $e_i$'∈K which is calculated based on $f_i$(r) substituted by the vector r for the multi-order multi-variable polynomials $f_i$ and $e_i$∈K, and wherein K is a ring.

6. A signature verification device comprising:

circuitry of the device configured to:

receive a digital signature σ, a plurality of messages c, and a document M;

select a verification pattern from a plurality of verification patterns based on information obtained by applying the document M and the messages c to a function and transmit response information among k types of response information from the verification patterns;

verify, using a public key and the selected verification pattern, a legitimacy of the digital signature σ, wherein a multi-order multivariate polynomial $u_i$(t) (i=1 to n−1) is set to a secret key and a multi-order multi-variate polynomial f that satisfies f($u_1$(t), . . . , $u_{n-1(t)}$, t)=0 is set to the public key; and wherein the response information is calculated by using z∈$K_n$ which is calculated based on a secret key s and a vector r∈$K^n$, t'∈$K^n$ which is calculated based on the vector r and t∈$K^n$, and $e_i$'∈K which is calculated based on $f_i(r)$ substituted by the vector r for the multi-order multi-variable polynomials $f_i$ and $e_i \in K$, and wherein K is a ring.

7. An authentication device comprising:
circuitry of the device configured to:
receive a message c from a prover, wherein the prover attempts to prove a legitimacy to a verifier;
select one verification pattern from a plurality of verification patterns for one message c;
transmit information on the verification pattern selected to the prover;
receive, from the prover, response information, among a plurality of the verification patterns of response information, corresponding to the information on the verification pattern transmitted;
verify a legitimacy of the prover by using a public key, the received message c and the received response information,
wherein a multi-order multivariate polynomial $u_i(t)$ (i=1 to n−1) is set to a secret key and a multi-order multi-variate polynomial f that satisfies $f(u_1(t), \ldots, u_{n-1}(t), t)=0$ is set to the public key; and
wherein the response information is calculated by using $z \in K^n$ which is calculated based on a secret key s and a vector $r \in K^n$, $t' \in K^n$ which is calculated based on the vector r and $t \in K^n$, and $e_i' \in K$ which is calculated based on $f_i(r)$ substituted by the vector r for the multi-order multi-variable polynomials $f_i$ and $e_i \in K$, and wherein K is a ring.

8. The authentication device according to claim 7,
wherein authentication is successful if, when performing a first step of receiving one or more messages c, a second step of transmitting, for each message c, the information on the verification patter, and a third step of receiving the response information for each piece of the information on the verification patter, verification is successfully performed by the verifier with all or a part of pieces of the response information.

9. The authentication device according to claim 8,
wherein processing of performing the first step of receiving one or more messages c, the second step of transmitting, for each message c, the information on the verification pattern from the verifier, and the third step of receiving the response information for each piece of the information on the verification pattern is repeated, and
wherein the authentication is successful if, when performing the first to third steps a predetermined number of times, verification is successfully performed each time by the verifier with all or a part of pieces of the response information.

10. The authentication device according to claim 9,
wherein, in a case of the message $c=(c_1, \ldots, c_m)$,
a new message $c'=H(c)$ that is calculated by using a function H is received from the verifier, and
together with the response information, an element of the message c is received that the verifier is not capable of restoring even when using the response information.

11. The authentication device according to claim 8,
wherein, in a case of the message $c=(c_1, \ldots, c_m)$,
a new message $c'=H(c)$ that is calculated by using a function H is received from the prover, and
together with the response information, an element of the message c is received that the verifier is not capable of restoring even when using the response information.

12. The authentication device according to claim 7,
wherein the multi-order multi-variable polynomials $f_i$ are multivariate quadratic polynomials.

13. The authentication device according to claim 7,
wherein the response information is information that enables calculation of the secret key $u_i$ in a case all or a part of the verification patterns for the message c performed by using the verification patterns of response information have been successful.

14. The authentication device according to claim 1,
wherein the multi-order multi-variable polynomials $f_i$ are multivariate quadratic polynomials.

* * * * *